US011361154B1

(12) United States Patent
Wohlwend et al.

(10) Patent No.: US 11,361,154 B1
(45) Date of Patent: Jun. 14, 2022

(54) METHOD FOR PROCESSING REAL-TIME CUSTOMER EXPERIENCE FEEDBACK WITH FILTERING AND MESSAGING SUBSYSTEMS AND STANDARDIZED INFORMATION STORAGE

(71) Applicant: Westwood Capital Partners, Inc., Plano, TX (US)

(72) Inventors: Jeffrey L. Wohlwend, Plano, TX (US); Matthew L. Berg, McKinney, TX (US)

(73) Assignee: Westwood Capital Partners, Inc., Plano, TX (US)

( * ) Notice: Subject to any disclaimer, the term of this patent is extended or adjusted under 35 U.S.C. 154(b) by 314 days.

(21) Appl. No.: 16/568,045

(22) Filed: Sep. 11, 2019

Related U.S. Application Data

(63) Continuation-in-part of application No. 15/887,265, filed on Feb. 2, 2018, now Pat. No. 11,087,341, which
(Continued)

(51) Int. Cl.
*G06F 40/174* (2020.01)
*G06Q 30/00* (2012.01)
*G06F 40/186* (2020.01)

(52) U.S. Cl.
CPC .......... *G06F 40/174* (2020.01); *G06F 40/186* (2020.01); *G06Q 30/01* (2013.01)

(58) Field of Classification Search
None
See application file for complete search history.

(56) References Cited

U.S. PATENT DOCUMENTS 9,501,793 B1 * 11/2016 Edelman ............ G06Q 30/0252
2001/0034677 A1 * 10/2001 Farhat .................... G06Q 20/02
705/30
(Continued)

OTHER PUBLICATIONS

International Searching Authority: Notification of Transmittal of International Search Report, Written Opinion of Int'l Searching Authority, or the Declaration dated Nov. 8, 2016.
(Continued)

*Primary Examiner* — Eric W Stamber
*Assistant Examiner* — Ashley Y Young
(74) *Attorney, Agent, or Firm* — Hemingway & Hansen, LLP; D. Scott Hemingway; Elizabeth P. Hartman

(57) ABSTRACT

The present invention supports the entry of customer experience feedback into the system, which then conducts real-time automated filtering and evaluation of feedback entered by the customer and supports the transmission of real-time notifications to selected personnel based on feedback evaluation in a flexible messaging and workflow system. The present invention supports that ability to obtain constructive feedback, either good or bad, regarding a customer's experience while the customer is still at the service provider or retail sales location. And, if the experience is negative, the invention provides automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location.

20 Claims, 81 Drawing Sheets

Related U.S. Application Data is a continuation-in-part of application No. 15/569,309, filed as application No. PCT/US2016/043773 on Jul. 23, 2016, now abandoned.

(60) Provisional application No. 62/815,933, filed on Mar. 8, 2019, provisional application No. 62/730,433, filed on Sep. 12, 2018, provisional application No. 62/290,362, filed on Feb. 2, 2016, provisional application No. 62/215,447, filed on Sep. 8, 2015, provisional application No. 62/198,908, filed on Jul. 30, 2015, provisional application No. 62/196,752, filed on Jul. 24, 2015.

(56) References Cited

U.S. PATENT DOCUMENTS

| | | |
|---|---|---|
| 2013/0041720 A1 | 2/2013 | Spires |
| 2013/0054328 A1 | 2/2013 | Chavie et al. |
| 2013/0339270 A1 | 12/2013 | Singh |
| 2013/0346155 A1* | 12/2013 | Briggs ............... G06Q 30/0203 |
| | | 705/7.32 |
| 2014/0006310 A1 | 1/2014 | Hamilton, II et al. |

OTHER PUBLICATIONS

International Searching Authority: International Search Report dated Nov. 8, 2016.
International Searching Authority: Written Opinion of the International Searching Authority dated Nov. 8, 2016.

* cited by examiner

Demo

Ticket #: _____

Customer: [--▼] _____

Customer ID: _____ ← 358

Advisor: [--Select--▼] ⎤
⎥ 359
Cashier: [--Select--▼] ⎦

Active Delivery [Yes] [No] ⎤
⎥ 360
Valet Delivery [Yes] [No] ⎦

[Start Survey]     Declined

1. Fill out information from work order and press "Start Survey".

2. Please say the following to the customer
While I'm finishing your paperwork...would you please answer a few quick questions so we can improve our service for you...Thank You.

2. Hand the tablet to the customer
*Note: Hold Logo at the top for 2 seconds to reset program from any screen.*

FIG. 3C

Service Department

- RO #: [ ] ←366
- Customer: [--▼] [ ] ⎫
- Customer ID: [ ] ⎬369
- Email: [ ] ⎫
- Cell Phone: [ ] ⎬364
- Custom 1: [ ] ⎫
- Custom 2: [ ] ⎬363
- Advisor: [ ▼] ⎫
- Cashier: [ ▼] ⎬362
- Active Delivery [Yes] [No] ⎫
- Valet Delivery [Yes] [No] ⎬361

367 → [Start]   Declined

Fill out Information Fields
Press "Start"
*NEW ENTRY: Press/Hold Logo at the top for 2 seconds to reset program from any screen for a new entry*

Logout

Español

1. Based on your experience today how likely is it that you would recommend our dealership to a friend or colleague?

[0] [1] [2] [3] [4] [5] [6] [7] [8] [9] [10]

Poor/Not Likely            Excellent/Very Likely

2. Are you likely to return for service in the future at Smith's Ford?

[No] [Yes]

3. Would you be willing to share your service experience on social media?

[Poor] [Fair] [Good] [Very Good] [Excellent]

4. Would you like your name entered in a weekly drawing for a gift certificate?

370

[Submit]

FIG. 3D

371 — Thank You Mr. Smith!

TRELA 360

John Smith ▼

Questions

Current Questions

| # | Question | Answer Format | Notification | ADD |
|---|---|---|---|---|
| 1 | How would you rate your overall service experience? | Rating 0 (Poor/Not likely) - 10 (Excellent/Likely) | on | Edit |
| 2 | Are you likely to return for service in the future at our dealership? | Yes/No | off | Edit |
| 3 | Would you be willing to share your service experience if we email you links to our review sites? | Yes/No | on | Edit |
| 4 | Will you be filling out the manufacturer emailed survey regarding today's service experience? | Yes/No | off | Edit |

522 ↑

Archived Questions 521

| Question | Answer Format | Date Archived |
|---|---|---|
| Based on your experience today, how likely is it that you would recommend our dealership to a friend or colleague? | Rating 0 (Poor/Not likely) - 10 (Excellent/Likely) | 2016-06-03 19:06:53 |
| Did our service staff go out of the way to make you feel like a valued client? | Yes/No | 2016-06-03 19:04:07 |
| If (mfg) emails you a survey about your service experience would you be willing to fill it out? | Yes/No | 2016-03-11 17:10:51 |
| The email survey is the one that counts for our national ranking. The most positive answers to the questions are on the far right of the page. will you please take the email survey if offered? | Yes/No | 2016-03-11 17:09:21 |

TRELA 360     John Smith ▶

Edit Questions

530

531 — Question *
[ How would you rate your overall service experience? ]

532 — Answer Format *
[ Rating 0 (Poor/Not Likely) -10 (Excellent/Likely) ▼ ]

533 — Notify Users *
● Yes ○ No

When the Customer answers *
534 — ☑ 0 (Poor/Not likely) ☑ 1 ☑ 2 ☑ 3 ☑ 4 ☑ 5 ☑ 6 ☑ 7 ☐ 8 ☐ 9 ☐ 10 (Excellent/Likely)

Notify the following *
535 — ☑ David Pryor
☑ Brent Reed
☑ Bob Utter
☑ Advisors
☐ Cashiers 536 — Customer answer required *
● Yes ○ No 537 — Sort Order *
[ 1 ]

538 — Use for Trela360 Rating*
● Yes ○ No

538a — [ Save ] [ Cancel ]    [ Archive/Delete ]

* indicates required field

TRELA 360  John Smith ▼

Edit DCS Question ⓘ  << Back to Questions

531a {
  Question (English) *
  [How would you rate your overall customer service experience?]
  Question (Spanish) *
  [¿Cómo calificaría su experiencia general de servicio al cliente?]
}

532a — Answer Format *
[Rating 0 (Poor/Not likely) -10 (Excellent/Likely) ▲▼]

533a → Alert Users * ◉ Yes ○ No
When the Customer answers *
534a { ☑ 0 (Poor/Not Likely) ☑ 1 ☐ 2 ☐ 3 ☐ 4 ☐ 5 ☐ 6 ☐ 7 ☐ 8 ☐ 9 ☐ 10 (Excellent/Likely) }
Alert the following *
535a { ☑ Janice Jones
       ☑ John Smith }

535b → Alert Team * ◉ Yes ○ No
When the Customer answers *
535c { ☑ 0 (Poor/Not Likely) ☑ 1 ☑ 2 ☑ 3 ☑ 4 ☑ 5 ☑ 6 ☑ 7 ☑ 8 ☑ 9 ☑ 10 (Excellent/Likely) }
Alert the following *
535d { ☑ Advisors
       ☑ Cashiers }

536a → Customer answer required * ◉ Yes ○ No
538b → Use for TrelaRating* ◉ Yes ○ No 538c { [Save] [Cancel]
* indicates required field }

[Archive/Delete]

FIG. 5D2

TRELA 360     Auto Group     Notification Status (on)     John Smith ▶

<< Back to DCS Questions | Activity Log

530b

Edit DCS Question (?)

531b — Question *
[How would you rate your overall customer service experience?]

532b — Question Format *
[Rating 0-10]

Answer Format *
[Not Likely/Likely]

Display Style *
[Normal]

533b → Alert Users *  ⦿ Yes ○ No

534b — When the Customer answers *
☑ 0 (Not Likely) ☑ 1 ☑ 2 ☐ 3 ☐ 4 ☐ 5 ☐ 6 ☐ 7 ☐ 8 ☐ 9 ☐ 10 (Likely)

535e — Alert the following *
☑ John Smith

535f → Alert Team *  ⦿ Yes ○ No

535g — When the Customer answers *
☐ 0 (Not Likely) ☐ 1 ☐ 2 ☐ 3 ☐ 4 ☐ 5 ☑ 6 ☑ 7 ☑ 8 ☑ 9 ☑ 10 (Likely)

535h — Alert the following *
☑ Advisors
☑ Cashiers

536b → Customer answer required *  ⦿ Yes ○ No

538d → Use for TrelaRating *  ⦿ Yes ○ No

538e — [Save] [Cancel]      [Archive/Delete]

* indicates required field

TRELA 360  Edit User (?)   Auto Group   Notification Status (on)   John Smith ▼
<< Back to Users Screen First Name *
544a — [ John ]          541a — Last Name *
                                 [ Smith ]

Email/Login *
545a — [ johnsmith@autogroup.com ]    542b — Phone/Text *
                                             [ (555)555-5555 ]

543c {
  ☑ used for email DCS Alerts        ☑ used for email CSC Alerts
  ☑ used for email DCS Usage Alerts  ☑ used for email Messages
  ☑ used for email CRS Alerts
}

543d {
  ☑ used for text DCS Alerts         ☑ used for text CSC Alerts
  ☑ used for text DCS Usage Alerts   ☑ used for text Messages
  ☑ used for text CRS Alerts
}

Notification Status *
546a — ⦿ On  ○ Off

547a {
  ON for the following DCS questions:
  1. How would you rate your overall customer service experience?
  ON for the following CRS questions:
  1. How would you rate your overall customer service experience?
}

Departments *
548a — ☑ Service Department  ☑ Sales Department

Access/Permissions
☑ Users  ☑ Team  ☑ Reports  ☑ Questions  ☑ Maintenance  ☑ Messages  ☑ DCS App  ☑ CRS  ☑ TrelaRating New Password
549a — [                    ]         Confirm Password
       minimum 8 characters            [                    ]

542c — [ Save ] [ Cancel ]
       * indicates required field

TRELA 360

Edit User (?)  540b  Auto Group  Notification Status (on)  John Smith ▼

<< Back to Users | Activity Log

544b — First Name *
[John]

544c — Title
[VP - Vice President]

541b — Last Name *
[Smith]

545b — Email/Login *
[johnsmith@demo.com]

542d — Cell Phone *
[(555) 555-5555]

543e — ☑ used for email DCS Alerts  ☑ used for email Messages
      ☑ used for email DCS Usage Alerts  ☑ receive Daily Reports
      ☑ used for email CRS Alerts 543f — ☑ used for text DCS Alerts  ☑ used for text Messages
      ☑ used for text DCS Usage Alerts
      ☑ used for text CRS Alerts 546b — Notification Status *
⦿ On  ○ Off 547b — ON for the following DCS questions:
- How would you rate your overall customer service experience?
- [TrelaConnect] Would you like to trade in your car and buy a new one?

ON for the following CRS questions:
- Now that you have received your vehicle, how would you rate your overall customer service experience?

548b — Departments *
☑ Service CDK  ☑ Sales CDK  ☑ Service Demo

Access/Permissions
☑ Users  ☑ Team  ☑ Reports  ☑ DCS/CRS Questions  ☑ DCS App  ☑ CRS Send  ☑ Messages  ☑ Maintenance  ☑ Activity Log  ☑ Archive 549b — New Password
[                    ]
Confirm Password
[                    ]
minimum 8 characters 542e — [Save] [Cancel]  * indicates required field

Edit Team Member

551 — First Name *: Jason

552 — Last Name *: Bishop

553 — Type *: ● Advisor ○ Cashier

554 — NOTIFICATION STATUS: ● On ○ Off

555 — Email: jbishop@bobutterford.com ☐ used for email notifications

556 — Phone/Text: (903)555-2567 ☑ used for text notifications

557 — Active: ● Yes ○ No

558 — Save  Cancel

Delete

* indicates required field

John Smith ▶

FIG. 5F1

FIG. 5F2

TRELA360

Edit Advisor (?)

Notification Status (on)     John Smith ▸

Auto Group

550b

551b — Name*
[Advisor 1]

551c — Employee Reference
[ ◂ ▸ ]

MUST MATCH "Employee Reference" to "Name" for Missed to show up correctly
(if person is not listed, re-check in 24 hours)

554b — Notification Status *
⦿ On  ○ Off

552c — Email/Login *
[test@test.com]

553c — ☑ used for email DCS Alerts
☑ used for email CRS Alerts
☑ used for email Messages 552d — Cell Phone
[5555555555]

553d — ☑ used for text DCS Alerts
☑ used for text CRS Alerts
☑ used for text Messages 558b — [Save] [Cancel]   * indicates required field << Back to Team | Activity Log

[Delete]

TRELA 360 🔊     Trela Tech     Notification Status (on)     John Smith ▼

Send Message ⓘ

Message *

561 — [text box]

160 remaining

Message Type *

562 — ☑ Text
☐ Email

Recipients *

563 — ☐ Users
☐ Advisors
☐ Cashiers

564 — [Send Message]

* indicates required field

FIG. 5H

| Reports: Notifications (?) | | | | |
|---|---|---|---|---|
| .TTL Corporate | Today | Yesterday | 3 day totals | 7 day totals |
| Trela Tech - Service | 0 | 0 | 0 | 0 |
| Trela Tech - Demo | 0 | 0 | 0 | 0 | Details |
| Trela Tech - New Car | 0 | 0 | 0 | 0 | Details |
| Acura | Today | Yesterday | 3 day totals | 7 day totals |
| David McDavid Acura - Plano - Service | 25/41=61% ↑ | 0 | 36/55=65% | 51/77=66% | Details |
| David McDavid Acura - Plano - Collision | 0 | 0 | 0 | 0 | Details |
| Ford | Today | Yesterday | 3 day totals | 7 day totals |
| Bob Utter Ford - Service | 0 | 0 | 0 | 0 | Details |
| Nissan | Today | Yesterday | 3 day totals | 7 day totals |
| Trophy Nissan - Service | 0 | 0 | 0 | 0 | Details |
| Toyota | Today | Yesterday | 3 day totals | 7 day totals |
| Toyota of Plano - Service | 142/145=98% ↑ | 0 | 407/434=94% | 990/1051=94% | Details |
| Unassigned | Today | Yesterday | 3 day totals | 7 day totals |
| Crest Cadillac - Service | 0 | 0 | 0 | 0 | Details |

570, 571, 572, 573, 575

John Smith ▼

Trela Tech

FIG. 5J

TRELA 360

Reports: TrelaConnect Sales (?)    Auto Group    Notification Status (on)    John Smith ▼

Download

TrelaConnect Question: *Would you allow us to buy back your vehicle for a new or used one in the next 60 days?*

| Customer First Name | Customer Last Name | -- Select Advisor -- ⬍ | -- Select Cashier -- ⬍ | 08/10/2019 to 08/12/2019 | Filter | Reset |

591a

| RO# | Customer | Cell Phone | Email | Advisor | Cashier | Date |
|---|---|---|---|---|---|---|
| 2361 | Customer1 | | | Advisor1 | Cashier1 | 8/10/2019 5:07pm |
| 4279 | Customer2 | | | Advisor2 | Cashier2 | 8/10/2019 4:33pm |

| Customer First Name | Customer Last Name | -- Select Advisor -- | -- Select Cashier -- | 09/04/2019 to 09/04/2019 | Filter | Reset |

| RO# | Customer | Cell Phone Before | Cell Phone Corrected | Advisor | Cashier | Date |
|---|---|---|---|---|---|---|
| 333 | Jason Jones | (444)444-4444 | (555)555-5555 | Advisor 1 | Cashier 1 | 9/4/19 4:33pm |

1 results found

TRELA 360 — DCS Live: Settings (?)

Auto Group    Dashboard: John Smith    Activity Log

Usage Alerts
Send Alerts for the following Time/DCS Counts:

| Time   | Minimum |        |
|--------|---------|--------|
| 9:00AM | 15      | Delete |
| 2:00PM | 30      | Delete |
| 5:00PM | 40      | Delete |

594

* Minimum DCS counts are specific for each time period

Alert the following *
- ☐ Brad
- ☐ Mitch
- ☐ Bruce
- ☐ Jonathan
- ☑ Noel
- ☑ James

595

DCS TrelaRating Target

[ 95 ]

* Enter a value between 0 - 100

[ Save ]  [ Cancel ]

TRELA 360

620

Auto Group     Notification Status (on)     John Smith ▶

<< Back to Questions

Edit CRS Question ⓘ

621 { Question (English) *
[ How would you rate your overall customer service experience? ]

Question (Spanish) *
[ ¿Cómo calificaría su experiencia general de servicio al cliente? ]

Answer Format *
622 — [ Rating 0 (Poor/Not likely) -10 (Excellent/Likely) ▲▼ ]

623 { Notify Users/Team *
⊙ Yes ○ No

624 { When the Customer answers *
☑ 0 (Poor/Not Likely) ☑ 1 ☐ 2 ☐ 3 ☐ 4 ☐ 5 ☐ 6 ☐ 7 ☐ 8 ☐ 9 ☐ 10 (Excellent/Likely)

Notify the following *
☐ Janice Jones
625 { ☑ John Smith
☑ Advisors
☑ Cashiers

626 { Customer answer required *
⊙ Yes ○ No

627 { Use for TrelaRating*
⊙ Yes ○ No

628 { [Save] [Cancel]
* indicates required field

629 — [Archive/Delete]

TRELA 360  Auto Group  Notification Status (on)  John Smith ▶

<< Back to CRS Questions | Activity Log

Edit CRS Question ⓘ

Question*
621a — Now that you have received your vehicle, how would you rate your overall customer service experience?

Reminder CRS Follow-Up text/email notifications need to follow TCPA Rules and not be used for marketing, solicitation and/or promotional purposes.

Question Format*  Answer Format*
622a — Rating 0 - 10 ◆  (Poor/Excellent) ◆

Alert Users*
623a — ● Yes ○ No

When the Customer answers*
624a — ☐ 0 (Poor) ☐ 1 ☑ 2 ☐ 3 ☐ 4 ☐ 5 ☐ 6 ☐ 7 ☐ 8 ☐ 9 ☐ 10 (Excellent)

Alert the following*
625a — ☑ John Smith

Alert Team*
623b — ● Yes ○ No

When the Customer answers*
624b — ☐ 0 (Poor) ☐ 1 ☑ 2 ☐ 3 ☑ 4 ☑ 5 ☐ 6 ☑ 7 ☑ 8 ☑ 9 ☑ 10 (Excellent)

Alert the following*
625b — ☑ Advisors  ☑ Cashiers

Customer answer required*
626a — ● Yes ○ No

Use for TrelaRating*
627a — ● Yes ○ No

628a — [Save] [Cancel]    * indicates required field

620a ⌇                                                        629a — [Archive/Delete]

```
TRELA 360  Auto Group    Notification Status (on)    John Smith ▼
```

601 — Survey TrelaRating Question
*How would you rate your overall customer service experience?*

CRS Scheduling

602 ⎨ Automatically send CRS when the Customer answers:
       ☐ 0 (Poor/Not Likely) ☐ 1 ☐ 2 ☐ 3 ☐ 4 ☑ 5 ☐ 6 ☐ 7 ☐ 8 ☐ 9 ☐ 10 (Excellent/Likely)
       ☐ Include Declined 603 ⎨ Manually (Survey App/Web) send CRS when the Customer answers:
       *How would you rate your overall customer service experience?*
       ☐ 0 (Poor/Not Likely) ☑ 1 ☑ 2 ☑ 3 ☑ 4 ☐ 5 ☐ 6 ☐ 7 ☐ 8 ☐ 9 ☐ 10 (Excellent/Likely)
       ☑ Include Declined 604 — At the specified time interval: [ In 4 hours ▲▼ ]

605 — CRS TrelaRating Question
*How would you rate your overall customer service experience???*

606 ⎨ CRS Social Media
       Include Social Media when the Customer answers the CRS TrelaRating Question above:
       ☐ 0 (Poor/Not Likely) ☐ 1 ☐ 2 ☐ 3 ☐ 4 ☐ 5 ☐ 6 ☐ 7 ☐ 8 ☑ 9 ☑ 10 (Excellent/Likely)

607 — [ Save ]

600

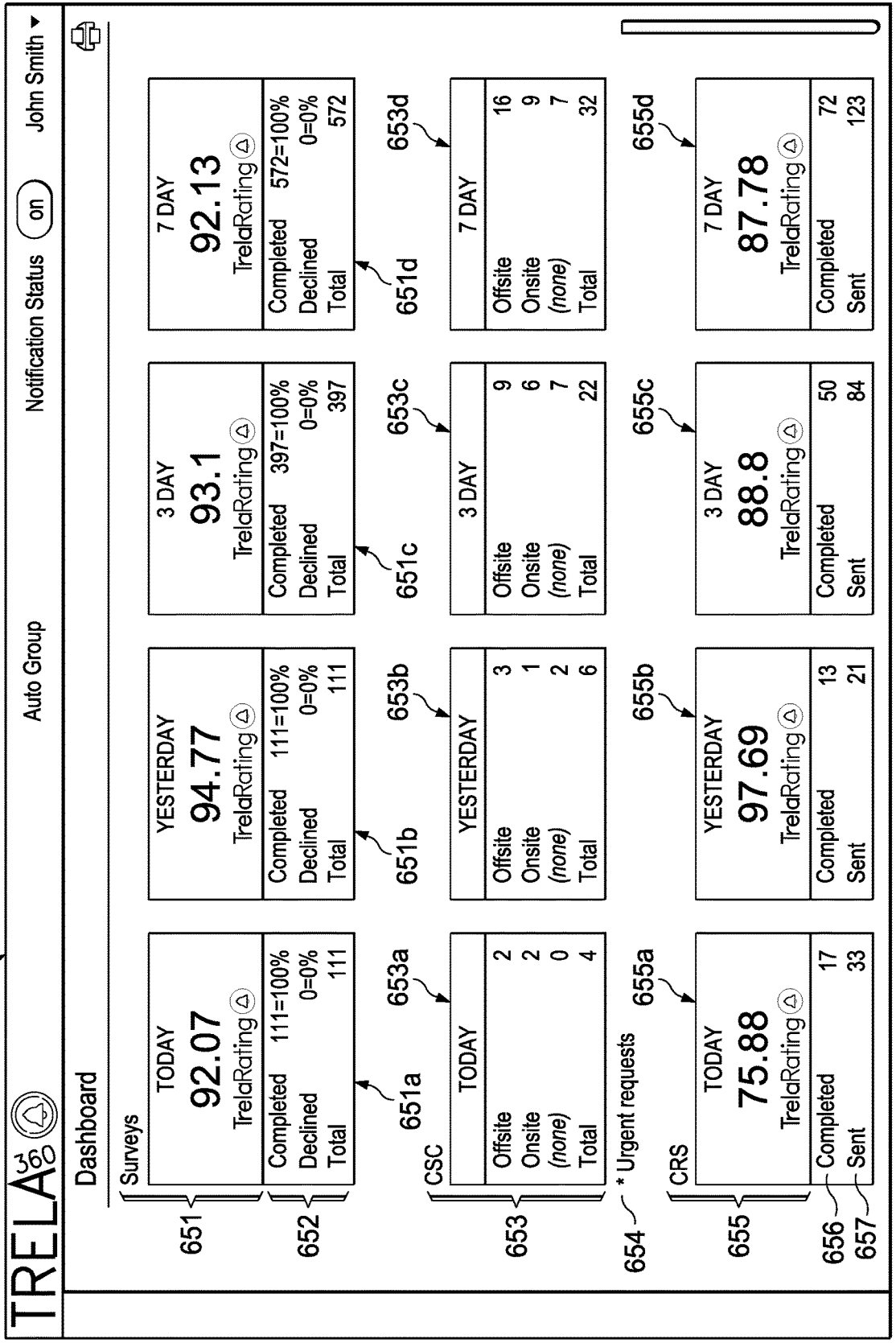
FIG. 6D1

FIG. 6D2

TRELA 360 | Auto Group | Notification Status (on) | John Smith ▸

Activity Log

610a ⤴

CRS Follow-Up: Settings (?)

611a {
DCS TrelaRating Question
*How would you rate your overall customer service experience?*

612a {
CRS Scheduling
Automatically send CRS when the Customer answers:
☐ 0 (Poor) ☐ 1 ☐ 2 ☐ 3 ☐ 4 ☐ 5 ☐ 6 ☐ 7 ☐ 8 ☐ 9 ☐ 10 (Excellent)
☐ Include Declined
☐ Include Missed 613a {
Manually (DCS App/Web) send CRS when the Customer answers:
*How would you rate your overall customer service experience?*
☐ 0 (Poor) ☐ 1 ☐ 2 ☐ 3 ☐ 4 ☐ 5 ☐ 6 ☐ 7 ☐ 8 ☐ 9 ☐ 10 (Excellent)
☐ Include Declined
☐ Include Missed 614a {
At the specified time-frame:
[ In 2 hours ▾ ]

615a {
CRS TrelaRating Target
[ 90 ]
* Enter a value between 0 - 100

617a { [Save] [Cancel]

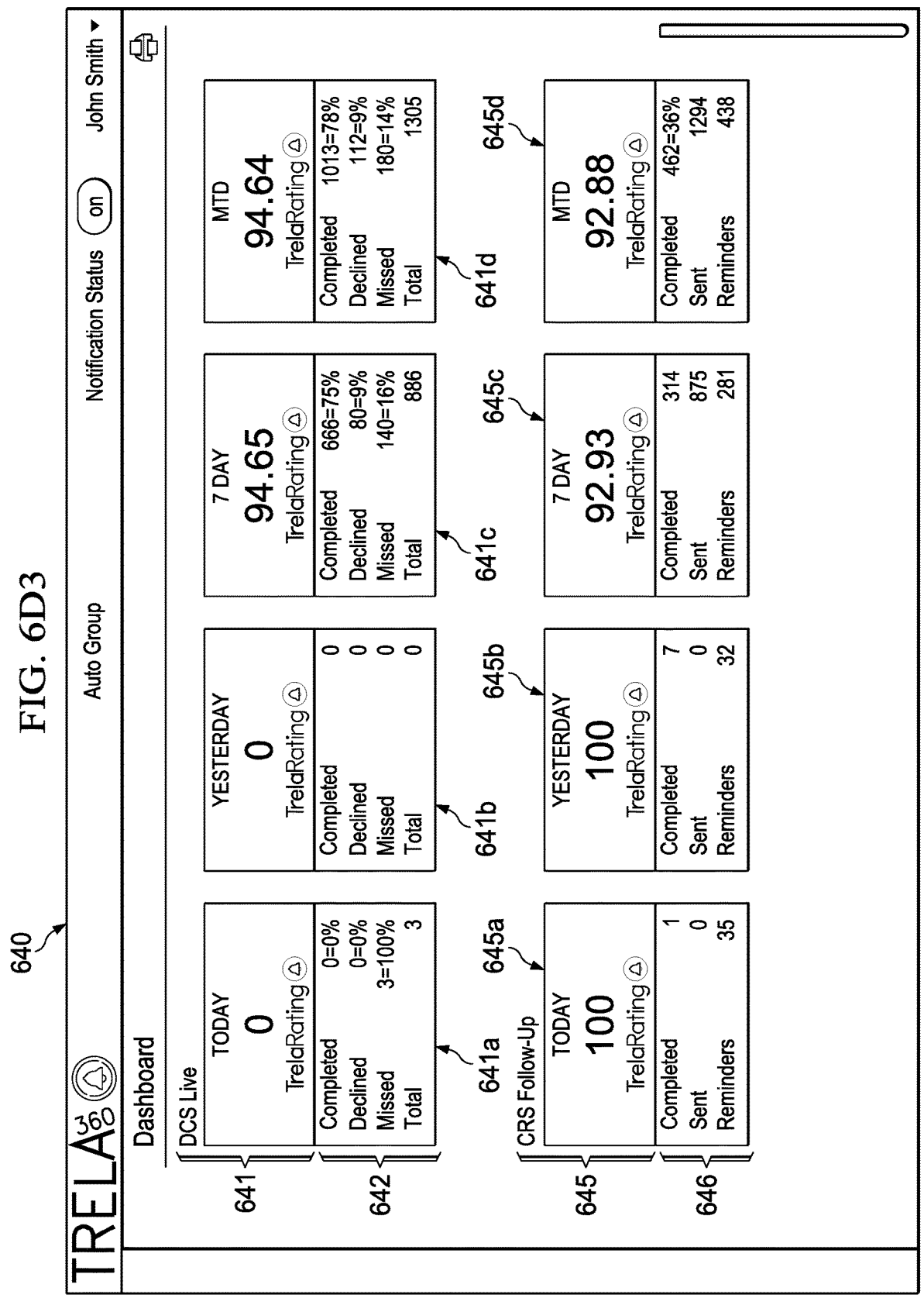
FIG. 6D3

FIG. 6D4-1

TRELA 360 | ZZZ Auto Group | Notification Status (on) | Matt Berg ▼
Activity Log 610b

CRS Follow-Up: Settings (?)

611a — DCS TrelaRating Question
*How would you rate your overall customer service experience?*

612b — CRS Scheduling
Automatically send CRS when the Customer answers:
☐ 0 (Poor) ☐ 1 ☐ 2 ☐ 3 ☐ 4 ☐ 5 ☐ 6 ☐ 7 ☐ 8 ☐ 9 ☐ 10 (Excellent)
☐ Include Declined 613b — Manually (DCS App/Web) send CRS when the Customer answers:
*How would you rate your overall customer service experience?*
☐ 0 (Poor) ☐ 1 ☐ 2 ☐ 3 ☐ 4 ☐ 5 ☐ 6 ☐ 7 ☐ 8 ☐ 9 ☐ 10 (Excellent)
☐ Include Declined 614b — At the specified time-frame:
[ In 1 hour ◄►]

616 — CRS TrelaRating Question
*How would you rate your overall customer service experience?*

TO FIG. 6D4-2

FROM FIG. 6D4-1

CRS Reminder

*Thank you [[customer_crs]] for your business! You may be receiving an email survey from Toyota. Our team would really appreciate your positive responses.*

Automatically send CRS Reminder when the Customer answers:
☐ 0 (Not Likely) ☐ 1 ☐ 2 ☐ 3 ☐ 4 ☐ 5 ☐ 6 ☐ 7 ☐ 8 ☐ 9 ☐ 10 (Likely)  — 618

Scenario 1: Time-frame after DCS was completed (and CRS was completed WITHIN time-frame):
[ In 12 hours  ◄►]

Scenario 2: If CRS was completed later, but NOT in above time-frame:
[ In 2 hours  ◄►]  — 615b CRS TrelaRating Target
[ 90 ]
* Enter a value between 0 - 100

[Save] [Cancel]  — 617b

TRELA 360  Auto Group  Notification Status (on)  John Smith ▼

<< Back to Messages

Send Message (?)

Message *
[text box] — 661

160 remaining

Message Type *
☑ Text
☐ Email
— 662

Recipients *
☐ Users (?)
  ☐ Janice Jones
  ☐ John Smith
☐ Advisors (?)
  ☐ Advisor 1
  ☐ Advisor 2
  ☐ Advisor 3
  ☐ Advisor 4
☐ Cashiers (?)
  ☐ Cashier 1
  ☐ Cashier 2
— 663

[Send Message] — 664
* indicates required field

TRELA 360

Reports: CRS — Auto Group — Notification Status (on) — John Smith ▼

-- CRS Question -- ▼

RO # | -- Select Advisor -- ▼ | -- Select Cashier -- ▼ | 08/07/2017 to 08/07/2017 | Filter | Reset

| RO # | Advisor | Cashier | Survey Trela Rating | CRS Trela Rating | Difference | Survey Date | CRS Sent | CRS Completed | |
|---|---|---|---|---|---|---|---|---|---|
| 3623 | Advisor 4 | Cashier 1 | 90 | 90 | 0 | 8/7/17 8:48am | 8/7/17 8:48am | 8/7/17 8:48am | View |
| 2362 | Advisor 2 | Cashier 2 | 100 | 0 | -100 | 8/7/17 8:42am | 8/7/17 8:42am | 8/7/17 8:42am | View |
| 9786 | Advisor 1 | Cashier 1 | 100 | 100 | 0 | 8/7/17 8:16am | 8/7/17 8:16am | 8/7/17 8:16am | View |
| 3822 | Advisor 4 | Cashier 1 | 100 | 0 | -100 | 8/7/17 8:00am | 8/7/17 8:00am | 8/7/17 8:00am | View |
| 6426 | Advisor 4 | Cashier 1 | 100 | 10 | -90 | 8/7/17 7:53am | 8/7/17 7:53am | 8/7/17 7:53am | View |
| 6592 | Advisor 3 | Cashier 1 | 100 | 100 | 0 | 8/7/17 7:34am | 8/7/17 7:34am | 8/7/17 7:34am | View |
| 1411 | Advisor 4 | Cashier 1 | 100 | 90 | -10 | 8/7/17 7:22am | 8/7/17 7:22am | 8/7/17 7:22am | View |
| 2519 | Advisor 3 | Cashier 1 | 100 | 90 | -10 | 8/7/17 7:22am | 8/7/17 7:22am | 8/7/17 7:22am | View |

FROM FIG. 6G1

| | | | | | | |
|---|---|---|---|---|---|---|
| 4799 | Advisor 4 | Cashier 1 | 100 | 100 | 0 | 8/7/17 7:15am | 8/7/17 7:15am | View |
| 4640 | Advisor 2 | Cashier 1 | 100 | 100 | 0 | 8/7/17 7:13am | 8/7/17 7:13am | View |
| 3759 | Advisor 1 | Cashier 1 | 100 | 100 | 0 | 8/7/17 7:09am | 8/7/17 7:09am | View |
| 4741 | Advisor 2 | Cashier 1 | 90 | 100 | +10 | 8/7/17 6:37am | 8/7/17 6:37am | View |
| 4941 | Advisor 4 | Cashier 2 | 90 | 100 | +10 | 8/7/17 6:28am | 8/7/17 6:28am | View |
| 2113 | Advisor 4 | Cashier 1 | 100 | 10 | -90 | 8/7/17 6:28am | 8/7/17 6:28am | View |
| 5455 | Advisor 4 | Cashier 2 | 100 | 100 | 0 | 8/7/17 6:11am | 8/7/17 6:11am | View |
| 7288 | Advisor 1 | Cashier 2 | 100 | 100 | 0 | 8/7/17 6:10am | 8/7/17 6:10am | View |
| 2661 | Advisor 2 | Cashier 1 | 90 | 100 | +10 | 8/7/17 5:24am | 8/7/17 5:24am | View |
| 17 total | | | 97.65 | 75.88 | | | | |

TRELA 360     Auto Group     Notification Status (on)     John Smith ▼

Reports: CSC (?)            🖶   ⬇ Download

675 ⤴

676 { -- Select Advisor -- ▲▼    -- Urgent -- ▲▼    08/07/2017   to   08/07/2017   [Filter] [Reset]

| Campaign | Customer | Advisor | Comments | Date | |
|---|---|---|---|---|---|
| Onsite | Jordan | | Good stuff! | 8/7/17 7:38am | [View] |
| Offsite | Jordan | | Good stuff! | 8/7/17 6:16am | [View] |
| Onsite | Smith | | Good stuff! | 8/7/17 5:33am | [View] |
| Offsite | Jordan | | Good stuff! | 8/7/17 5:00am | [View] |

677 brace encompasses the four data rows 4 results found.

FIG. 6H1

Reports: Team

Advisors

| Name | Today | Yesterday | 3 Day | 7 Day | MTD | Date Last Used |
|---|---|---|---|---|---|---|
| Advisor 1 | 100/100 | 50/100 | 75/100 | 71.43/75 | 75/100 | 9/4/19 4:32pm (3 seconds ago) |
| Advisor 2 | | | | | | 6/24/19 8:39am (2 months ago) |
| TrelaRating | 100/100 | 50/100 | 75/100 | 71.43/75 | 75/100 | |

Cashiers

| Name | Today | Yesterday | 3 Day | 7 Day | MTD | Date Last Used |
|---|---|---|---|---|---|---|
| Cashier 1 | 100/100 | 50/100 | 75/100 | 71.43/75 | 75/100 | 9/4/19 4:32pm (3 seconds ago) |
| TrelaRating | 100/100 | 50/100 | 75/100 | 71.43/75 | 75/100 | |

FIG. 6I1
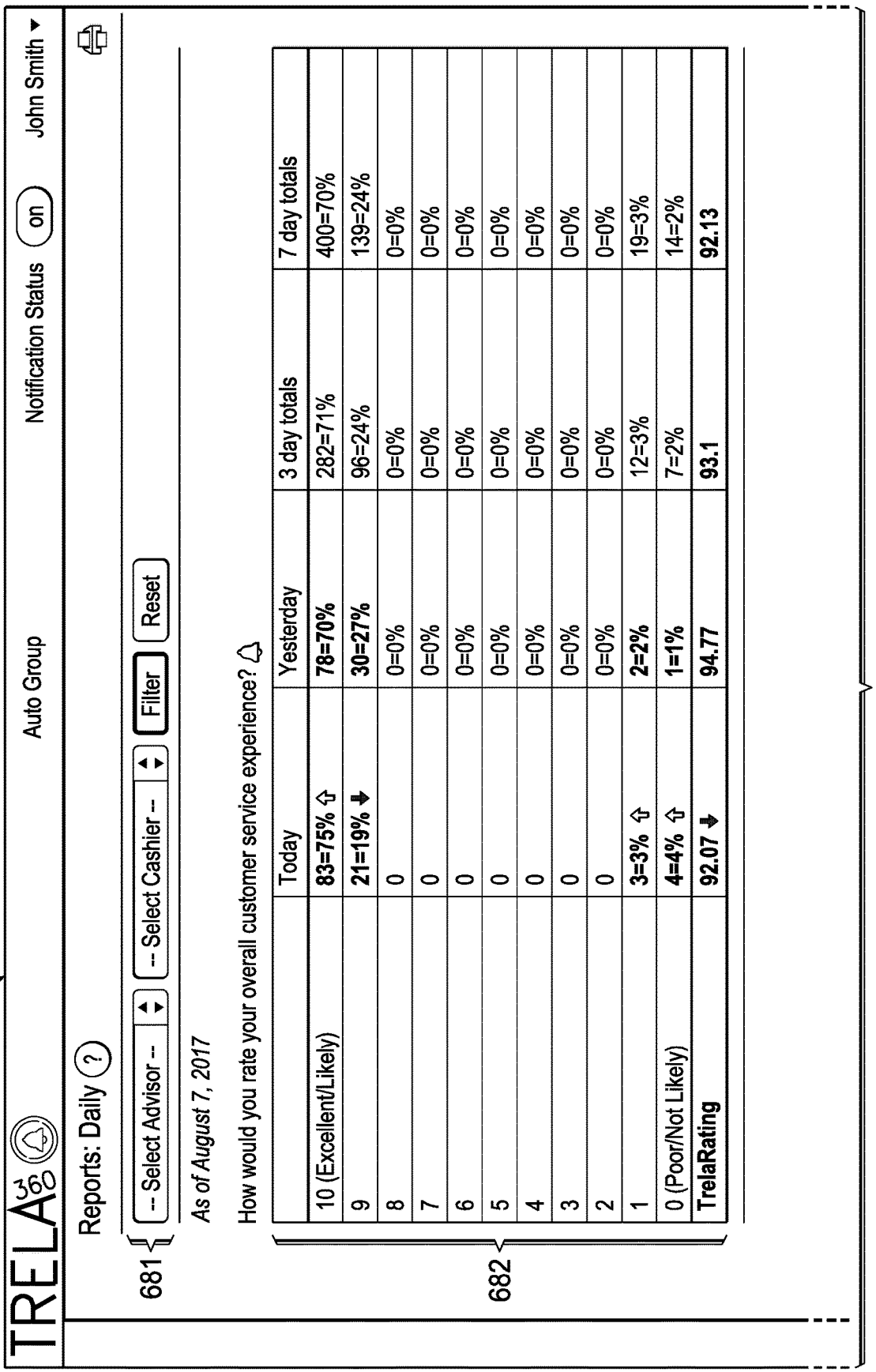

FIG. 6I2

FROM FIG. 6I1

Are you likely to return for service in the future at J23 Auto Group?

| 683 | | Today | Yesterday | 3 day totals | 7 day totals |
|---|---|---|---|---|---|
| | Yes | 55=50% → | 60=54% | 206=52% | 293=51% |
| | No | 56=50% ⇧ | 51=46% | 191=48% | 279=49% |

Active Delivery

| 684 | | Today | Yesterday | 3 day totals | 7 day totals |
|---|---|---|---|---|---|
| | Yes | 0 | 0 | 0 | 0 |
| | No | 0 | 0 | 0 | 0 |

Survey Totals

| 685 | | Today | Yesterday | 3 day totals | 7 day totals |
|---|---|---|---|---|---|
| | Completed | 111=100% | 111=100% | 397=100% | 572=100% |
| | Declined | 0 | 0=0% | 0=0% | 0=0% |
| | Total Surveys | 111 | 111 | 397 | 572 |

CSC

| 686 | | Today | Yesterday | 3 day totals | 7 day totals |
|---|---|---|---|---|---|
| | Offsite | 2 | 3 | 9 | 16 |
| | Onsite | 2 | 1 | 6 | 9 |
| | (none) | 0 | 2 | 7 | 7 |
| | Total Comments | 4 | 6 | 22 | 32 |

* Urgent requests

FROM FIG. 6I2

CRS
How would you rate your overall customer service experience???

| | Today | Yesterday | 3 day totals | 7 day totals |
|---|---|---|---|---|
| 10 (Excellent/Likely) | 10=59% → | 10=77% | 36=72% | 52=72% |
| 9 | 3=18% → | 3=23% | 9=18% | 12=17% |
| 8 | 0 | 0=0% | 0=0% | 0=0% |
| 7 | 0 | 0=0% | 0=0% | 0=0% |
| 6 | 0 | 0=0% | 0=0% | 0=0% |
| 5 | 0 | 0=0% | 0=0% | 0=0% |
| 4 | 0 | 0=0% | 0=0% | 0=0% |
| 3 | 0 | 0=0% | 0=0% | 0=0% |
| 2 | 0 | 0=0% | 0=0% | 0=0% |
| 1 | 2=12% | 0=0% | 3=6% | 4=6% |
| 0 (Poor/Not Likely) | 2=12% | 0=0% | 2=4% | 4=6% |
| TrelaRating | 75.88 → | 97.69 | 88.8 | 87.78 |

687

Do you have any comments you would like to share with management about your experience???

| | Today | Yesterday | 3 day totals | 7 day totals |
|---|---|---|---|---|
| Answered | 13=76% ⇧ → | 9=69% | 33=66% | 52=72% |
| Not Answered | 4=24% → | 4=31% | 17=34% | 20=28% |

| TRELA 360 | Auto Group | Notification Status (on) | John Smith ▼ |

691 — Social: Google

Google Rating: 4.2

★★★★★ "Excellent service here, I've bought 2 cars here, first car was an excellent experience, the second one not as great but quite good (due to a slightly aggressive sales man, not expected in general when buying a car). I always have my cars serviced here and the service quality is great. They don't waste my time, I have never been upcharged and the service personnel are always courteous. I recommend! - Eniola Suley ★★★★★ "Only visited one dealer, Toyota of Plano, since it was closest to home. Met with Peter Chou, never felt rushed or pressured. He was very knowledgeable and answered all of our questions about the car. He was patient and made us feel very comfortable during the entire process. Got a fair trade in value and good price on the new car. Spent a little longer time at the dealer than we wanted but Peter made sure the entire process moved forward as quickly as he could. Great job Peter and thank you!" - les tung 692 — ★★★★★ "Searching online, I found a low-mileage 2015 truck at Toyota of Plano that had the features my husband and I wanted. Salesman Wayne Brandon contacted us quickly after our initial inquiry. At the dealership, he took us for a test drive and helped us with the transaction. He was friendly, courteous, honest, and professional. It was the easiest and smoothest vehicle purchase we've ever made. - Beverly Peters ★★★★★ "A great buying experience! Brian did everything he could to make our purchase work. He was upfront, honest and I appreciate his integrity. We've had the Jeep for 3 weeks now and couldn't be happier." - Tina Ianni ★★★★★ "So due to a recall I had to bring my Toyota in for an airbag replacement, while the wait has been long the kindness and service here has been fantastic. Absolutely no hasle and they were very forth coming on how everything was going with the replacement part. They didn't have the part on hand so they sent someone to get from a shop and still got the replacement done today. I primarily worked with David in the service center who was so nice and helpful, I asked if they sold headphones and they don't but he happened to have a pair in his truck from his new phone and he just gave it to me. I have worked in retail for 10+ years and I know what true service is, and David goes far beyond the call of duty. Turned a potentially painfully long wait to tolerable with those headphones!" - Amanda Duke

FIG. 6J1

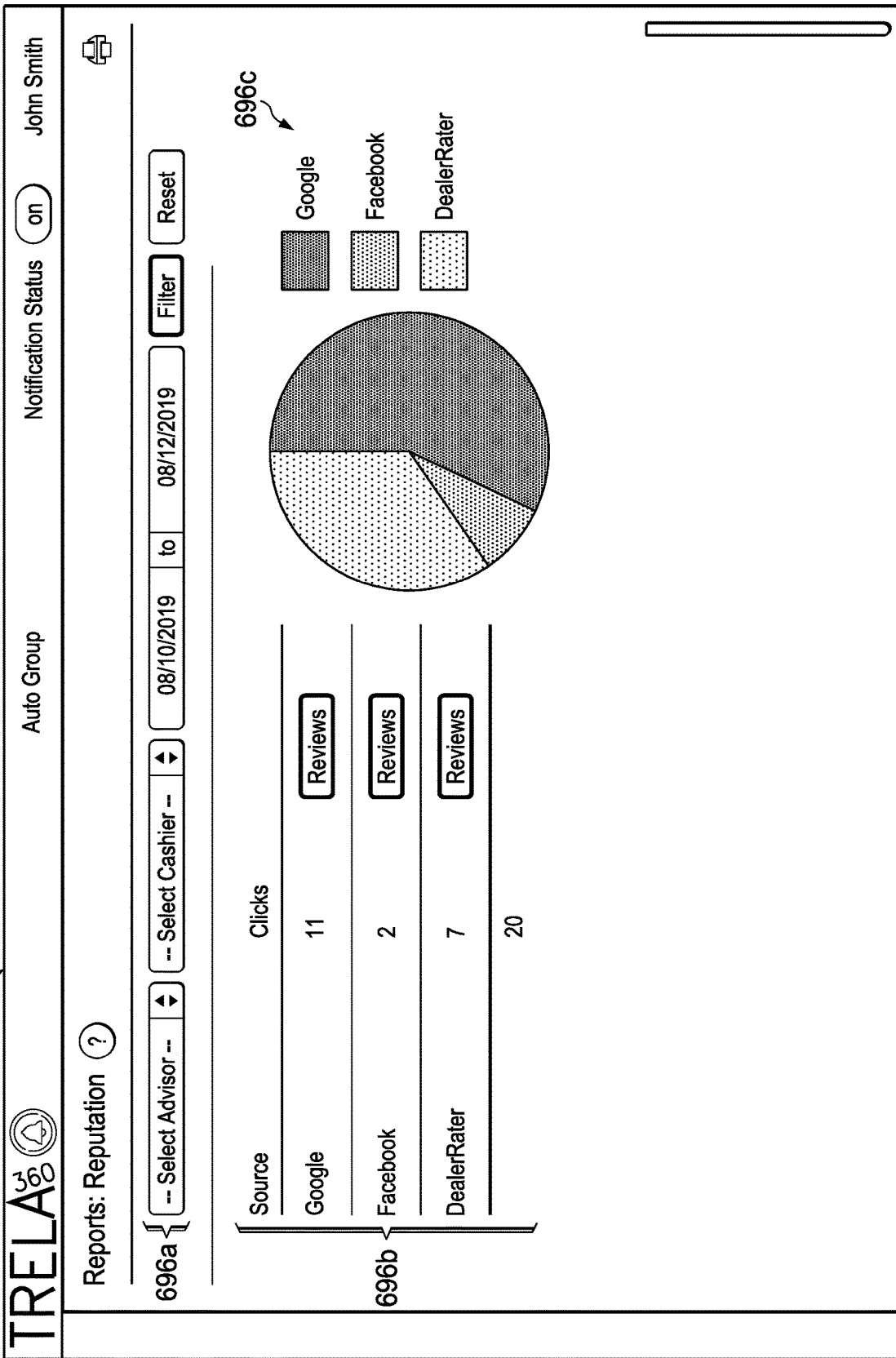
FIG. 6J2

FIG. 6K

TRELA 360

Trela Tech    John Smith ▼

Dealers (?)                                                    Add Group

| Acura | Edit |
| No dealers assigned to this group. | |

| Crest | Edit |
| No dealers assigned to this group. | |

| Ford | Edit |
| No dealers assigned to this group. | |

| Hyundai | Edit |
| No dealers assigned to this group. | |

| Nissan | Edit |
| No dealers assigned to this group. | |

| Other | Edit |
| No dealers assigned to this group. | |

| Toyota | Edit |
| No dealers assigned to this group. | |

| Unassigned | |
| Auto Group (Service Department, Sales Department) | |

Login 694
695

FIG. 7A1

TRELA 360   John Smith ▼

Reports: Trela Rating Details                                              << Back to Trela Rating Auto Group: Service Department 701a { -- Select Advisor -- ▲▼   -- Select Cashier -- ▲▼   [Filter] [Reset]

How would you rate your overall customer service experience?

| | Today | Yesterday | 3 day totals | 7 day totals |
|---|---|---|---|---|
| 10 (Excellent/Likely) | 84=75% ⇧ | 78=70% | 263=71% | 401=70% |
| 9 | 21=19% ➡ | 30=27% | 96=24% | 139=24% |
| 8 | 0 | 0=0% | 0=0% | 0=0% |
| 7 | 0 | 0=0% | 0=0% | 0=0% |
| 6 | 0 | 0=0% | 0=0% | 0=0% |
| 5 | 0 | 0=0% | 0=0% | 0=0% |
| 4 | 0 | 0=0% | 0=0% | 0=0% |
| 3 | 0 | 0=0% | 0=0% | 0=0% |
| 2 | 0 | 0=0% | 0=0% | 0=0% |
| 1 | 3=3% ⇧ | 2=2% | 12=3% | 19=3% |
| 0 (Poor/Not Likely) | 4=4% ⇧ | 1=1% | 7=2% | 14=2% |
| TrelaRating | 92.14 ⬇ | 94.77 | 93.12 | 92.15 |

701b covers rows 10 through TrelaRating

FROM FIG. 7A1

How would you rate your overall customer service experience?

702:
| | Today | Yesterday | 3 day totals | 7 day totals |
|---|---|---|---|---|
| 5 (Excellent) | 1=100% | 0 | 1=100% | 1=100% |
| 4 (Very Good) | 0 | 0 | 0=0% | 0=0% |
| 3 (Good) | 0 | 0 | 0=0% | 0=0% |
| 2 (Fair) | 0 | 0 | 0=0% | 0=0% |
| 1 (Poor) | 0 | 0 | 0=0% | 0=0% |
| Not Answered | 0 | 0 | 0=0% | 0=0% |

Are you likely to return for service in the future at J23 Auto Group?

703:
| | Today | Yesterday | 3 day totals | 7 day totals |
|---|---|---|---|---|
| Yes | 56=50% → | 60=54% | 207=52% | 294=51% |
| No | 56=50% ⇧ | 51=46% | 191=48% | 279=49% |

Do you have any comments you would like to share with management about your experience?

704:
| | Today | Yesterday | 3 day totals | 7 day totals |
|---|---|---|---|---|
| Answered | 0 | 0 | 0=0% | 0=0% |
| Not Answered | 1=100% | 0 | 1=100% | 1=100% |

If you would like, please enter your email address for special offers

705:
| | Today | Yesterday | 3 day totals | 7 day totals |
|---|---|---|---|---|
| Answered | 0 | 0 | 0=0% | 0=0% |
| Not Answered | 1=100% | 0 | 1=100% | 1=100% |

710

Español

Please answer 5 questions, Scroll & SUBMIT when done

1. How would you rate your overall customer service experience?

| 0 | 1 | 2 | 3 | 4 | 5 | 6 | 7 | 8 | 9 | 10 |

Poor/Not Likely                Very Likely/Excellent   }711

2. How would you rate your overall customer service experience?

| 1 | 2 | 3 | 4 | 5 |

Poor/Not Likely                Very Likely/Excellent   }712

3. Are you likely to return for service in the future at J23 Auto Group? }713

| No | Yes |

4. Do you have any comments you would like to ⟵714

Español

Auto Group
*Service Department*
*Advisor: Advisor 4*

Thank you Mr. Jordan for using Auto Group, we appreciate your business. We are always looking to improve our service so any feedback you could provide would be greatly appreciated.

1. How would you rate your overall customer service experience???

| 0 | 1 | 2 | 3 | 4 | 5 | 6 | 7 | 8 | 9 | 10 | }731

Poor/Not Likely                                             Very Likely/Excellent 1. Do you have any comments you would like to share with management about your experience???

}732

300 remaining

Submit

Auto Group
*Service Department*

In striving to improve our customer service, we would appreciate your Comments, Suggestions & Concerns.

Name: [_____] ⟵ 741

Advisor: [-- Select -- ▲▼] ⟵ 742

URGENT: [Yes] [No] }743

Comments: [_____] ⟵ 744
300 remaining

[Submit] ⟵ 745

TRELA 360

TRS Settings (?)

ZZZ Auto Dev    Notification Status (on)    Brett Bryan ▶

Activity Log

750

751 { DCS
Automatically add to TRS when the Customer answers:
*How would you rate your overall customer service experience?*
☐ 0 (Not Likely) ☐ 1 ☐ 2 ☐ 3 ☐ 4 ☐ 5 ☐ 6 ☐ 7 ☐ 8 ☐ 9 ☐ 10 (Likely)

752 { CRS
Automatically add to TRS when the Customer answers:
*How would you rate your overall customer service experience?*
☐ 0 (Unhappy) ☐ 1 ☐ 2 ☐ 3 ☐ 4 ☐ 5 ☐ 6 ☐ 7 ☐ 8 ☐ 9 ☐ 10 (Happy)

753 — [Save]

802
4. Would you allow us to buy back your vehicle for a new or used one?
Answer: No
5. Would you be interested in an extended warranty for your current vehicle?
Answer: No
6. Please confirm [[phone]] is your cell phone number?
Answer: Yes
7. Is your current email address [[email]]?
Answer: Yes CRS Follow-Up
Date Sent: 9/4/19 4:30pm
Date Completed: 9/4/19 4:31pm
Reminder Scheduled: 9/5/19 4:30am

803
1. How would you rate your overall customer experience?
Answer: 10
2. Was your service/repair work completed to your satisfaction?
Answer: 5
3. Would you like to leave a comment for management?
Answer: Not Answered

804
Reputation Clicks
Facebook - 9/4/19 4:36pm
Google - 9/4/19 4:36pm

805
Customer Messages:
Thank you very much!
Customer - 9/4/19 4:47pm
Hello. This is the Service Manager now. I'm sorry to hear that. Please bring back your car and we will wash it ASAP.
Ben Barns - 9/4/19 4:46pm

FROM FIG. 8A

FROM FIG. 8B

805 {
The car was not cleaned as promised.
Customer - 9/4/19 4:45pm
Hello. I am the Advisor. How can I help you?
Brett Bryan - 9/4/19 4:44pm Send Message 806 {
[ Send ]

Reminder Text message notifications need to follow TCPA Rules and not be used for marketing, solicitation, and/or promotional purposes.

807 {
Internal Notes
Please make sure to follow up on this
Brett Bryan - 9/4/19 4:36pm Add Note 808 {
[ Submit ]

METHOD FOR PROCESSING REAL-TIME CUSTOMER EXPERIENCE FEEDBACK WITH FILTERING AND MESSAGING SUBSYSTEMS AND STANDARDIZED INFORMATION STORAGE

CROSS REFERENCE TO RELATED APPLICATIONS

This application claims the benefit of United States Provisional Patent Application Nos. 62/730,433, filed Sep. 12, 2018 and; 62/815,933, filed Mar. 8, 2019, and is a continuation-in-part application claiming the benefit of U.S. patent application Ser. No. 15/887,265, filed Feb. 2, 2018, which is a continuation-in-part application claiming the benefit of U.S. patent application Ser. No. 15/569,309, filed Oct. 25, 2017, which claims priority to PCT Patent Application No. PCT/US2016/043733, filed Jul. 23, 2016, which claims the benefit of United States Provisional Patent Application Nos. 62/290,362, filed Feb. 2, 2016; 62/215,447, filed Sep. 8, 2015; 62/198,908, filed Jul. 30, 2015; and, 62/196,752, filed Jul. 24, 2015.

TECHNICAL FIELD OF INVENTION

This invention relates to a method for processing real-time customer experience feedback with filtering, notification, and messaging subsystems and standardized information storage.

BACKGROUND OF THE INVENTION

Customer service records and feedback information are often saved in a specialized format on local data processor and storage servers at a particular service provider facility, such as a car dealer service department or car dealership. While the customer service records and feedback information in that particular service provider facility may have a consistent format throughout that facility, the format for customer service records and feedback information used by other dealers and service providers at other service provider facilities (e.g. related dealers or national brand dealerships) is likely to be a non-standardized and inconsistent format for customer service records and feedback information.

The storage format for customer service records and feedback information can be composed of records, files and service information at each of these different service provider facilities may be stored locally on a data processor and storage in a non-standardized format selected by whichever hardware or software platform is in use in the service provider's local office. The inconsistency between stored customer service record formats makes sharing customer service records, files and service information over a standardized communication platform quite problematic. Because of the non-standardized customer service record formats used by different service provider facilities, there is a significant difficulty for service providers in different locations to identify customer issues and complaints, and anticipate customer future needs with certainty, as well as communicate with customers over a standardized communication platform.

Computers and computer networks have transformed the society and the work environment since their introduction in mass to the business community and the consuming public. The impact we see today on the way business is conducted and consumers interact with service providers and product retailers is rooted in the technological developments in the recent past. In the 1960s, the Defense Department developed a communication system that would permit communication between these different computer networks.

Recognizing that a single, the Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks. A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet. The IP standard identifies the types of services to be provided to users and specifies the mechanisms needed to support these services.

The IP standard also specifies the upper and lower system interfaces, defines the services to be provided on these interfaces, and outlines the execution environment for services needed in the system. A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

Mobile communications and cellular telephony systems have become smaller, lighter, and more powerful, which improved the ability to communicate with individuals on an exponential basis. The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

In the past, consumer feedback has been solicited well after the service or product has been provided to the consumer. The requests for feedback occur days and weeks after customer leaves the service provider or retail location. The ability to obtain constructive feedback, either good or bad, is lost by this lag time in the procurement of the feedback from the consumer. And, if the experience is negative, the opportunity to rectify the negative experience with personal attention to the consumer has been lost with the procurement of feedback days and weeks after the customer leaves the service provider or retail location.

When survey have been taken from consumers, the results of surveys have, in the past, been distributed to all employees in the organization. Not only is this survey information "stale" in the sense that it has been taken long after the consumer leaves the service provider or retail location, but the information is largely ignored in a mass of information being provided in a generic manner to an entire group.

Several patents show traditional methods of obtaining survey information, such as U.S. Pat. No. 7,609,832 issued on Oct. 27, 2009 (Patent Publ. No. 2005/0100158A1, published May 12, 2005) to Kreiner, which shows an automatic call center with an interactive voice response system that supports the administration of a survey to a client in communication with the call agent station. The Kreiner system administers a survey to a client when the client has been called by the system and is on-the-line, which is the manner on collecting survey information from the client. Similarly, there are many call center screening survey systems shown in U.S. Pat. No. 8,085,910 issued to Verizon Corporate Services Group, Inc. on Dec. 27, 2011; U.S. Pat. No. 8,386,623 issued to American Express Travel Related Services Co. on Feb. 26, 2013; U.S. Pat. No. 8,494,134 issued to BCE, Inc. on Jul. 23, 2013; U.S. Pat. No. 8,515,803 issued to 3Pd, Inc. on Aug. 20, 2013; U.S. Pat. No. 8,516,076 issued to American Express Travel Related Services on Aug. 20, 2013; U.S. Pat. Nos. 8,650,315, 8,650,316, 8,650,317, 8,650,318, and 8,650,319 issued to American Express Travel Related Services on Feb. 11, 2014.

These prior art methods and systems fail to provide an optimized solution for known deficiencies in known systems. That is, these prior art methods and systems do not provide an operational efficiency, consumer expectation, and business strategy to optimize customer retention and satisfaction with products and services provided by a business. These systems, by and large, trigger and conduct an automated survey to collect survey information from a client, but there is a need to utilize this survey information in a better manner so that businesses can better preserve client relationships at the service provider or retail location.

There is no present system that satisfactorily correlates and associates various customer data provided during stages of surveys and during associated requests for feed-back to provide integrated notifications and notices, as well as integrated data sharing, to team members, associates, dealers, department members, and any other associated or affiliated person. The inconsistency between stored customer service record formats makes sharing customer service records, files and service information over a standardized communication platform is not solved by these prior art references. And, none of these prior art references support a standardized customer service record format that can be used by different service provider facilities, which means these prior art references fail to solve the significant difficulty for service providers in different locations to identify customer issues and complaints, and anticipate customer future needs with certainty, as well as communicate with customers over a standardized communication platform.

SUMMARY OF THE INVENTION

The present invention is a hardware-based system and method that supports the entry of customer experience feedback into the system in a standardized format, which also conducts real-time automated filtering and evaluation of feedback entered by the customer and supports the transmission of real-time notifications to selected personnel based on feedback evaluation in a flexible messaging and workflow system. The present invention correlates and associates various customer data provided during stages of surveys and during associated requests for feed-back to provide integrated notifications and notices, as well as integrated data sharing, to team members, associates, dealers, department members, and any other associated or affiliated person.

The present invention is a hardware processor-based customer service feedback system and method having an indexing and referential storage of customer service information, and a system and method that collects, converts and consolidates customer service information from customer service provider facilities and customers into a standardized format, including converting input customer service information, files and customer service information provided by different providers or sources in a particular facility and from different formats into that standardized format. Whenever the customer service information is updated, it will be converted into a standardized format and then stored in the collection of customer service records on one or more of the hardware processor-based storage devices.

After the information about the customer service has been stored in the collection, the content server, which is connected to the hardware processor-based storage devices, generates real-time messages containing updated customer service information. This message is transmitted in a standardized format over the data processor and storage network to the relevant customer to elicit feedback information and communications from the customer.

The message transmitted to the customer or received by the hardware-based system can be in the form of an email message, text message, or other type of message known in the art. The present invention system and method uses standardization of formatted customer service information to enhance the performance and increases the efficiency of the present invention over known data processor and storage methods and systems through the storage of standardized formatted customer service information from input customer service information, files and customer service provided information in the hardware processor-based customer service system and method, as well as the use of an indexing and referential storage and specialized subprograms that uses hardware processor-based storage devices to collect and consolidate customer service information, files and customer service information provided by to different customers and different feedback from these customers on the service provider experiences.

The present invention uses the hardware processor-based customer service system and method having an indexing and referential storage and specialized subprograms to enter and display customer service provider experiential feedback information and data with real-time automated filtering and evaluation of customer service information and data, the transmission of real-time notifications to personnel at customer service provider facility based on feedback content with flexible messaging and workflow subsystems and subprograms, as well as communications and analysis of follow-up survey evaluations. This invention relates to the entry of customer experience feedback with real-time automated filtering and evaluation of feedback and the transmission of real-time notifications to selected personnel based on feedback evaluation.

The present invention generates real-time messages to transmit electronic communications to customer service providers, facilities, and customers using the hardware processor-based customer service system and method having an indexing and referential storage and specialized subprograms, and to identify the customer service providers or departments, facilities, and customers that need attention or have an issue with their customer service provider experience.

The present invention data storage system and method enhances the performance and increases the efficiency of the present data processor and storage system using a hardware processor over known data processor and storage methods and systems by the use of an indexing and referential storage and specialized subprograms to detect customer service problem issues to be resolved, generates/transmit notifications about customer service problem issues to be resolved, and generates/transmits notifications to customers about such resolution procedures; in addition to the requesting and receiving further feedback and follow-up customer service feedback to assure any customer service issue has been resolved to the satisfaction of the customer and customer service provider.

The present invention supports that ability to obtain constructive feedback, either good or bad, regarding a customer's experience while the customer is still at the service provider or retail sales location. And, if the experience is negative, the invention provides automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location.

Identity information relating to the customer can also be preserved so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience.

The following system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location.

Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. The real-time notifications to said selected personnel include customer background information, survey results, service provider information and services provided to the customer. This ordered sequence of steps 1-4, with and without the addition of the subsequent location recognition steps, is believed to be novel in that the ordered combination of steps transforms the claims into patent-eligible subject matter.

In the present invention (which can be referred to as the Direct Customer Survey or "DCS"), the present invention also includes additional system components, steps and functionality individually are believed to be novel and enhance the operation of the computer system over that of a generic computer system, including the components, steps and functionality relating to: (1) the initiation, implementation of filtering and identification of responses and survey answers from the Direct Customer Survey (DCS); (2) the initiation, implementation, execution, and operation of a Customer Response (or "CRS") service, protocol system and method, either prompted based on responses to DCS survey questions, automatically initiated, or manually initiated by program users or service personnel; (3) the initiation, implementation of filtering and identification of responses and survey answers from the Customer Response Service (CRS); (4) the initiation, implementation, execution, and operation of a Comments, Suggestion and Concerns (or "CSC") service, protocol system and method, either prompted based on responses to DCS and/or CRS survey questions, automatically initiated, or manually initiated by program users or service personnel; (5) the initiation, implementation of filtering and identification of responses and survey answers from the Comments, Suggestion and Concerns service (CSC), and (6) the initiation, implementation, execution, and operation of an authenticated survey rating service (or "TRS") that receives marked survey responses received from the filtering and identification protocols related to the DCS, CRS and/or CSC subsystems, adjusts the scores from those received and marked responses to a normalized measure, calculates an overall TRS rating score from the customer that is associated with the customer's response, and transmits or posts the TRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system.

The TRS rating service provides authenticated ratings from known, actual customers, which enhances the reliability and accuracy of the responses over other systems that solicit and receive rating responses from unknown sources that can provide flawed or inaccurate ratings relating to services or products that were never actually purchased or received. The CRS system may use responses and feedback provided by the DCS system or be executed automatically independent from such DCS feedback responses, or be manually executed independent from such DCS feedback responses. Likewise, the CSC system may use responses and feedback provided by the DCS and/or the CRS system or be executed automatically independent from such DCS and/or CRS feedback responses, or be manually executed independent from such DCS and/or CRS feedback responses. And, TRS rating service subsystem may use filtered or identified responses from one or more of the DCS system, the CRS system and/or the CSC system, individually or collectively. And, the CRS and/or CSC subsystems may act independently from each other, or alternatively, rely on information received from the other systems and subsystems such that each protocol and service can be initiated and executed based on responses received from other systems and subsystems, or automatically initiated independent of other protocols/services, or manually initiated by personnel independent of other protocols/services.

As additional components, functionality and steps used in this system, the present invention provides for the preparation and revision of standard or individualized feedback evaluation questions by authorized users, with flexible assignment of these evaluation questionnaires for specific members of companies, teams, users, or groups providing services or products or entire groups of users, teams or companies. And, the present invention provides for the flexible assignment of team members, users, and companies, as well as the preparation and transmission of messaging to entire team members, users, groups and companies or specific members of teams, users, companies, and groups. These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, benchmark information and trending information can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

Moreover, the sequence of steps ordered in Direct Customer Survey or "DCS", alone or in combination with the additional system components, steps and functionality individually associated with the Customer Response Service ("CRS"), the Comments, Suggestion and Concerns service ("CSC"), and the TRS authenticated survey rating service believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems. While the preferred embodiment describes a car dealership/service department scenario, the present invention could be used in any retail service situation (or retail sales of goods).

Moreover, the claimed invention is an improved systems and method that recites components or a series of steps. The claimed invention is also directed to enhancing the performance and efficiency of a data processor and storage system and network through the conversion and storage of standardized formatted customer service information from input information, files and service information in the hardware processor-based customer service system and method and the use of an indexing and referential storage and specialized subprograms that uses hardware processor-based storage devices to collect and consolidate customer service information, files and service information provided by different sources and different formats. Moreover, the present invention uses an indexing and referential storage and specialized subprograms to generates/transmits notifications to customers and relevant personnel at the customer service facility, and generates/transmits follow-up evaluations and notifications to customers and customer service facility personnel.

Because the present invention is not an abstract concept, a fundamental economic practice, a method of organizing human activity, an idea (standing alone), or a mathematical relationship, the present invention is not an abstract idea. Even if one were to examine whether statutory subject matter analysis (post-Alice) were satisfied (which is not necessary based on the above), the present invention complies with the "Integrated into a Practical Application" requirement analysis (post-Alice) because the claimed invention recites a combination of additional elements including storing information in a centralized repository server, providing remote access over a network to a centralized web-based server, converting updated customer service information, customer files and service information that was converted into a standardized format, automatically generating messages and eliciting feedback from customers, evaluating that feedback, and following up with the customers by transmitting "real-time" messages. With these above-identified "additional elements," the claimed invention as a whole integrates the present method into a practical application; and, specifically, the additional elements set forth above recite specific improvements over prior art systems and methods by allowing users to share information in real time in a standardized format regardless of the format in which the information was input by the user.

Thus, the claim is eligible because it is not directed to the recited judicial exception of an abstract idea. As noted previously, the claim as a whole does not merely describe generally a method of organizing human activity. But, even when viewed as a whole, the claim adds significantly more (i.e., an inventive concept) to any generalized method. Accordingly, this invention is not simply implementing an abstract idea on a generic computer, but even if viewed as a generalized method, the claimed invention includes additional elements that make the claimed invention a practical application. For these reasons, present invention complies with the 35 USC § 101 (utility) requirements for patentable subject matter under the current multi-step analysis.

The claimed invention recites a method comprising the steps of: receiving customer service information describing service provided to a customer and customer identification information at a hardware data processor coupled to a plurality of non-transitory storage devices and one or more input/output ports that are coupled to one or more input/output devices, said hardware data processor capable of execution of one or more subprograms; converting said customer service information into a standardized data format using a hardware data processor coupled to a plurality of non-transitory storage devices; storing said customer service information in said standardized format in one or more of said plurality of non-transitory storage devices using said hardware data processor; transmitting electronic communications to one or more customers about said customer service information stored in said standardized format in one or more of said plurality of non-transitory storage devices; receiving at said hardware data processor a first set of customer experience feedback responses provided by a customer using said first mobile unit in response to a first survey request; evaluating said customer experience feedback responses at said hardware data processor from a first survey request on a real-time basis in order to determine whether to issue real-time notifications to one or more predetermined personnel if the first set of customer experience feedback responses fail to satisfy a minimum predetermined standard, issuing at said hardware data processor one or more real-time notifications to said predetermined personnel to notify those one or more predetermined personnel that the first set of customer experience feedback responses from said first survey request fail to satisfy a minimum predetermined standard, receiving at said hardware data processor a second set of customer experience feedback responses provided by said customer using said first mobile unit in response to a second follow-up survey request; evaluating at said hardware data processor said second set of customer experience feedback responses from said second follow-up survey request on a real-time basis in order to determine whether to issue real-time notifications to one or more predetermined personnel if the second set of customer experience feedback responses fail to satisfy a minimum predetermined standard, issuing at said hardware data processor one or more real-time notifications to said predetermined personnel to notify those predetermined personnel that the second set of customer experience feedback responses from said second follow-up survey request fail to satisfy a minimum predetermined standard, and, preparing at said hardware data processor one or more reports on the first and second sets of customer experience feedback responses from said first survey request and said second follow-up survey request.

The invention recites a method comprising the steps of: receiving at said hardware data processor a first set of customer experience feedback responses provided by a customer using said first mobile unit in response to a first survey request at a hardware data processor coupled to a plurality of non-transitory storage devices and one or more input/output ports that are coupled to one or more input/output devices, said hardware data processor capable of execution of one or more subprograms; evaluating at said hardware data processor said customer experience feedback responses from said first survey request on a real-time basis in order to determine whether to issue real-time notifications to one or more predetermined personnel if the first set of customer experience feedback responses fail to satisfy a minimum predetermined standard, issuing at said hardware data processor one or more real-time notifications to said predetermined personnel to notify those one or more predetermined personnel that the first set of customer experience feedback responses from said first survey request fail to satisfy a minimum predetermined standard, transmitting from said hardware data processor a second follow-up survey request to said customer; receiving at said hardware data processor a second set of customer experience feedback responses provided by said customer using said first mobile unit in response to a second follow-up survey request; evaluating at said hardware data processor said second set of customer experience feedback responses from said second follow-up survey request on a real-time basis in order to determine whether to issue real-time notifications to one or more predetermined personnel if the second set of customer experience feedback responses fail to satisfy a minimum predetermined standard, issuing at said hardware data processor one or more real-time notifications to said predetermined personnel to notify those predetermined personnel that the second set of customer experience feedback responses from said second follow-up survey request fail to satisfy a minimum predetermined standard; transmit a follow-up reminder to said customer with notification about a future survey request; and preparing at said hardware data processor one or more database reports on the first and second sets of customer experience feedback responses from said first survey request and said second follow-up survey request, respectively.

The method of the invention further recites initiating at said hardware data processor a comments, suggestions and concerns subroutine that provides a comments, suggestions and concerns platform for said customer at the mobile unit to enter comments, suggestions or concerns about the customer's experience, receiving at said hardware data processor scores associated with responses from said customer to one or more marked questions on said first survey request or said second follow-up survey request, said one or more marked questions on said first survey request or said second follow-up survey request are designated in that manner by the user, team member or associate, evaluating at said hardware data processor the scores associated with responses from said customer to one or more marked questions on said first survey request or said second follow-up survey request, translating at said hardware data processor written statement responses into rating scores based on associated with responses from said customer to one or more marked questions on said first survey request or said second follow-up survey request, and calculating at said hardware data processor a rating score based on the evaluation of the scores associated with responses from said customer to one or more marked questions on said first survey request or said second follow-up survey request.

The method of the invention further recites normalizing at said hardware data processor the scores associated with responses from said customer to one or more marked questions on said first survey request or said second follow-up survey request, translating at said hardware data processor ratings of 0 to n stars based on normalized scores of calculated rating scores associated with responses from said customer to one or more marked questions on said first survey request or said second follow-up survey request, where n is an integer, transmitting at said hardware data processor the normalized scores of calculated rating scores associated with responses from said customer to one or more marked questions on said first survey request or said second follow-up survey request to a website, electronic bulletin board, or chat room for posting, and transmitting at said hardware data processor any social media links to the customer with the normalized scores of calculated rating scores associated with responses from said customer to one or more marked questions on said first survey request or said second follow-up survey request.

BRIEF DESCRIPTION OF THE DRAWINGS

The objects and features of the invention will become more readily understood from the following detailed description and appended claims when read in conjunction with the accompanying drawings in which like numerals represent like elements and in which:

FIGS. 3A-3C, 3C1, 3C2, 3D, 3E, 3F, 3G and 3H are screen displays for different types of mobile units as generated according to the present invention, FIGS. 5A-5D, 5D1, 5D2, 5E, 5E1, 5E2, 5F, 5F1, 5F2, 5G, 5H, 5I, 5J, 5K, 5L, 5M, 5M1 and 5N show the screen displays for a mobile unit or a desktop unit as generated according to the present invention, FIGS. 6A, 6B, 6B1, 6C, 6D, 6D1, 6D2, 6D3, 6D4-1, 6D4-2, 6E, 6F, 6G1, 6G2, 6G3, 6G4, 6H, 6H1, 6I1, 6I2, 6I3, 6I4, 6J, 6J1, 6J2, 6K, and 6L show the screen displays for a mobile unit or a desktop unit as generated according to the present invention; and, FIGS. 7A1, 7A2, 7B, 7C, 7D, 7E, 7F and 7G show the screen displays for a mobile unit or a desktop unit as generated according to the present invention.

FIGS. 8A, 8B and 8C shows a screen compilation of data in a DCS Live record.

The objects and features of the invention will become more readily understood from the following detailed description and appended claims when read in conjunction with the accompanying drawings in which like numerals represent like element.

DETAILED DESCRIPTION

Figure 1A:
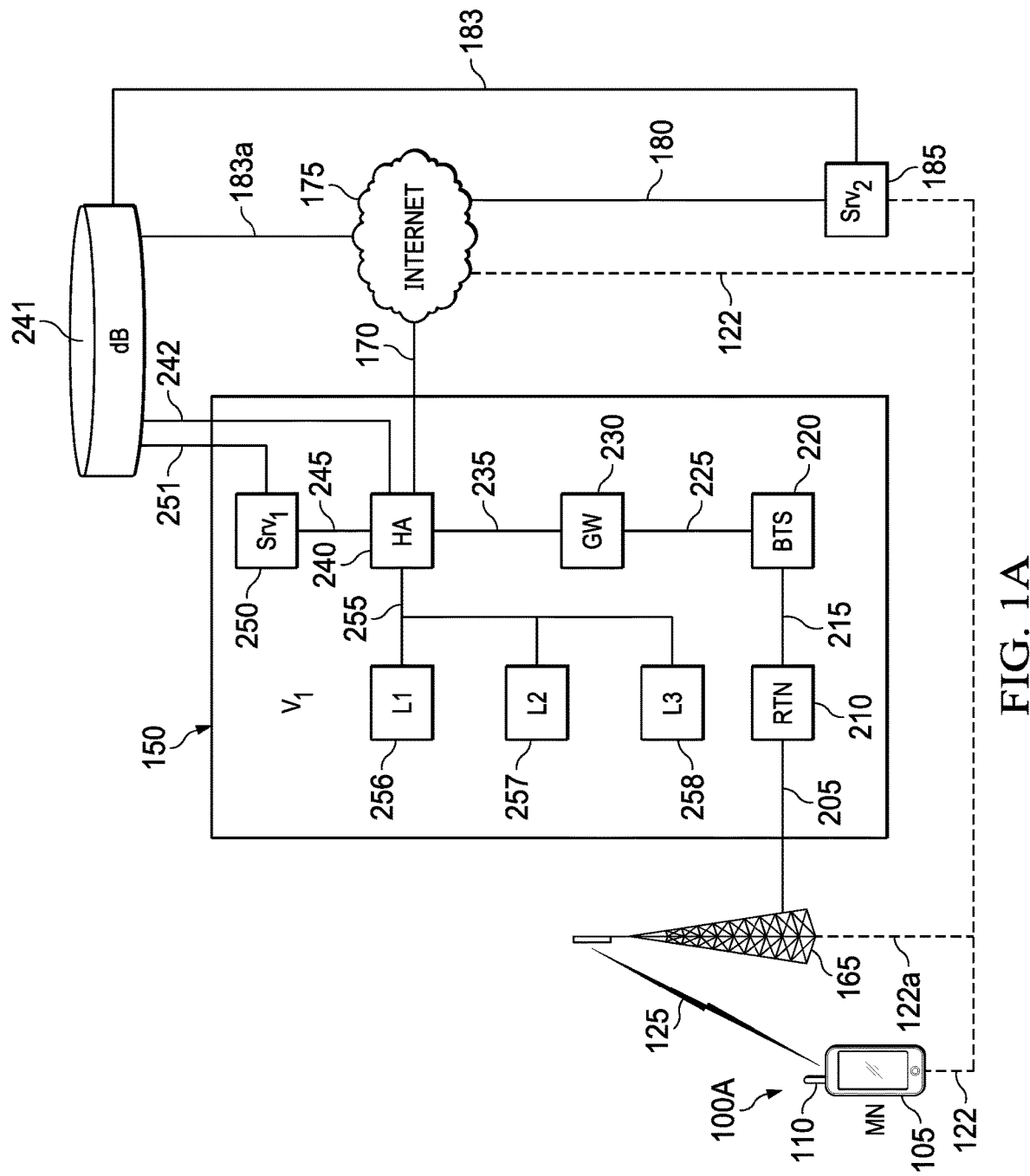
FIGS. 1A-1C are block diagrams showing system components used with the present invention.
Figure 1B:
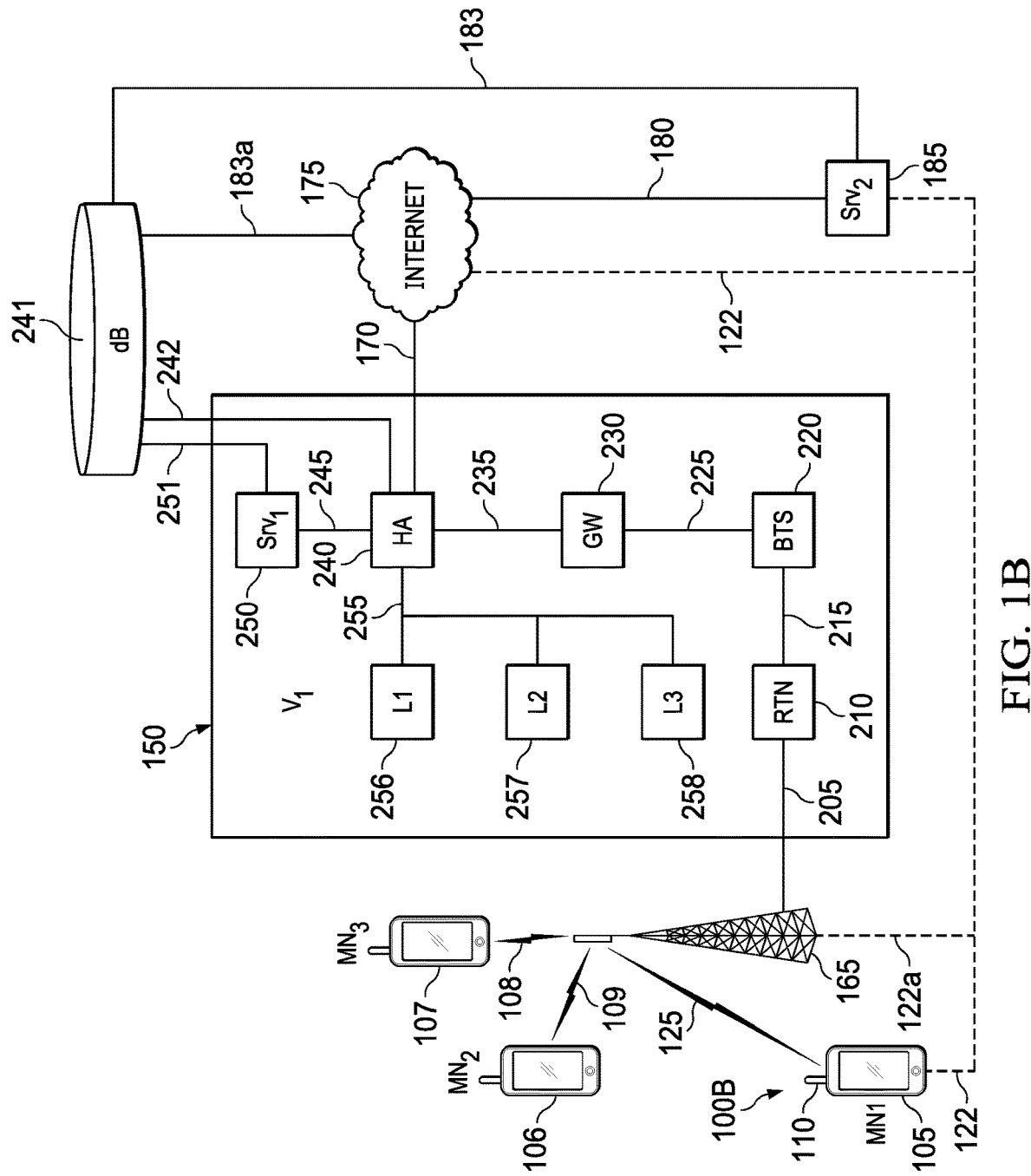
Figure 1C:
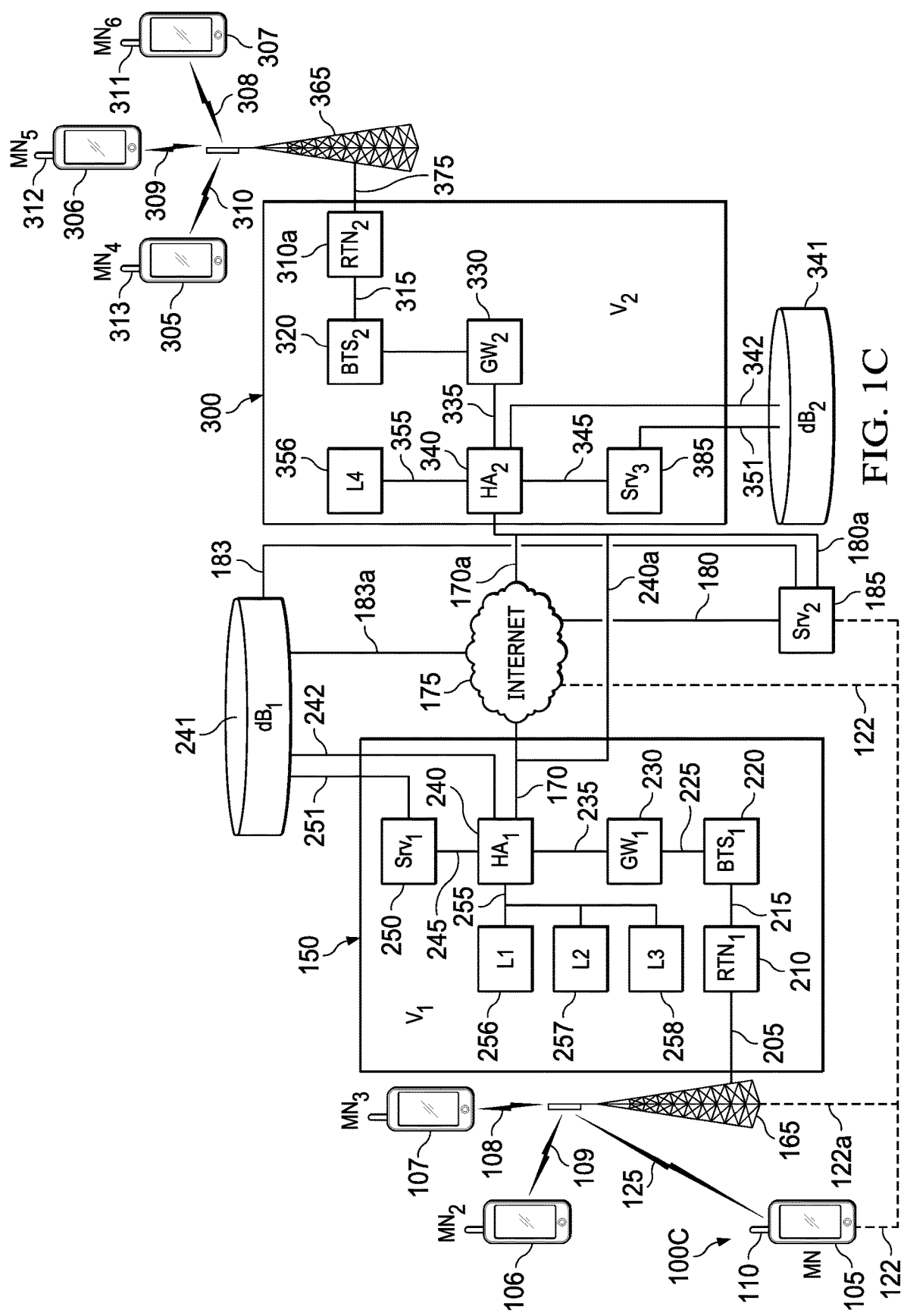

The present invention in FIGS. 1A-1C is a specialized hardware processor-based system and method, which includes specialized data processor and storage readable medium and subprograms that are not available in a generic computer device, even though a user/provider accesses the system through a standard web browser on a computing device or client connected to the Internet or single or multi-tier network. The system and method provides a graphical user interface (GUI) by a content server, which is hardware or a combination of both hardware and software.

A user, such as a customer or a customer service provider, can be given remote access through the GUI to view or update information about customer service experience and feedback, communications relating to that experiential feedback, and communications regarding any resolution of an adverse customer service experience using a local device (e.g., a personal data processor and storage or wireless handheld device). When a user wants to update the records, the user can input the update in any format used by the user's local device.

The present invention is a system comprising a hardware data processor coupled to a plurality of non-transitory storage devices and one or more input/output ports coupled to one or more input/output devices, said hardware data processor capable of execution of one or more subprograms, said hardware data processor receives through said input/output port customer service information describing work performed, satisfaction of the customer, issues with customer service provided, and resolution of any such issues, said hardware data processor execution a first subprogram that converts said customer service information into a standardized data format using a hardware data processor coupled to a plurality of non-transitory storage devices, said hardware data processor stores said customer service information in said standardized format in one or more of said plurality of non-transitory storage devices; and said hardware data processor transmits an electronic communication through said input/output ports to one or more customers, facility personnel and/or customer service facilities about said customer service information stored in said standardized format in one or more of said plurality of non-transitory storage devices.

The file data storage system and method, as well as the standardization of formatted customer service information, in the present invention enhances the performance and increases the efficiency of the present invention over known data processor and storage methods and systems through the storage of standardized formatted customer service information from input customer service information, files and customer service information in the hardware processor-based system and method and the use of an indexing and referential storage and specialized subprograms that uses hardware processor-based storage devices to collect and consolidate customer service information, files and service information provided by different sources and different formats.

Additionally, the input/output port provides remote access to said customer service information via a graphical user interface coupled to said hardware data processor that is coupled to one or more of said plurality of non-transitory storage devices so that said customer service information can be accessed and modified into a modified customer service information that reflects updated customer satisfaction and/or condition; and, said hardware data processor coupled to said one or more of said plurality of non-transitory storage devices makes a first data modification determination by execution of a third subprogram if the customers follow-up evaluation communication exhibits a persistent customer satisfaction issue that remains to be resolved by the service provider.

The present invention is shown by block diagrams in FIGS. 1A-1C is a communication system supporting the processing communications between a home agent network and one or more mobile units, where the home network has a home agent coupled to a computer server. The home network processes communications to be transmitted and received from one or more mobile units, and a transceiver unit is coupled to say home agent network for receiving and transmitting communications to said mobile unit. The home network processes communications to and from said mobile unit, and information related to the mobile nodes location and proximity can be used to include selected communications that possess information and data relating to specific products or ordering information. The present invention correlates and associates various customer data provided during stages of surveys and during associated requests for feed-back to provide integrated notifications and notices, as well as integrated data sharing, to team members, associates, dealers, department members, and any other associated or affiliated person.

The home network can communicate via wireless transmission or a wired communication link to the mobile node, the Internet, other computer servers or other foreign or associated home networks. Each of the home network embodiments shown in FIGS. 1A-1C support a Wi-Fi connection (or similar mobile network connection) that allows the pushing of data onto the hand-held mobile device. The invention can use the device's Wi-Fi or cellular connection to activate notification message to selected personnel based on the mobile unit's geographic location or proximity to the service provider or retail sales location.

The networks shown in FIGS. 1A-1C support the entry of customer experience feedback into the system, which these systems conduct real-time automated filtering and evaluation of feedback entered by the customer as well as transmission of real-time notifications to selected personnel based on feedback evaluation in a flexible messaging and workflow system. The real-time notifications to said selected personnel include customer background information, survey results, service provider information and services provided to the customer. These networks support the ability to obtain constructive feedback, either good or bad, regarding a customer's experience while the customer is still at the service provider or retail sales location. And, if the experience is negative, the invention embodied in these networks provide automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location.

Identity information relating to the customer can also be preserved in the networks so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. While the preferred embodiment describes a car dealership/service department scenario, the present invention could be used in any retail service situation (or retail sales of goods).

The following system components, steps and functionality shown in FIGS. 1A-1C individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location.

Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. This ordered sequence of steps 1-4, with and without the addition of the subsequent location recognition steps, is believed to be novel in that the ordered combination of steps transforms the claims into patent-eligible subject matter.

In addition to the above-described invention referenced in steps 1-4 (which can be referred to as the Direct Customer Survey or "DCS"), the present invention can be performed on the system shown in FIGS. 1A-1C with additional system components, steps and functionality individually are believed to be novel and enhance the operation of the computer system over that of a generic computer system, including the components, steps and functionality relating to: (1) the initiation, implementation of filtering and identification of responses and survey answers from the Direct Customer Survey (DCS); (2) the initiation, implementation, execution, and operation of a Customer Response (or "CRS") service, protocol system and method, either prompted based on responses to DCS survey questions, automatically initiated, or manually initiated by program users or service personnel; (3) the initiation, implementation of filtering and identification of responses and survey answers from the Customer Response Service (CRS); (4) the initiation, implementation, execution, and operation of a Comments, Suggestion and Concerns (or "CSC") service, protocol system and method, either prompted based on responses to DCS and/or CRS survey questions, automatically initiated, or manually initiated by program users or service personnel; (5) the initiation, implementation of filtering and identification of responses and survey answers from the Comments, Suggestion and Concerns service (CSC), and (6) the initiation, implementation, execution, and operation of an authenticated survey rating service (or "TRS") that receives marked survey responses received from the filtering and identification protocols related to the DCS, CRS and/or CSC subsystems, adjusts the scores from those received and marked responses to a normalized measure, calculates an overall TRS rating score from the customer that is associated with the customer's response, and transmits or posts the TRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system.

The TRS rating service provides authenticated ratings from known, actual customers, which enhances the reliability and accuracy of the responses over other systems that solicit and receive rating responses from unknown sources that can provide flawed or inaccurate ratings relating to services or products that were never actually purchased or received. The CRS system may use responses and feedback provided by the DCS system or be executed automatically independent from such DCS feedback responses, or be manually executed independent from such DCS feedback responses. Likewise, the CSC system may use responses and feedback provided by the DCS and/or the CRS system or be executed automatically independent from such DCS and/or CRS feedback responses, or be manually executed independent from such DCS and/or CRS feedback responses. And, TRS rating service subsystem may use filtered or identified responses from one or more of the DCS system, the CRS system and/or the CSC system, individually or collectively. And, the CRS and/or CSC subsystems may act independently from each other, or alternatively, rely on information received from the other systems and subsystems such that each protocol and service can be initiated and executed based on responses received from other systems and subsystems, or automatically initiated independent of other protocols/services, or manually initiated by personnel independent of other protocols/services.

Additionally, components, functionality and steps supported by these networks shown in FIGS. 1A-1C include the preparation and revision of standard or individualized feedback evaluation questions by authorized users, with flexible assignment of these evaluation questionnaires for specific members of companies, teams, users, or groups providing services or products or entire groups of users, teams or companies. And, the networks shown in FIGS. 1A-1C provide for the flexible assignment of team members, users, and companies, as well as the preparation and transmission of messaging to entire team members, users, groups and companies or specific members of teams, users, companies, and groups.

These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, the networks shown in FIGS. 1A-1C provide benchmark information and trending information that can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

With reference of FIG. 1A, the communication system 100A of the present invention is shown with a detailed explanation of the system components available at the home network 150 as coupled via communication line 205 to the mobile radio transceiver/cellular/WIFI systems 165 as coupled to mobile node 105. The mobile node 105 includes a hand-held mobile unit 105 that includes a processor, memory and a power source, as well as a transceiver and antenna 110. While a mobile unit is contemplated, lap top, fixed location computers, or computer pads can also be used instead and freely substituted with the mobile unit 105.

The transceiver and antenna 110 supports radio transmission communications link 125 to an radio transceiver antenna and transmission network 165 (e.g. Wi-Fi, cellular, GSM, Evdo, 4G/LTE, CDMA, or others), which is coupled via connection 205 to a radio transmission network communication gateway 210 associated with the home network 150. The mobile hand-held unit 105 may also be connected to an outside server computer SRV2 185 via a separate connection 122, which can include a wireless radio connection or a wireline communication system connection. The mobile hand-held unit 105 may also be connected to the Internet 175 via the communication link 180 through outside server computer SRV2 185 or via a separate direct connection 122, which can include a wireless radio connection or a wireline communication system connection.

The mobile hand-held unit 105 can also be coupled to the radio transceiver antenna 165 and a radio transmission network that is coupled to a telecommunications system that supports connectivity 122a to the Internet 175 or another system network without interfacing directly with equipment or components in the home network 150.

The radio transmission network 210 is coupled to a base station transceiver unit 220 via connection 215, where the base station transceiver station provides an interface between radio domain communications and data communications carried over a telecommunications or network computer system. The base station transceiver unit 220 is coupled to a gateway 230 for the network at the home network 150 via connection 225, which provides an interface with the network maintained at the home network 150 or associated with the home network 150. The BTS 220 may also be located remotely from the home network near the remote radio transmission network 165 accessed by the mobile unit 105.

The gateway 230 is coupled to a home agent 240 via connection 235, where the home agent 240 controls communication flow and directions on the network maintained at the home network 150 or in a network associated with the home network 150. The home agent 240 is coupled to a computer server SRV1 250 via connection 245, which maintains past historical and present real-time information, software module, operations software, or other data that may be used or communicated using the invention. The invention contemplates centrally located servers to maintain the software modules and database information at the home network 150 that maintain or provide access to information related to the home network 150, but remotely located servers and computer networks can also be accessed and used with the invention.

The home agent 240 is coupled to the Internet 175 via a connection 170, and the Internet 175 may be coupled to one or more servers SRV2 185 via connection 180. The mobile hand-held unit 105 may also be connected to SRV2 185 via a separate connection 122, which can include a wireless radio connection or a wireline communication system connection. A database 241 is coupled to the home agent 240 via communication link 242 or computer server 250 via link 251 or computer server SrV2 185 directly via link 183 or indirectly through the Internet 175 via communication links 183*a* and 180. The database 241 may maintain information related to the customers, users, groups, team members, or companies, but it could also maintain remote access to software modules and database information used with the software operated by the present invention as well as database information related the business operations. While only one database 241 is shown, this representation is understood to include one or more separate databases and storage locations of data and information.

The file data storage database 241 in FIG. 1A stores data in a standardized format for customer service information, and that format in the present invention enhances the performance and increases the efficiency of the present invention over known data processor and storage methods and systems through the storage of standardized formatted customer service information from input customer service information, files and customer service information in the hardware processor-based system and method and the use of an indexing and referential storage and specialized subprograms that uses hardware processor-based storage devices to collect and consolidate customer service information, files and service information provided by different sources and different formats.

The database 241 in the present system and method enhances the performance and increases the efficiency of the present data processor and storage system network over known data processor and storage methods and systems by the use of an indexing and referential storage. The database 241 is used with the specialized subprograms to generate/transmit notifications, as well as generate/transmit and receive customer feedback notifications and messages. The present invention stores data in the database 241 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

The home agent is also coupled via connection 255 to various locations L1 256, L2 257, and L3 258 at home network 150 so that operations software, data, customer evaluations, notifications or other information can be entered, transmitted or received on the system and controlled by users at the business location. Customers, users and controllers at the home network location may also access the home network 150 remotely via communication links and wireless communication links or mobile units.

The mobile unit 105 represents a mobile unit used by the customer to prepare and enter the customer feed-back evaluation information. Communications to the system, customer evaluation, requests for information, or notifications can be received by the customer from remote access locations or the home network using the hand-held mobile unit 105 as connected to the home network 150.

The computer server SrV1 250 on the home network 150 also supports the maintenance and use of data, customer information, software modules and operational code for the present invention, as well as maintaining the webpages that support the applications program download for the present invention, and supporting the interaction of communications with the mobile unit 105 and database 241. The Internet 175 can also maintain server computers, cloud storage, or server for maintaining database information, code, software modules, or the webpages that support the applications program download for the present invention, as well as supporting the interaction of communications with the mobile unit 105 or database 241. Furthermore, home network 150 or the computer server SRV2 185 can facilitate or assist with the maintenance of database information, code, software modules, or the webpages that support the applications program download for the present invention, as well as supporting the interaction of communications with the mobile unit 105 or database 241.

With reference of FIG. 1B, the communication system 100B of the present invention is shown with a detailed explanation of the system components available at the home network 150 as coupled via communication line 205 to the mobile radio transceiver/cellular/WIFI systems 165 as coupled to mobile nodes 105, 106 and 107. The mobile nodes 105, 106, and 107 includes a hand-held mobile unit 105, 106 and 107 that includes a processor, memory and a power source, as well as a transceiver and antenna. While a mobile unit is contemplated, lap top, fixed location computers, or computer pads can also be used instead and freely substituted with the mobile unit 105, 106 and 107. All the other system components shown in FIG. 1B are similar to, and possess the same functionality, as the system components shown in FIG. 1A, which is incorporated herein by reference.

More notably, multiple mobile nodes 106 and 107 are shown connected to the home network 150 via connections 109 and 108, respectively, to the mobile radio transceiver system 165. These additional mobile nodes support the use of the wireless communication system to multiple customers, or multiple team members, group members, users or employees associated with the company or associated with other companies owned by common management. The mobile units 105, 106 and 107 are mobile units used by customer to prepare and enter the customer feed-back evaluation information, but also could be mobile units used to support communications to the system, customer evaluation, requests for information, or notifications as received by multiple customers, or multiple team members, group members, users or employees associated with the company or associated with other companies owned by common management.

The file data storage database 241 in FIG. 1B stores data in a standardized format for customer service information, and that format in the present invention enhances the performance and increases the efficiency of the present invention over known data processor and storage methods and systems through the storage of standardized formatted customer service information from input customer service information, files and customer service information in the hardware processor-based system and method and the use of an indexing and referential storage and specialized subprograms that uses hardware processor-based storage devices to collect and consolidate customer service information, files and service information provided by different sources and different formats.

The database 241 in the present system and method enhances the performance and increases the efficiency of the present data processor and storage system network over known data processor and storage methods and systems by the use of an indexing and referential storage. The database 241 is used with the specialized subprograms to generate/transmit notifications, as well as generate/transmit and receive customer feedback notifications and messages. The present invention stores data in the database 241 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

With reference of FIG. 1C, the communication system 100C of the present invention is shown with a detailed explanation of the system components available at the home network 150 as coupled to a second foreign network 300. Apart from the system components in foreign network 300 and its connections to the home network 150, all the other system components shown in FIG. 1C are similar to, and possess the same functionality, as the system components shown in FIG. 1A, which is incorporated herein by reference. FIG. 1C has a second home agent HA2 340 (or through a similar device or component connection) on the foreign network 300 coupled to the home network 150 via communication links, which can be wired or wireless connections, 170a through the Internet 175, communication link 240a to the home agent 240, or communication link 180a to the second computer server SRV2.

With respect to FIG. 1C, foreign network 300 is coupled via communication line 375 to the mobile radio transceiver/cellular/WIFI systems 365 as coupled to mobile node 305, 306 and 307. The mobile nodes 305, 306 and 307 includes a hand-held mobile unit a processor, memory and a power source, as well as a transceiver and antenna 313, 312 and 311, respectively. While a mobile unit is contemplated, lap top, fixed location computers, or computer pads can also be used instead and freely substituted with the mobile unit 305, 306 and 307. The transceiver on each mobile node 305, 306 and 307 supports radio transmission communications link 310, 309 and 308 to an radio transceiver antenna and transmission network 365 (e.g. Wi-Fi, cellular, GSM, Evdo, 4G/LTE, CDMA, or others), which is coupled via connection 375 to a radio transmission network communication gateway 310a associated with the foreign network 300.

The mobile hand-held units 305, 306 and 307 may also be connected to an outside server computer SRV2 185 via a separate connection including a wireless radio connection or a wireline communication system connection. The mobile hand-held units 305, 306 and 307 may also be connected to the Internet 175 through an outside server computer or via a separate direct connection, which can include a wireless radio connection or a wireline communication system connection. The mobile hand-held units 305, 306 and 307 can also be coupled to the radio transceiver antenna 365 and a radio transmission network that is coupled to a telecommunications system that supports connectivity to the Internet 175 or another system network without interfacing directly with equipment or components in the foreign network 300.

The radio transmission network 310s is coupled to a base station transceiver unit 320 via connection 315, where the base station transceiver station provides an interface between radio domain communications and data communications carried over a telecommunications or network computer system. The base station transceiver unit 320 is coupled to a gateway 330 for the network at the foreign network 300 via connection 325, which provides an interface with the network maintained at the foreign network 300 or another associated network. The BTS 320 may also be located remotely from the foreign network near the remote radio transmission network 365 accessed by the mobile units 305, 306 or 307.

The gateway 330 is coupled to a home agent 340 via connection 335, where the foreign agent 340 controls communication flow and directions on the network maintained at the foreign network 300 or in a network associated with the foreign network 300. The foreign agent 340 is coupled to a computer server SRV3 350 via connection 345, which maintains past historical and present real-time information, software module, operations software, or other data that may be used or communicated using the invention. The invention contemplates centrally located servers to maintain the software modules and database information at the foreign network 300 that maintain or provide access to information related to the foreign network 300, but remotely located servers and computer networks can also be accessed and used with the invention.

A database 341 is coupled to the home agent 340 via communication link 342 or computer server 350 via link 342 or computer server SrV3 385 directly via link 351. The database 341 may maintain information related to the customers, users, groups, team members, or companies, but it could also maintain remote access to software modules and database information used with the software operated by the present invention as well as database information related the business operations. While only one database 341 is shown, this representation is understood to include one or more separate databases and storage locations of data and information.

The file data storage databases 241 and 341 in FIG. 1A stores data in a standardized format for customer service information, and that format in the present invention enhances the performance and increases the efficiency of the present invention over known data processor and storage methods and systems through the storage of standardized formatted customer service information from input customer service information, files and customer service information in the hardware processor-based system and method and the use of an indexing and referential storage and specialized subprograms that uses hardware processor-based storage devices to collect and consolidate customer service information, files and service information provided by different sources and different formats.

The databases 241 and 341 in the present system and method enhances the performance and increases the efficiency of the present data processor and storage system network over known data processor and storage methods and systems by the use of an indexing and referential storage. The databases 241 and 341 is used with the specialized subprograms to generate/transmit notifications, as well as generate/transmit and receive customer feedback notifications and messages. The present invention stores data in the databases 241 and 341 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

The foreign agent 340 is also coupled via connection 355 to various location L1 356 at foreign network 300 so that operations software, data, customer evaluations, notifications or other information can be entered, transmitted or received on the system and controlled by users at the business location. Customers, users and controllers at the home network location may also access the foreign network 300 remotely via communication links and wireless communication links or mobile units.

The foreign network 300 represents outside networks of associated companies, teams, groups or users that interface with the home network 150, and mobile units 305, 306 and 307 represent mobile units used by the customer to prepare and enter the customer feed-back evaluation information. Communications to the system, customer evaluation, requests for information, or notifications can be received by the customer from remote access locations or the home network using the hand-held mobile units 305, 306 and 307 as connected to the foreign network 300.

The software routines used to support various operations on the networks shown in FIGS. 1A-1C, are shown in the flow chart diagram of FIGS. 2, 2A-2G. The software modules and system software are programmed in an application software that can be/is utilized by the hand held or portable devices in whatever programming language the said device utilizes to operate the applications and then utilizes the wireless communication networks(s) available to that device in that area or any other area where the mobile units 105, 106, 107, or 305, 306 or 307, which can operate in using the functions and/or features of present system. An applications program can be downloaded to the hand-held mobile unit that supports an interface with home computer network 100 or the foreign network 300, and the mobile unit will have access to multiple functions and features identified above relating to the present invention. In the present invention, the mobile unit can include a mobile phone, smartphone device, or portable computer having a wireless radio transmission connection to the home network 150. (e.g. iPhone, Droid, iPad, Slate, etc.).

The software packages residing and operating on the home network 150, preferably the computer server SrV1 250 on the home network 150 and the mobile unit 100, is a universally exportable and importable data format preferably employed so that data from the financial institution's core processing system can be collected and maintained on database 241 in a form that can be recognized by the stand alone software package of the invention. A preferred universally exportable and importable data format such as a text file for example txt. This format is commonly used in business and therefore providing software that can import data from this format for further analysis is cost-efficient and convenient. The software may also be provided with the capability to import data in other formats generated by the core processing unit.

Figure 2:
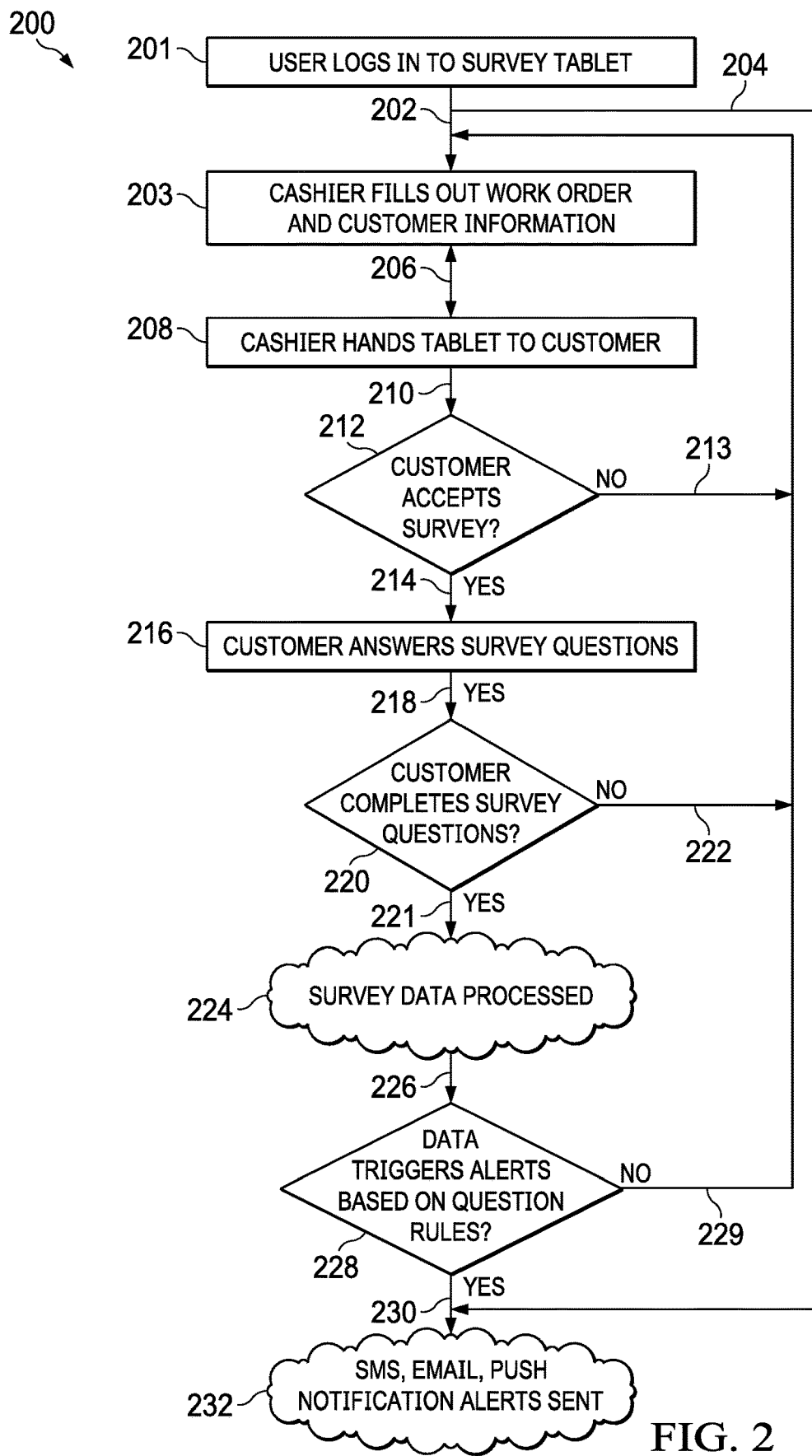
FIGS. 2, 2A-2G are flowcharts and block diagrams showing the operation and configuration of the present invention.

As shown in FIG. 2 (DCS protocol), the user logs into the customer evaluation software system at step 201, and proceeds via step 202 to step 203 where the cashier or other service personnel fills out the work order or customer information. From step 203, the system proceeds to step 208 via step 206 where the customer is asked to complete a customer evaluation of its experience at the service location or retail purchase location. The survey can also be transmitted to the survey recipient/taker in steps 212-216 by telephone calls directly to the recipient, text messages, emails, push notification alerts, website links and full text, email or webpage transmissions. The process proceeds to question 212 via step 210 where the customer is accepted whether he wishes to provide evaluation answers. If the answer is no, the program proceeds to step 203 via process step 213 where the cashier or office personnel finalizes the paperwork for the customer, which completes the service or retail transaction for the customer.

If the customer agrees to participate in the evaluation in question 212, the process proceeds to step 216 via step 214 where the customer answers various inquiries. The process then proceeds to question 220 via step 218, where the question is asked if the customer wishes to complete the evaluation. If the answer to question 218 is no, the program proceeds to step 203 via process step 213 where the cashier or office personnel finalizes the paperwork for the customer, which completes the service or retail transaction for the customer.

If the answer is yes at question 220, the survey continues at step 224 via step 221 with the completion of the entry of evaluation answers. Upon completion of the entry of evaluation answers by the customer in step 220, the system filters and evaluates the responses of the customer in step 224. The answers of the customer may trigger real-time alerts and notifications that are prepare for transmission via text, email or other instant messaging system to selected personnel in step 228. The real-time notifications to said selected personnel include customer background information, survey results, service provider information and services provided to the customer. Those SMS, email or push notification alerts can be sent to selected personnel in step 232, which is how the program proceeds via step 230.

The notification alerts in step 232 can include telephone calls directly to the recipient, text messages, emails, push notification alerts, website links and full text, email or webpage transmissions. The notifications sent in step 232 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

If the customer evaluation answers do not trigger any alerts or notifications based on the real-time evaluation, the program proceeds to step 203 via process step 213 where the cashier or office personnel finalizes the paperwork for the customer, which completes the service or retail transaction for the customer. The program can also proceed from step 201 directly to the transmission of alerts and notifications using step 204.

The DCS protocol shown in the FIG. 2 system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location.

Moreover, the steps in FIG. 2 support the initiation, implementation of filtering and identification of responses and survey answers from the DCS protocols. Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. The real-time notifications to said selected personnel include customer background information, survey results, service provider information and services provided to the customer.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

This ordered sequence of steps 1-4, with and without the addition of the subsequent location recognition steps, is believed to be novel in that the ordered combination of steps transforms the claims into patent-eligible subject matter. Based on the evaluation and filtering of customer feedback evaluations, benchmark information and trending information can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

Figure 2A:
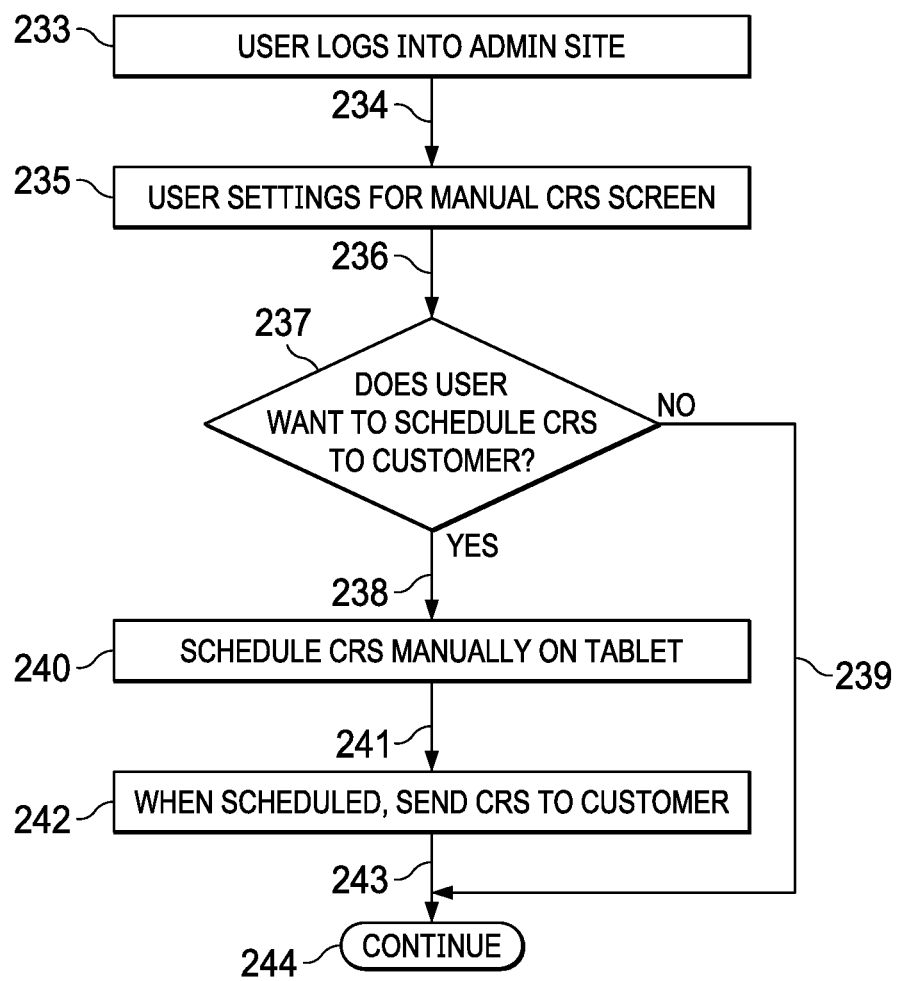

As shown in FIG. 2A (Customer Response Service CRS protocol), the user logs into the customer administration site at step 233, and proceeds via step 234 to step 235 where the user settings are implemented on the manual CRS screen.

These user in step 235 can filter existing surveys and survey responses to determine what customers to send CRS customer response service follow-up surveys, select a specific survey or survey questions to send in the follow-up CRS survey, enter contact information such a phone, fax, cell or email of the survey respondents, choose whether to show final custom screen to customer, which can include social media, websites, advertisements, or other web content.

From step 235, the system proceeds to step 237 via step 236 where the user is asked if the user wishes to schedule a CRS customer response service. If the answer is "no," the program proceeds to step 244 via process step 239 where the user continues from the CRS routine protocols to other subsystem or system operations. If the answer to the query at step 236 is "yes," the program proceeds to step 240 via step 238 where the user can schedule the CRS customer response service follow-up survey manually on the tablet or other computing device (e.g. cell phone, tablet, laptop, desktop computer). In step 240, the user can immediately send the CRS customer response service follow-up survey to the customer, or send it at a later time/date or day using present or manually input options, or set a specific time/day/date when the CRS customer response service follow-up survey will be sent to the customer.

The user can also set custom settings to determine whether the CRS customer response service follow-up survey is automatically sent or sent via a survey application program, and these options (as well as other options) can be dictated based on the responses to the survey provided by the customer in the DCS protocol steps (FIG. 2), which are answers that can be filtered and analyzed to set these CRS customer response service follow-up survey options. Moreover, if a DCS survey was initially declined, the CRS customer response service follow-up survey protocols can be set to send that customer a CRS customer response service follow-up survey. Further, the user in step 240 can set the interval to wait before the CRS customer response service follow-up survey is sent to the customer, and whether that CRS customer response service follow-up survey includes a custom final screen based on the customer's answers provided in the DCS protocol and/or the CRS protocol.

The system proceeds from step 240 to step 242 via step 241 where the system transmits the CRS customer response service follow-up survey to the customer, and the system proceeds therefrom to the continue step 244 via step 243. The continue step 244 proceeds to step 245 in FIG. 2B where the customer receives the CRS customer response service follow-up survey via email, text message, or other electronic transmission. The survey can also be transmitted to the survey recipient/taker in steps 242-245 by telephone calls directly to the recipient, text messages, emails, push notification alerts, website links and full text, email or webpage transmissions.

The CRS customer response service follow-up survey and/or message is sent to the customer fully customized by the dealer/department/user regardless of the manner of transmission, such as by email, text or other electronic transmission. The CRS customer response service follow-up survey can include user selected parameters and survey questions based on prior responses received from the DCS protocol shown in FIG. 2 or other existing survey or customer information on file, and a unique URL link can be provided in the CRS customer response service follow-up survey to the customer.

The system proceeds from step 245 to step 247 via step 246, where the customer answers the survey questions posed in the CRS customer response service follow-up survey received by that customer in step 245. The customer can answer the CRS customer response service follow-up survey questions directly from the electronic transmission or the customer may open a dedicated webpage, a URL or other computer link (e.g. third party or user supported survey application) that supports the presentation and receipt of answers to the CRS customer response service follow-up survey questions. The number of questions, text font and size, and the format of the CRS customer response service follow-up survey questions can be adjusted, modified and customized by the user, dealer or department.

In step 247, the customer answers the CRS customer response service follow-up survey questions, and the system proceeds to step 249 via step 248 where the query is asked "did the customer complete the survey?". If the answer is "no," the system proceeds to step 251 via step 250 where the user continues from the CRS routine protocols to other subsystem or system operations, the system continues to wait on the customer to complete the survey, or queries are made of the customer to inquire if he or she would like to complete the survey. If the answer is "yes" to the query in step 249, the user has completed the survey and the system proceeds to step 253 via step 252 where the data provided by the customer in the CRS customer response service follow-up survey is analyzed, processed and filtered for content. The filtering, processing and analysis of the data provided by the customer in the CRS customer response service follow-up survey questions is dictated by the user, dealer, or department.

After the data retrieved from the CRS customer response service follow-up survey questions is processed, filtered and analyzed by the system in step 253, the system proceeds to step 255 via step 254 where the system triggers alerts (text, email, push, other electronic notification) to be sent and transmitted to one or more selected users, dealers, department members or managers, or other team members based on the content of the customer's responses to CRS customer response service follow-up survey questions.

If the answer to this query in step 255 is "yes," the program proceeds to step 261 where the one or more alerts are transmitted to one or more users, dealers, department members or managers, or other team members via electronic delivery (text, email, push notification, SMS). The notification alerts in step 261 can include telephone calls directly to the recipient, text messages, emails, push notification alerts, website links and full text, email or webpage transmissions. The notifications sent in step 261 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Figure 2B:
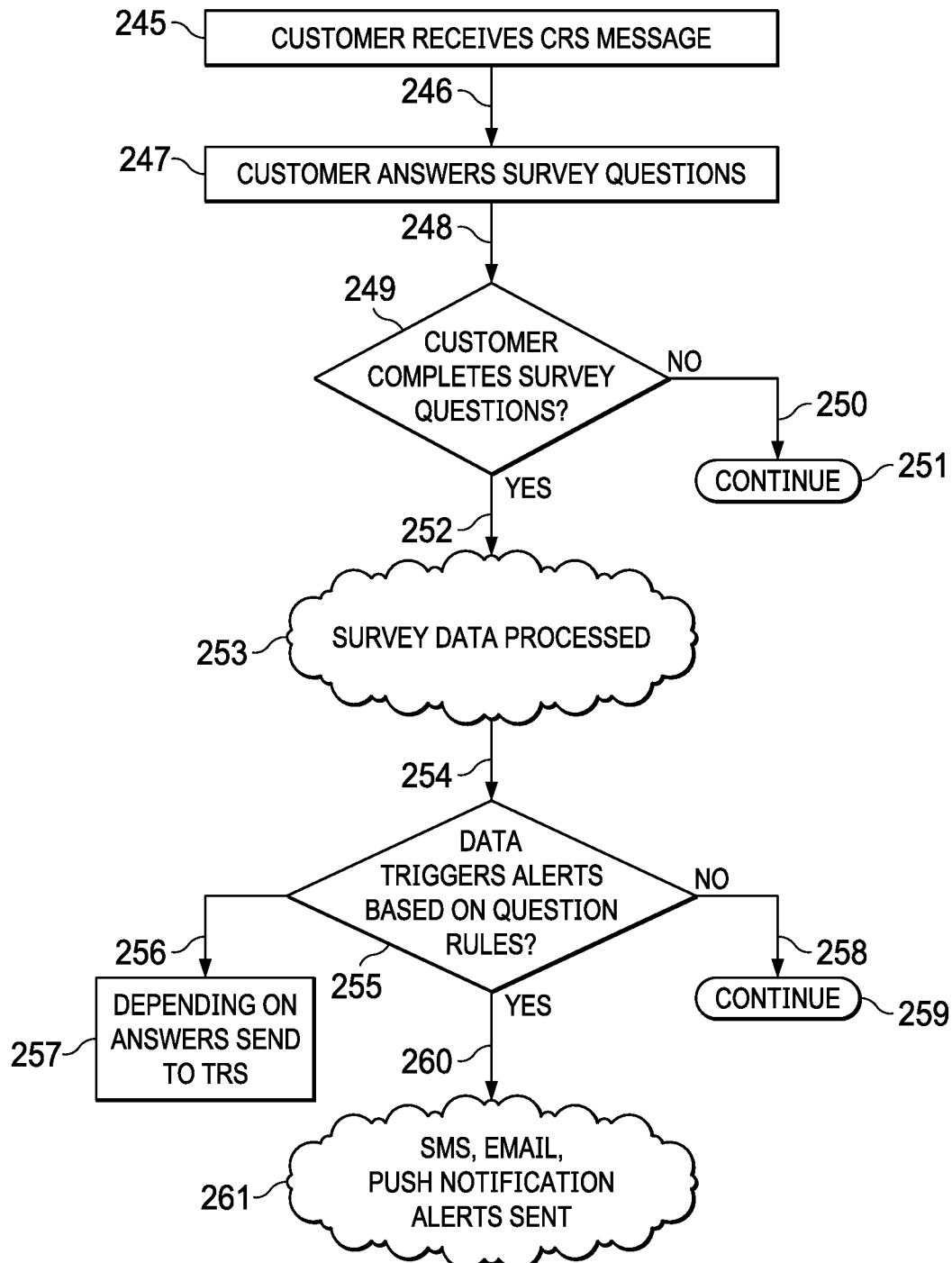

Each question in the CRS customer response service follow-up survey can be associated with a set of rules or parameters that can be set up to include various combinations of answers, users, team members, alert notification recipients, previous survey question responses, date/time, as well as other information, data or associations to other questions, customers, team members, dealers or departments. Responses outside normal responses, or within certain other parameters for a response, can initiate a trigger to transmit an alert via electronic transmission to one or more users, dealers, department members or managers, or other team members. Depending on the responses given to survey questions, the program may also proceed from step 255 to step 257 via step 256 where responses to the survey are transmitted to the TRS Rating service protocol, which is shown in FIGS. 2E-2G.

Figure 2C:
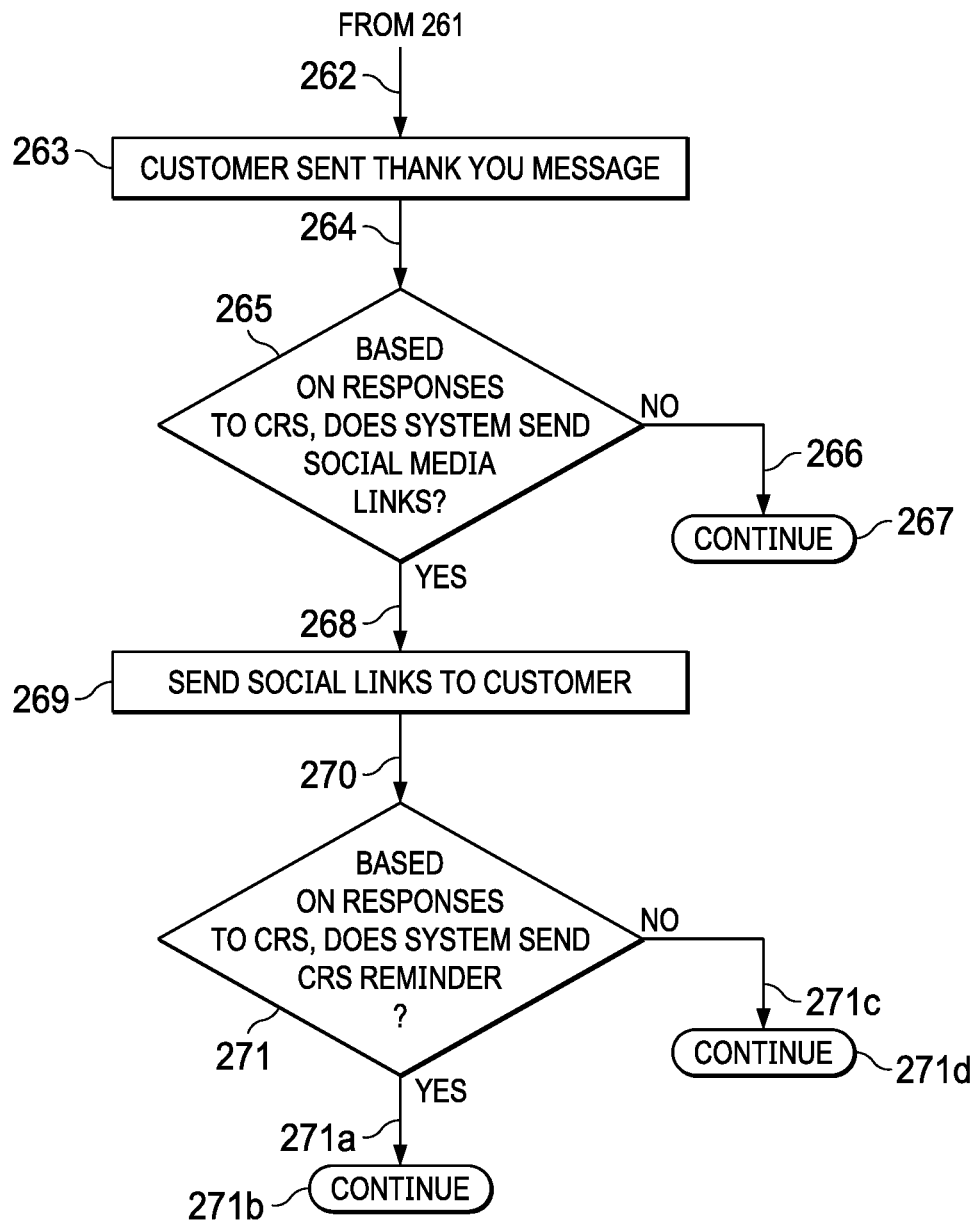

If the answer to this query in step 255 is "no," the program proceeds to step 259 via step 256 where the program proceeds to step 263 via 262 in FIG. 2C. In step 263, the customer is sent a thank you message for participating in the CRS customer response service follow-up survey. The thank you message can be a simple thank you message or a custom final screen based on the user's selections for the final screen, which are set before sending the CRS customer response service follow-up survey.

After step 263, the program proceeds to step 265 via step 264 where the final customer screen presents a question if any of the customer's responses to the CRS customer response service follow-up survey trigger sending social media links to the customer. If the answer to the query in step 265 is "yes," the program proceeds to step 269 via step 268 where the social media links are transmitted to the customer. Social media links can include the TRS Rating service, or other chatrooms or communication platforms maintained and serviced by the program, user, dealer, or team member, or maintained and serviced by a third party. The links can also be transmitted to the customer in step 268 by telephone calls directly to the recipient, text messages, emails, push notification alerts, website links and full text, email or webpage transmissions.

Alternatively, the system may also provide the social media links in the thank you message for the customer to access. After step 269, the program proceeds to step 271 via step 270 where the program continues. If the answer to the query in step 265 is "no," the program proceeds to step 267 via step 266 where the program continues. If the program proceeds to step 271, based on the customer's responses to the preceding questions, the system may send a CRS reminder to the customer's email or mobile device about a future survey from the business or a related business, such as a manufacturer. This reminder, fully configurable by the Business, can be sent at a specified time interval depending on how the CRS questions are answered. If the system sends a CRS reminder, the program proceeds to step 271*b* via step 271*a*. If a CRS reminder is not sent, the program proceeds to step 271*d* via step 271*c*.

The CRS protocols shown in the FIG. 2A-2C system components, steps and functionality individually are believed to be novel and enhance the operation of the computer system over that of a generic computer system, including the components, steps and functionality relating to: (1) the initiation, implementation, execution, and operation of a Customer Response (or "CRS") service, protocol system and method, either prompted based on responses to DCS survey questions, automatically initiated, or manually initiated by program users or service personnel, and, (2) the initiation, implementation of filtering and identification of responses and survey answers from the Customer Response Service (CRS). The sequence of steps ordered in Customer Response Service ("CRS"), alone or in combination with the additional system components, steps and functionality individually associated with the Direct Customer Survey or "DCS" are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS and CRS protocols, as well as other subsystems and protocols in the system.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

Figure 2D:
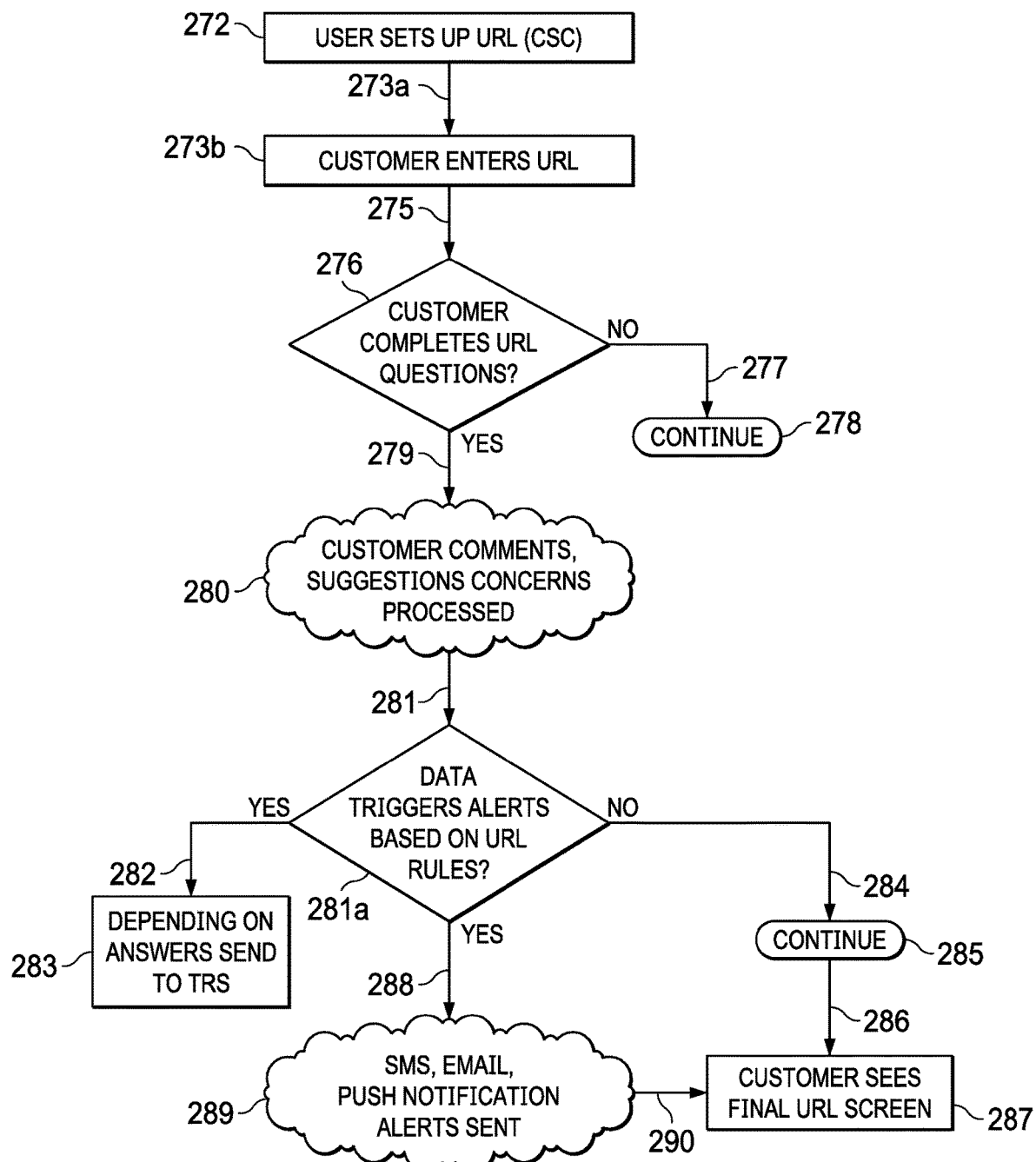
Figure 2E:
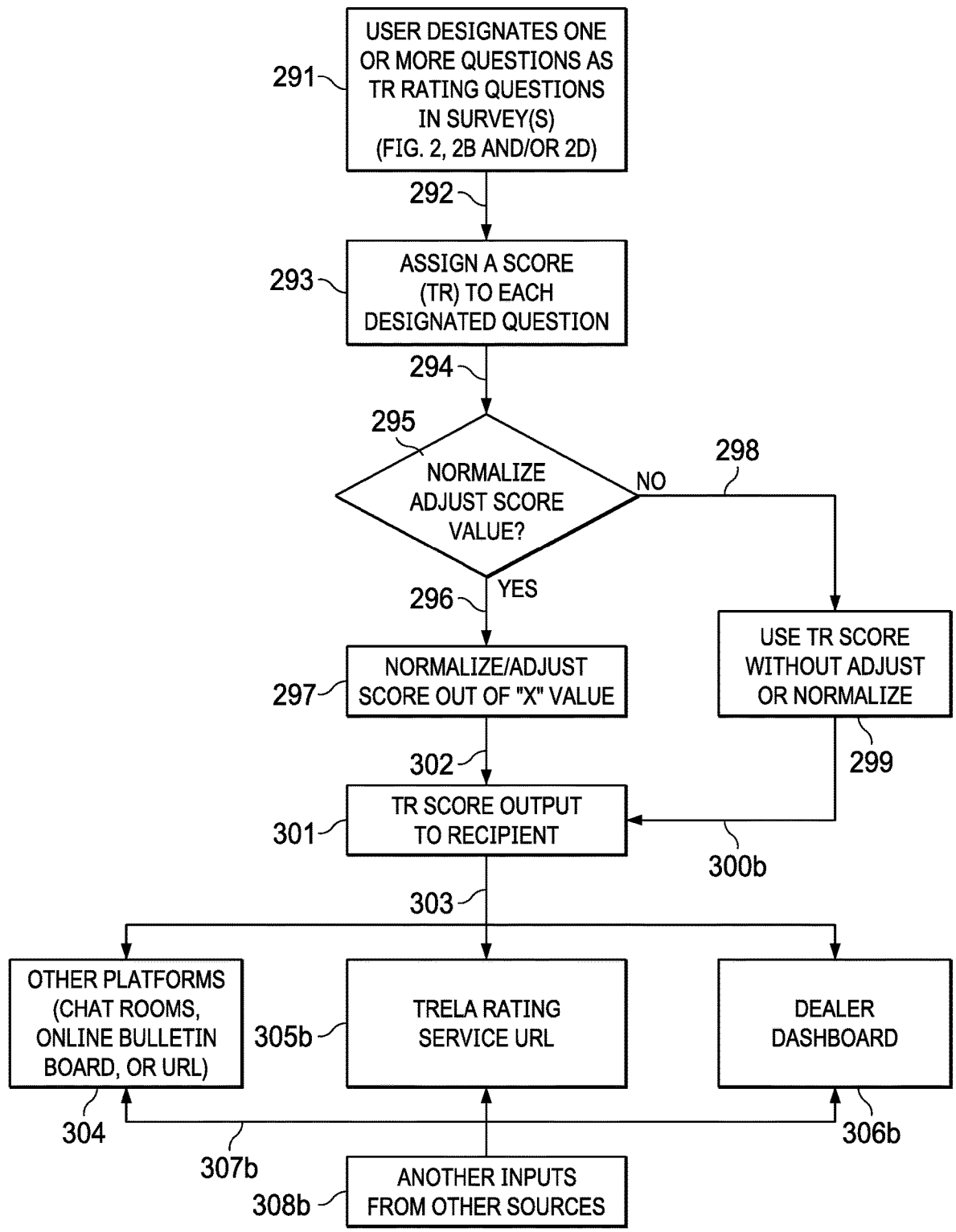
Figure 2F:
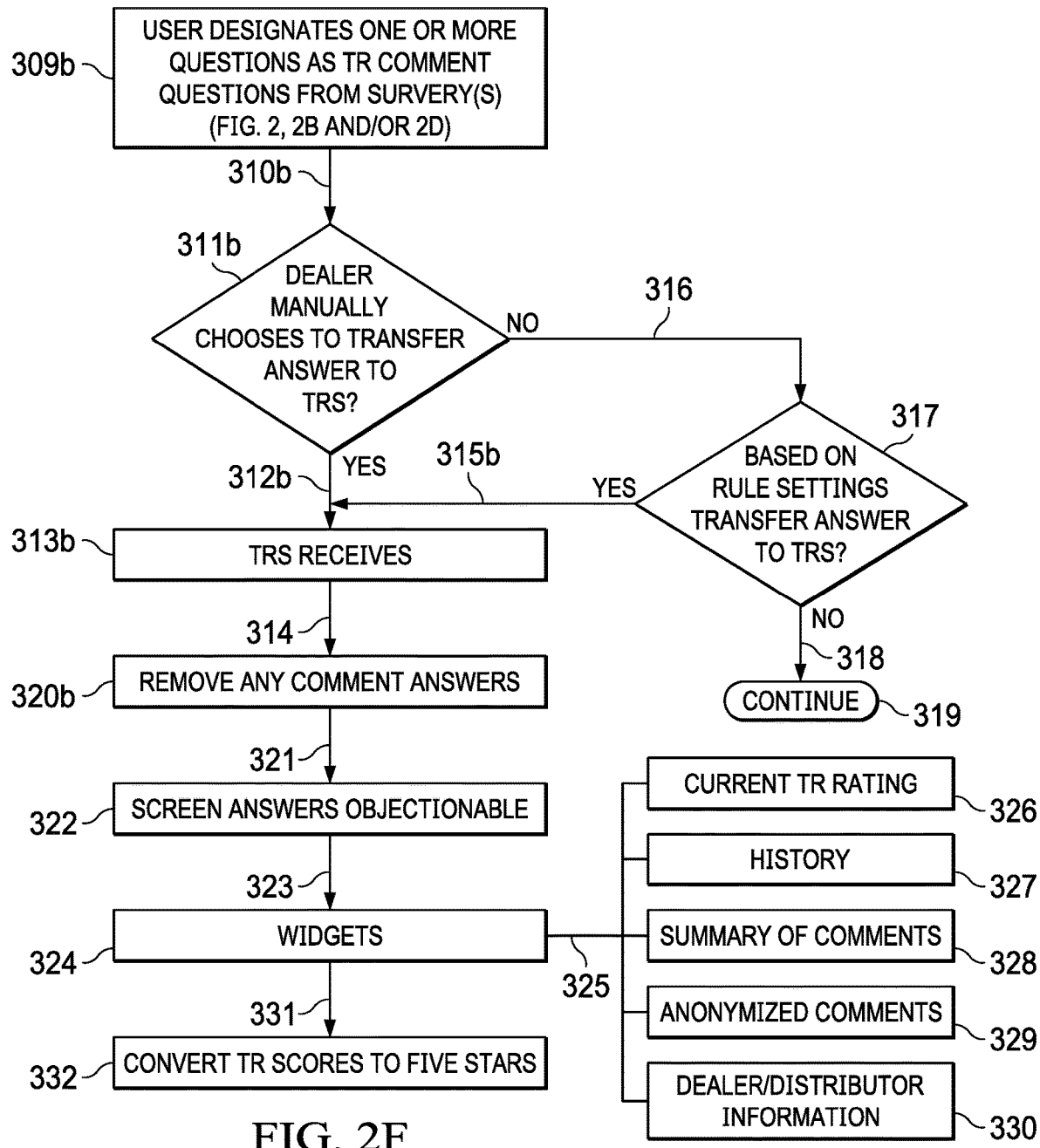
Figure 2G:
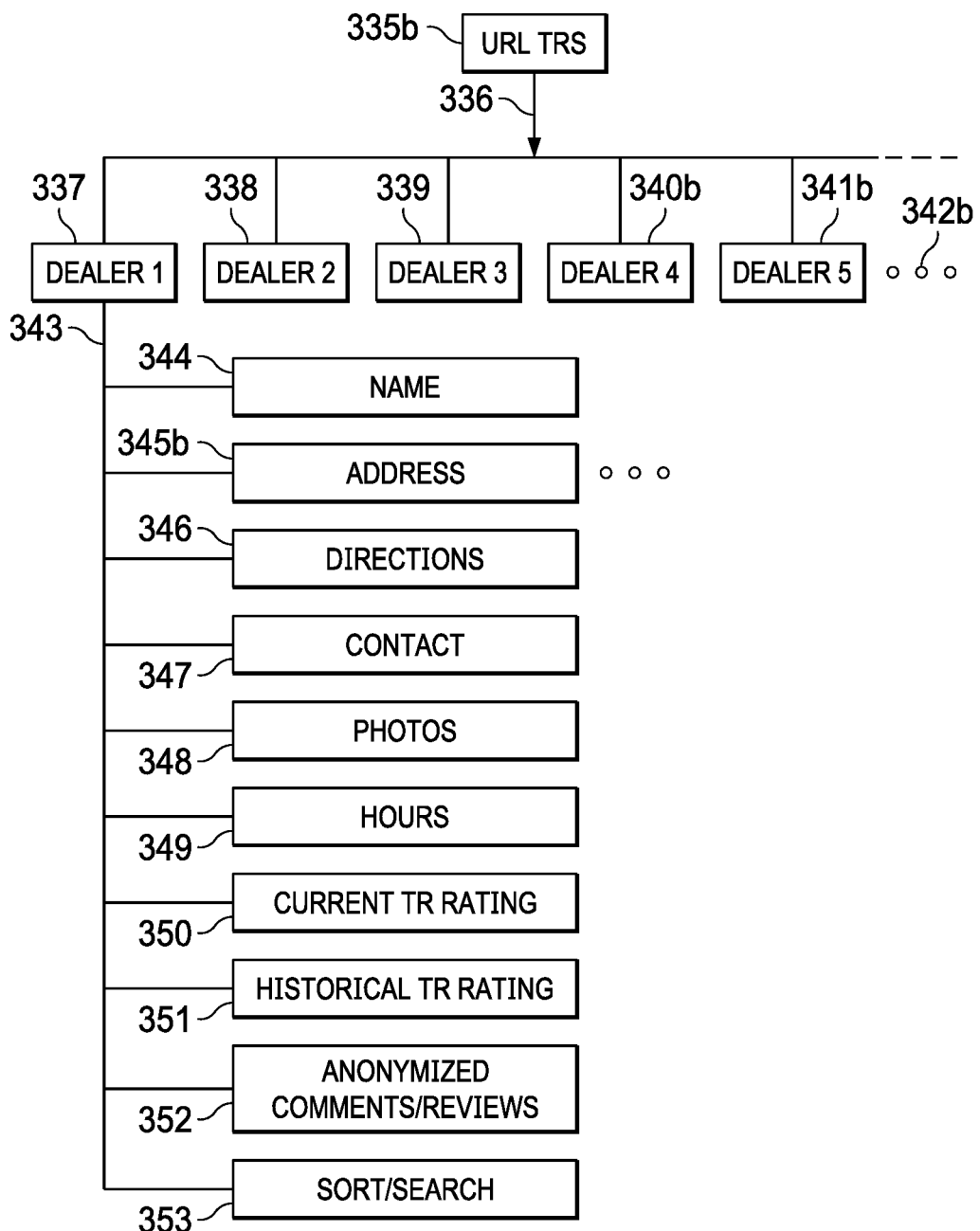

As shown in FIG. 2D (Comments, Suggestions, Concerns CSC protocol), the user sets up a portal, URL, website or other platform to receive customer comments, suggestions, or concerns at step 272. The URL established by the user can be a unique and different URL or other portal based on the particular marketing or promotion campaign being run at the time, or can be an established URL or portal that is used by the dealer, department, service center, member or affiliated party without regard to any particular marketing campaign. The marketing campaigns can be more effectively tracked for reporting purposes back to the dealer, department, service center, member or affiliated party. The marketing campaign being run by the dealer, department, service center, member or affiliated party can include waiting rooms, chat rooms, websites, business card transmittal, or third party referrals. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

The system proceeds from step 272 to step 273b via step 273a where the customer encounters, enters or signs onto the portal, URL, website or other platform to receive customer comments, suggestions, or concerns, which was set up by the user in step 272. The URL or survey can be transmitted to customer in steps 272-273b by telephone calls directly to the recipient, text messages, emails, push notification alerts, website links and full text, email or webpage transmissions. The customer encounters a unique URL or portal, or can be provided with a link to the URL or portal.

Moreover, the link can be automatically accessed by clicking on the link, or the customer may type in the link to a laptop, pad, mobile phone or desktop computer. As part of step 273a, the customer enters their name, describes their comments, suggestions or concerns, answers any predetermined questions posed by the user, and designates their response urgent or not urgent. Customers can also direct their comments, suggestions or concerns to select individuals, dealers, departments or team members, such as being able to identify or designate one or more team members to receive the comments, suggestions or concerns entered on the CSC portal or URL, if that information is made available to the customer.

After step 273b, the program proceeds to step 276 via step 275, where the program inquires if the customer has completed their entry of comments, suggestions, or concerns on the established portal, URL, website or other platform to receive customer comments, suggestions, or concerns. If the answer is "no" at step 276 that the customer has not completed their entry of comments, suggestions or concerns, the program proceeds to step 278 via step 277 where the program waits a certain period of time before repeating the step 276 query, which gives the customer an opportunity to complete their entry of comments, suggestions or concerns. At step 278, if it is determined that a time period has expired or that a predetermined number of query cycles have occurred, the program will continue on with other operations in step 278.

If the answer is "yes" that comments, suggestions or concerns of the customer have been completed and entered to the customer's satisfaction, the program will proceed to step 280 via step 279 where the customer comments, suggestions and concerns are processed by the system and filtered by the rules and guidelines established by the user on the system. Each question answered on the CSC comments, suggestions and concerns portal, website, URL or platform by the customer can be associated with a set of rules or parameters that can be set up to include various combinations of answers, users, team members, alert notification recipients, previous survey question responses, date/time, as well as other information, data or associations to other questions, customers, team members, dealers or departments. Responses to the questions posed in the CSC comments, suggestions and concerns portal, website, URL or platform that are outside normal responses, or within certain other parameters for a response, can initiate a trigger to transmit an alert via electronic transmission to one or more users, dealers, department members or managers, or other team members.

After processing of the comments, suggestions and concerns entered by the customer in step 280, the system proceeds to step 281a where the program questions whether any of the customer's comments, suggestions or concerns entered onto the portal, web site, URL or platform service follow-up survey will initiate a trigger alert to an appropriate team member, dealer, department, team member or associated person. After the comments, suggestions or concerns entered by the customer are processed, filtered and analyzed by the system in step 280 and if determined to merit a trigger alert in step 281a, the system proceeds to step 289 via step 288 where the system triggers alerts (text, email, push, other electronic notification) to be sent and transmitted to one or more selected users, dealers, department members or managers, or other team members based on the content of the customer's responses to questions presented on the CSC comments, suggestions and concerns portal, website, URL or platform.

In step 289, one or more alerts are transmitted to one or more users, dealers, department members or managers, or other team members via electronic delivery (text, email, push notification, SMS). The notification alerts in step 289 can include telephone calls directly to the recipient, text messages, emails, push notification alerts, website links and full text, email or webpage transmissions. The notifications sent in step 289 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses. After alerts are sent and transmitted, the program proceeds from step 289 to step 287 via step 290.

Depending on the responses given to questions posed in the CSC comments, suggestions and concerns portal, website, URL or platform, the program may also proceed from step 281a to step 283 via step 282 where responses to the survey are transmitted to the TRS Rating service protocol, which is shown in FIGS. 2E-2G. The TRS Rating service can be linked to other chatrooms or communication platforms maintained and serviced by the program, user, dealer, or team member, or maintained and serviced by a third party.

If the answer to this query in step 281a is "no," the program proceeds to step 285 via step 284 where the program continues to proceed with other subsystems and protocol and proceeds to step 287 via step 286 where the customer can view the final screen on the CSC comments, suggestions and concerns portal, website, URL or platform. On this final screen, the customer can be sent a thank you message for participating in the CRS customer response service follow-up survey. The thank you message can be a simple thank you message or a custom final screen based on the user's selections for the final screen, which are set before the customer enters the CSC comments, suggestions and concerns portal, website, URL or platform.

The CSC protocols shown in the FIG. 2D system components, steps and functionality individually are believed to be novel and enhance the operation of the computer system over that of a generic computer system, including the components, steps and functionality relating to: (1) the initiation, implementation, execution, and operation of a Comments, Suggestion and Concerns (or "CSC") service, protocol system and method, either prompted based on responses to DCS and/or CRS survey questions, automatically initiated, or manually initiated by program users or service personnel; and (2) the initiation, implementation of filtering and identification of responses and survey answers from the Comments, Suggestion and Concerns service (CSC).

The sequence of steps ordered in Comments, Suggestion and Concerns service ("CSC"), alone or in combination with the additional system components, steps and functionality individually associated with the Customer Response Service ("CRS"), and the Direct Customer Survey (or "DCS") are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

As shown in FIG. 2E (TRS rating service subsystem), the user starts the protocol program at step 291 where the user designates one or more questions from the DCS, CRS and/or CSC surveys as TR Rating survey questions. The marking of the TR Rating survey questions and request to use the TR rating service subsystem can be made at any time, and can be applied to any responses given for any time frame if the responses are maintained in the system. After designating those DCS, CRS and/or CSC survey questions as TR Rating survey questions in step 291, the program proceeds to step 293 via step 292 where a score or value is assigned to the responses from each TR Rating survey question designated in step 291.

After the TR Rating questions are assigned a value or score in step 293, the program proceeds to the query in step 295 via step 294, where the program asks whether the user wants the value or score assigned to the TR Rating questions to normalized and adjusted to a normalized value. If the answer to the question in step 295 is "no," the program proceeds to step 299 via step 298 where the score or value assigned to the responses from each TR Rating survey question are used without being adjusted to a normalized value or normalized in any manner, which makes them raw TR scores.

If the answer to the question in step 295 is "yes," the program proceeds to step 297 via step 296 where the scores and values assigned to the responses from each TR Rating survey question is normalized and adjusted based on a predetermined "x" value, which provides weighting or adjusting to certain answers or divides all the scores by an "x" value to obtain an average rating score or weights certain answers and divides to obtain a weighted average rating score using the values and scores from the assigned responses to the TR Rating questions. Certain responses may be viewed as more important or less important to show the overall customer satisfaction with the service or products, which may dictate how the scores are weighted and averaged to obtain a normalized and adjusted TR Rating score.

Once normalized in step 297, the program proceeds to step 301 via step 302 where the TR rating score is output to the recipient for use in another program, subprogram or application. The TR rating score may be the normalized value rating score resulting from the normalization (weightings, averaging) done in step 297 if normalization is desired by the user or the raw TR scores if no adjusting or normalization is desired by the user in step 299, the program proceeds to step 301 via 300*b*.

After step 301, the program proceeds to step 304 via step 303 where the TR Rating score output in step 301 is provided to platforms, URL, website, bulletin boards or other electronic rating systems, either maintained and supported by the user or another party, as designated by the user, dealer, department, team member or associate to receive such information. The TR Rating score output from step 301 can be some or all of the information posted on the recipient platform, URL, website, bulletin board or other electronic rating systems, either maintained and supported by the user or another party. Other input and information developed or received in step 308*b* may also be transmitted to the platforms, URL, bulletin boards or other electronic rating systems, which are maintained and supported by the user or another party in step 304 via step 307*b*, with this other input and information may be displayed thereon or used internally in the system.

After step 301, the program also proceeds to step 305*b* via step 303 where the TR Rating score output in step 301 is provided to a specialized TR Rating platform, URL, website, bulletin board or other electronic rating systems maintained and supported by a TR Rating service, the user or a third party for the benefit of the user, as designated by the user, dealer, department, team member or associate to receive such information. The TR Rating score output from step 301 can be some or all of the information posted on the specialized TR Rating platform, URL, website, bulletin board or other electronic rating system. Other input and information developed or received in step 308*b* may also be transmitted to the specialized TR Rating platform, URL, electronic bulletin board or other electronic rating system, either maintained and supported by a TR Rating service, the user or another party in step 305*b* via step 307*b*, with this other input and information may be displayed thereon or used internally in the system.

After step 301, the program also proceeds to step 306*b* via step 303 where the TR Rating score output in step 301 is provided to an internal or external dashboard, platform, URL, website, bulletin board or other electronic rating systems maintained and supported by a dealer, department, team member or associate, a third party for the benefit of those parties, as designated by the user, dealer, department, team member or associate to receive such information. The TR Rating score output from step 301 can be some or all of the information posted on the internal or external dashboard, platform, URL, website, bulletin board or other electronic rating systems maintained and supported by a dealer, department, team member or associate, a third party for the benefit of those parties. Other input and information developed or received in step 308*b* may also be transmitted to the internal or external dashboard, platform, URL, website, bulletin board or other electronic rating systems in step 305*b* via step 307*b*, with this other input and information may be displayed thereon or used internally in the system.

As shown in FIG. 2F (TRS rating service subsystem), the user continues the protocol program at step 309*b* where the user designates one or more questions from the DCS, CRS and/or CSC surveys as TR comment survey questions. The marking of the TR comment survey questions and request to use the TR rating service subsystem can be made at any time, and can be applied to any responses given for any time frame if the responses are maintained in the system. After designating those DCS, CRS and/or CSC survey questions as TR comment questions in step 309*b*, the program proceeds to step 311*b* via step 310*b* where the dealer, department, team member or associated party is asked whether it wants to manually transfer answers to TR comment questions to the TRS Rating service URL (step 305*b*), the other platform (step 304), or the dealer dashboard (step 306*b*) as described above for disclosure or use by that system.

If the answer in step 311*b* is "no," the TRS rating service protocol will proceed to step 317 via step 316 to a question step where the rules set by the user are analyzed to determine whether the rule settings permit the answer to the TR comment questions to be transferred to the TRS Rating service URL (step 305*b*), the other platform (step 304), or the dealer dashboard (step 306*b*) as described above for disclosure or use by that system. If the answer to step 317 is "no," the TRS rating service protocol proceeds to step 319 via step 318 where the system does not transfer the chosen responses to the TR comments question to TRS Rating service URL (step 305*b*), the other platform (step 304), or the dealer dashboard (step 306*b*) as described above for disclosure or use by that system, and the other protocol and subsystems continue to be executed.

If the answer to step 311*b* or step 317 is "yes," the TRS rating service protocol will proceed via steps 312*b* and 315*b*, respectively, to step 313*b* where the response to the TR comment question is transmitted and received by the TRS Rating service URL (step 305*b*), the other platform (step 304), or the dealer dashboard (step 306*b*) as described above for disclosure or use by that system. After step 313*b*, the TRS rating service protocol proceeds to step 320*b* via step 314 where responses to TR comment questions can be removed based on the rules set by the user or the TRS Rating service URL (step 305*b*), the other platform (step 304), or the dealer dashboard (step 306*b*) as described above for disclosure or use by that system.

Following step 320*b*, the TR rating service protocol proceeds to step 322 via step 321 where any unremoved responses to TR comment questions are screened for any objectionable comments or language.

After step 322, the TR rating service protocol proceeds to step 324 where widgets or specialized applications and tools can be accessed by the user of the TRS rating service, or the dealer, department, team member or associated party if they are given access to the TRS Rating service URL (step 305*b*), the other platform (step 304), or the dealer dashboard (step 306*b*) as described above for disclosure or use by that system. These widgets or specialized applications can be accessed via step 325 to step 326 for current TR Ratings, step 327 for history, step 328 for summary of comments, step 329 for anonymized comments, or 330*b* for dealer/distributor information. After step 324, the TR rating service protocols proceed to step 322 where the TR Rating scores are converted from one submitted format into a one to five star rating (could be "x" star rating, where "x" is a whole number of 1 or more) based on the level of satisfaction evidenced in the response provided by the customer.

As shown in FIG. 2G (TRS rating service subsystem), the TRS Rating service URL (step 305*b*), the other platform (step 304), or the dealer dashboard (step 306*b*) as described above for disclosure or use by that system can be accessed in step 335*b*. From step 335*b*, the dealers can access the TRS Rating service URL (step 305*b*), the other platform (step 304), or the dealer dashboard (step 306*b*) via step 336 in step 337 for dealer 1, or in step 338 for dealer 2, or in step 339 for dealer 3, or in step 340*b* for dealer 4, or in step 341*b* for dealer 5, or step 342*b* for other dealers. By dealer, the system may also interchange a dealer with a department, user, associate, team member, or other party.

In step 335*b*, for each TRS Rating service URL (step 305*b*), the other platform (step 304), or the dealer dashboard (step 306*b*) as described above for disclosure or use by that system, the following information, applications and inputs can be accessed (as shown for example in step 337 for dealer 1) via step 343 including: name at 344, address at 345*b*, directions at 346, contact information at 347, hours of operation at 349, current TR Rating score at 350, historical TR Rating score at 351, anonymized comments/review at 352, and sort/search applications at 353. Other information can be added or modified from the above listing, and similar information, applications and inputs can be accessed by the other dealers 2 to x in steps 338-342*b* as described above.

The TRS rating service protocols shown in the FIG. 2E-2G system components, steps and functionality individually are believed to be novel and enhance the operation of the computer system over that of a generic computer system, including the components, steps and functionality relating to: (1) the initiation, implementation, execution, and operation of an authenticated survey rating service (or "TRS") that receives marked survey responses received from the filtering and identification protocols related to the DCS, CRS and/or CSC subsystems, adjusts the scores from those received and marked responses to a normalized measure, calculates an overall TRS rating score from the customer that is associated with the customer's response, and transmits or posts the TRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system.

The sequence of steps ordered in TRS authenticated survey rating service, alone or in combination with the additional system components, steps and functionality individually associated with the Customer Response Service ("CRS"), the Comments, Suggestion and Concerns service ("CSC"), and the Direct Customer Survey or "DC S" are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

Figure 3A:
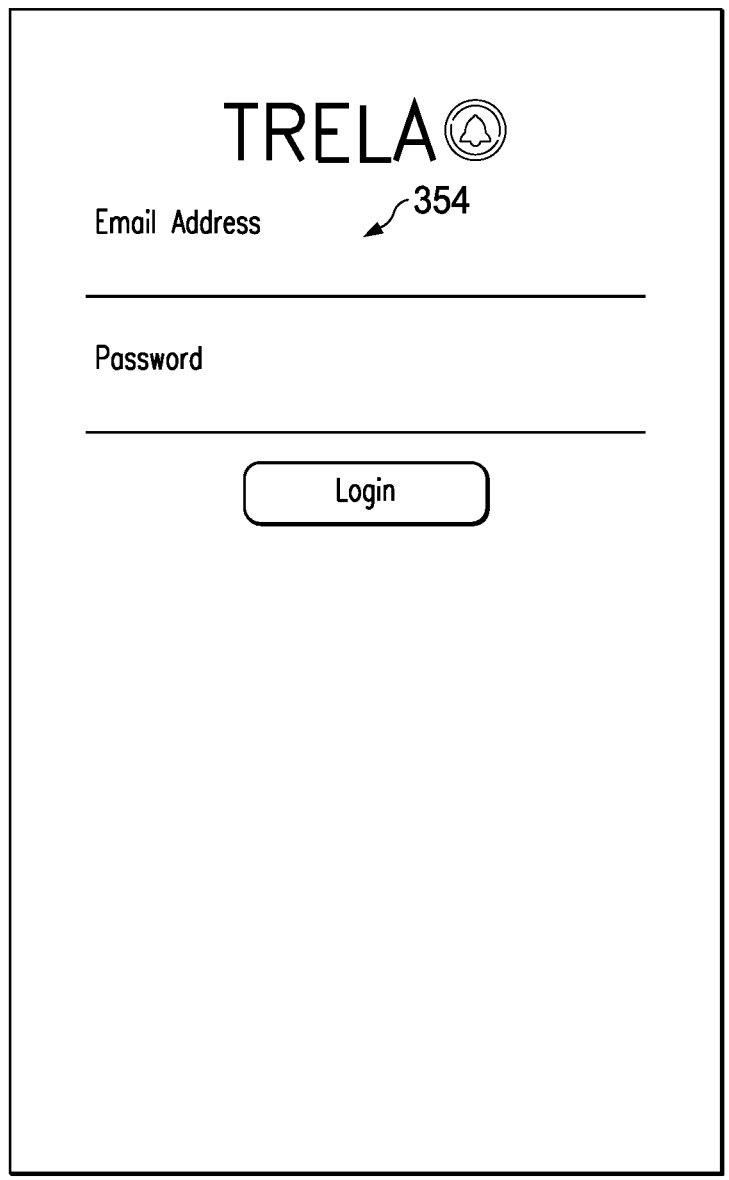
Figure 3B:
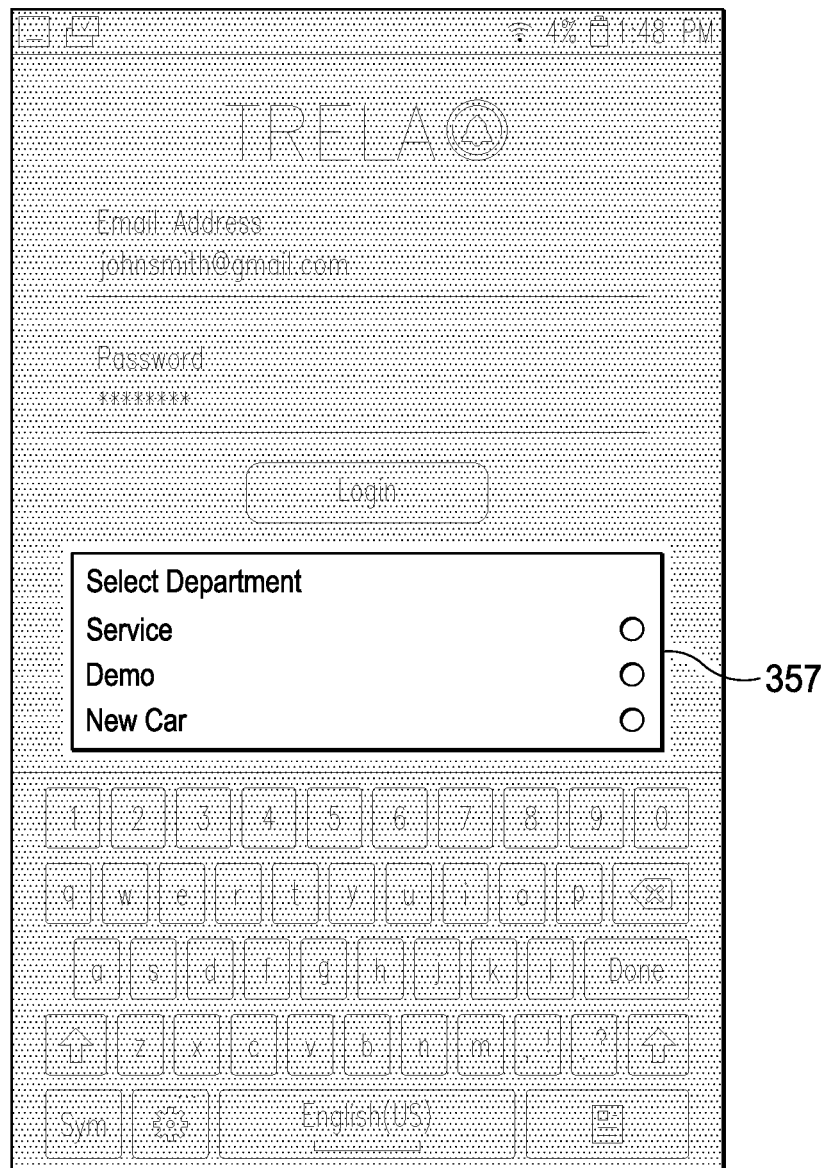
Figure 3C2:
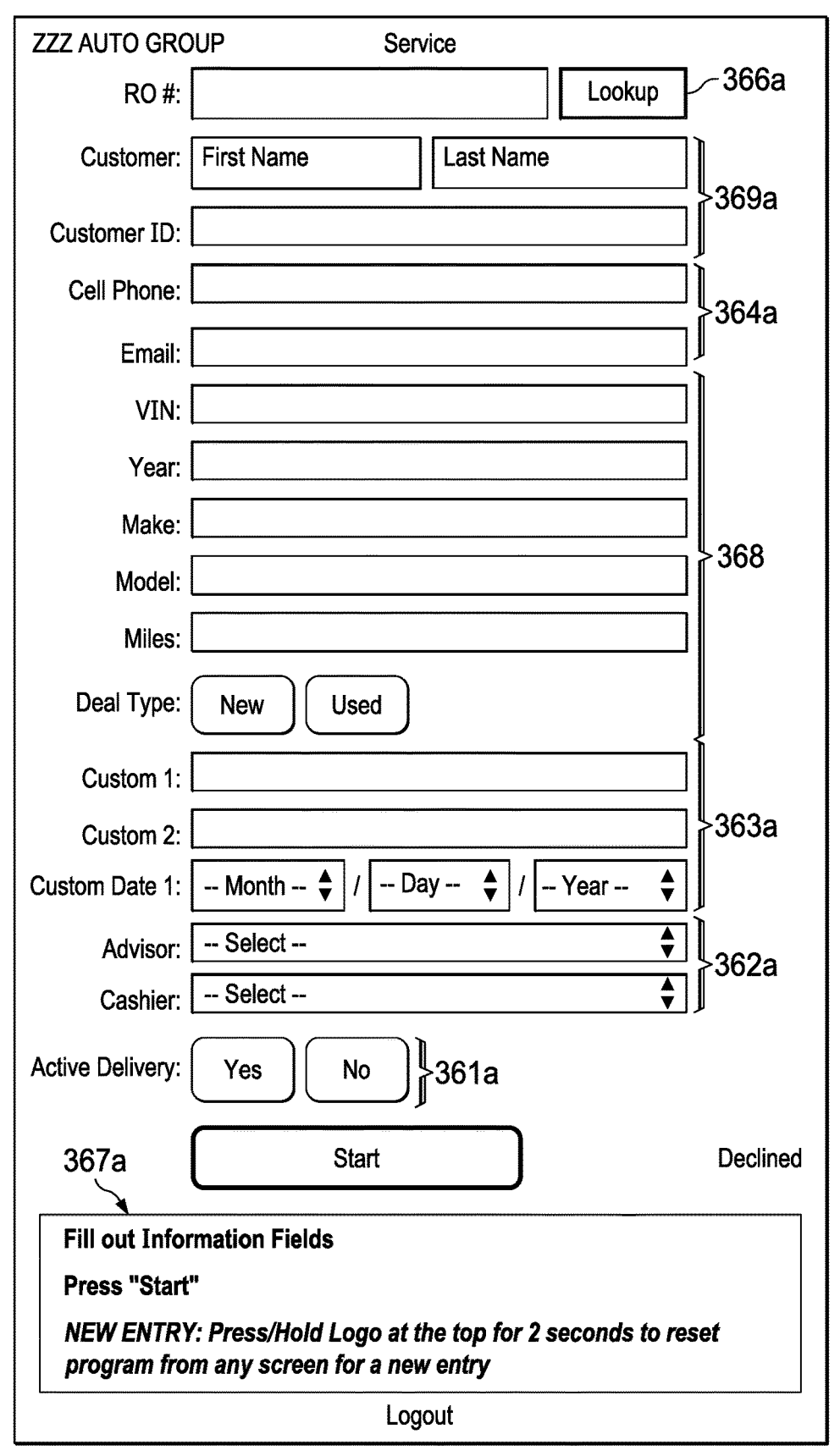
Figure 3E:
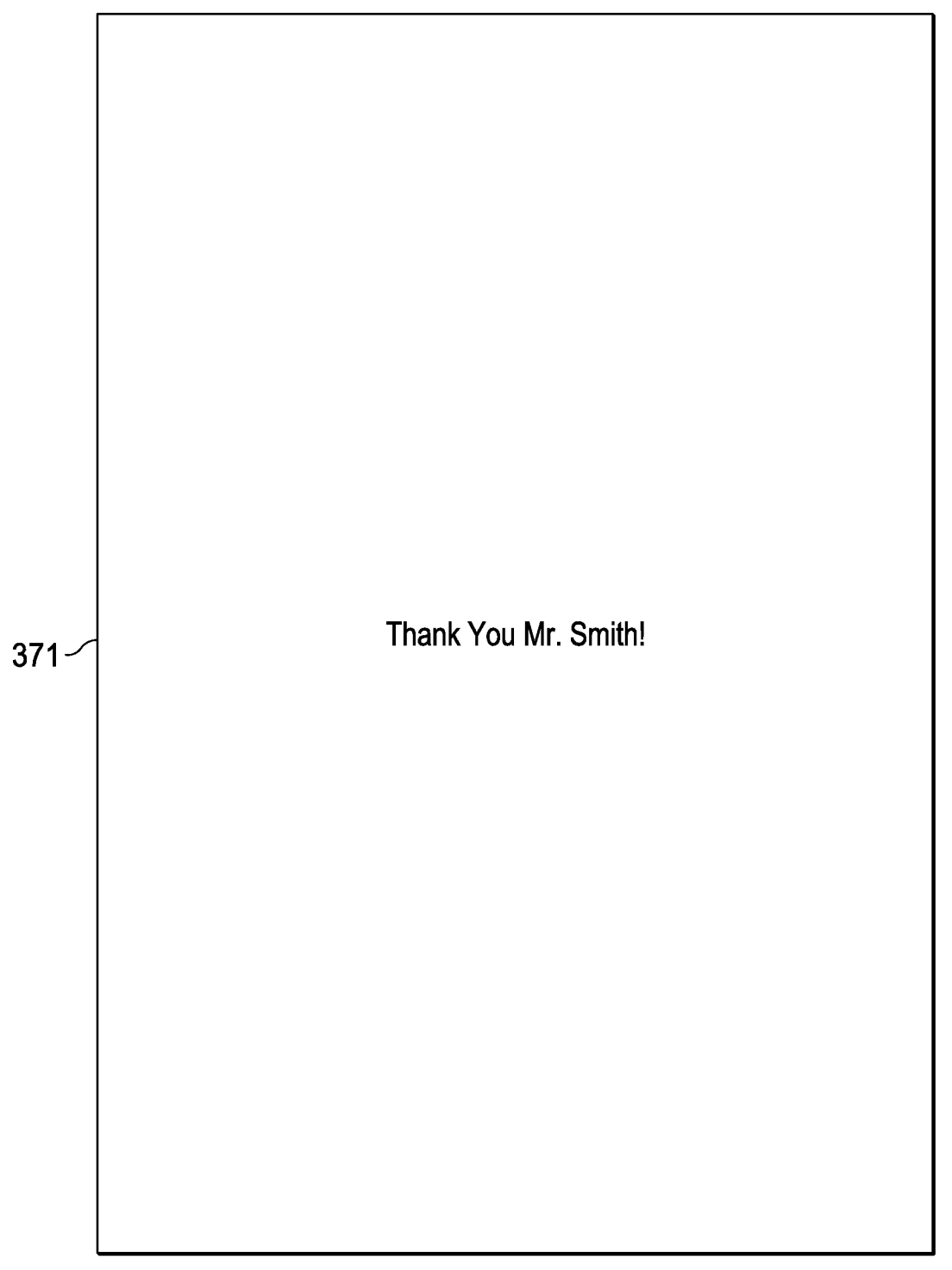
Figure 3F:
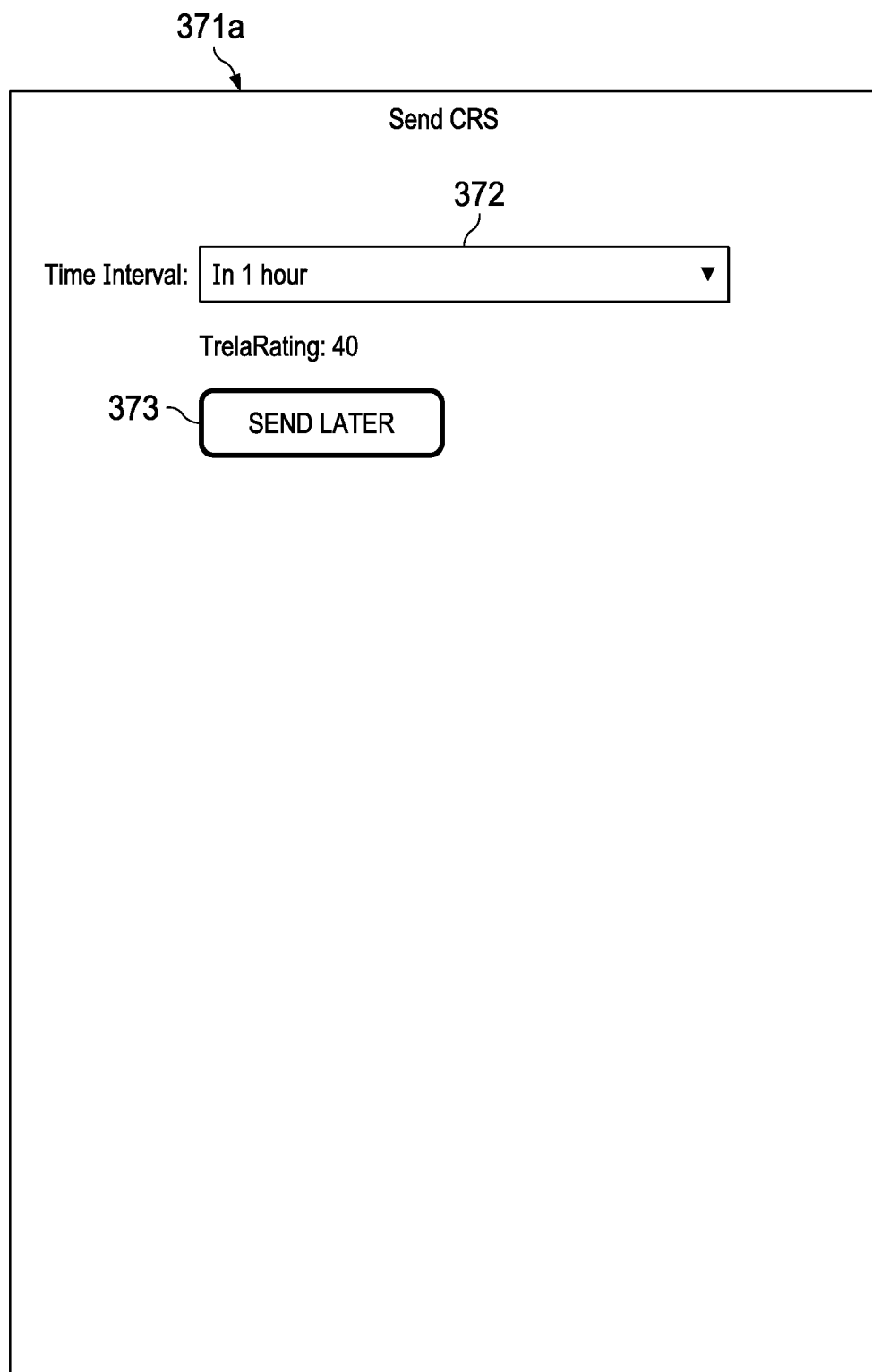

The evaluation information screen displays presented to the customer are shown in FIGS. 3A-3C, 3C1, 3C2, 3D, 3E, 3F 3G and 3H, which include the entry of customer contact information 354 on the login screen shown on FIG. 3A, a department selection 357 as utilized by the customer on screen shown on FIG. 3B.

FIGS. 3C, 3C1 and 3C2 show some options available for DCS start survey pages. Pages are customizable for specific business needs. Ticket information 358, advisor and cashier information 359, and vehicle delivery mode 360, with a start survey button and declined survey option on the screen shown on FIG. 3C. As shown on FIG. 3C1, a service department input screen is shown with RO #366, customer name and ID 369, contact information (email, cell phone) 364, customized 1 and 2 inputs 363, advisor and cashier identification fields 362, active and valet delivery designations 361, start button, declined survey option and start instructions 367 shown thereon. As shown on FIG. 3C2, a service department input screen is shown with RO # and optional lookup button 366a, customer name and ID 369a, contact information (email, cell phone) 364a, customized 1 and 2 inputs 363a, advisor and cashier identification fields 362a, active and valet delivery designations 361a, start survey button, survey declined option and start instructions 367a shown thereon.

FIG. 3C2 also shows input fields 368 for vehicle identification information, such as, Vehicle Identification Number (VIN), year, make, model, miles and deal type. The lookup feature 366a allows the business to lookup the customer information through an external third party source. When the cashier is setting up the survey for the customer, entering an ID number will retrieve the data and automatically update the screen rather than entering the data manually.

The lookup feature can be configured to access data from sources using standard API methods. The survey questions can be presented in English, or another language, such as Spanish, and the language can be selected prior to the start of the survey. If the customer chooses to view the questions in another language, that choice is saved with the survey record and when CRS messages are sent to the customer, the messaging will be displayed in the selected language. Customizable questions 363, 363a may be configured by the business. For example, customized questions may ask for confirmation of email and cell phone data by the customer. This confirmation adds another level of data integrity for the business. The business can view reports of this information allowing the system records to be updated. Customized questions may also be lead generation questions that can send information to a third-party system depending on how the customer answers. The customized questions would be added to the current questions the customer see when filling out the DCS Live survey.

The survey questions 370 on screen FIG. 3D are for the particular vehicle service embodiment, but the system and the survey can be modified to be used in other environments and businesses, such as health care hospital locations, various retail sales locations, apartment complex locations, hotels, cruise lines, or any type of business that could benefit from real-time notification of dissatisfied customers with an ability to rectify the customer experience before the customer departs or shortly thereafter. The customer may also select another language, such as Spanish, to view the questions. If customized questions are added by the business, those questions would also appear on the survey. The survey ends with an appreciation statement 371 on the screen shown on FIG. 3E. The setting for sending or transmitting a subsequent CRS survey questionnaire to the customer can be set in screen 371a of FIG. 3F by the "send later" button 373 and the time interval can be specified in designation 372.

After entry of the answers to the questions by the customer, the systems conduct real-time automated filtering and evaluation of feedback entered by the customer as well as transmission of real-time notifications to selected personnel based on feedback evaluation in a flexible messaging and workflow system. These networks support the ability to obtain constructive feedback, either good or bad, regarding a customer's experience while the customer is still at the service provider or retail sales location. And, if the experience is negative, the invention embodied in these networks provide automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location or a short time thereafter.

Follow-up survey communications may be sent through either the customer's email or mobile device with messages and questions configured by the business. After the DCS live session, the customer may later receive a text or email message that is pre-programmed in CRS with questions to be sent to the customer. In either event, the customer can choose whether to respond to the follow-up survey questions. The customer may be sent an email with a link to a webpage to fill out the CRS follow-up questions directly on the webpage or the CRS follow-up questions may be sent directly to a customer's mobile device.

Sending the CRS questions to the customer's mobile device allows the customer to respond to the CRS questions entirely on their mobile device. If the customer responds to question in the text, another question is sent thereby opening a text dialog session. The text sessions may be initiated by either the business or the customer, and the text dialog may be automated and/or manual. All of the messaging and questions can be configured by the business. The business may manually intervene in the text dialog to respond directly to the customer. If there are indications or an alert that a customer is not satisfied with the service received, the business has the opportunity to text directly back to the customer to find out more details and initiate remediation measures. The text sessions operate entirely within the system and text sessions are stored in the customer's file for future review.

Figure 3G:
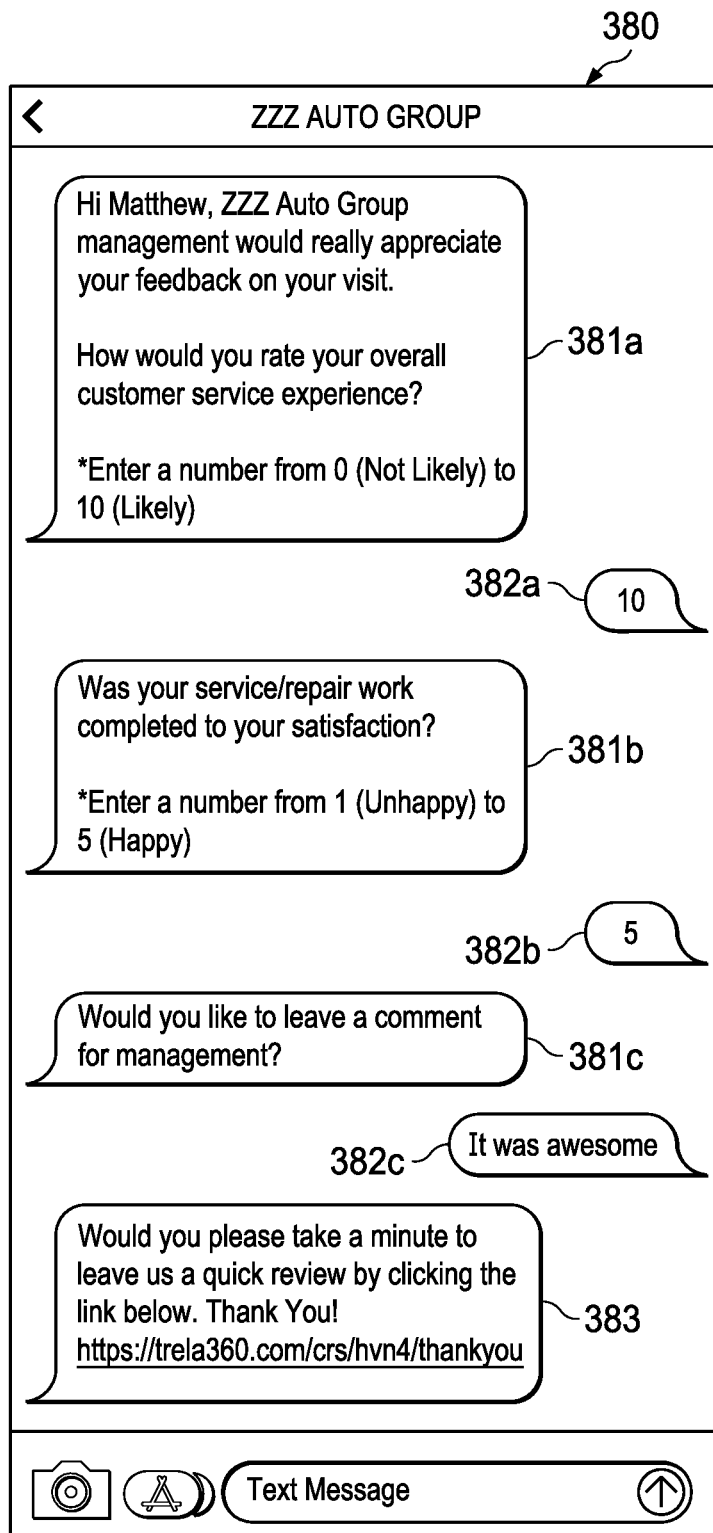
Figure 3H:
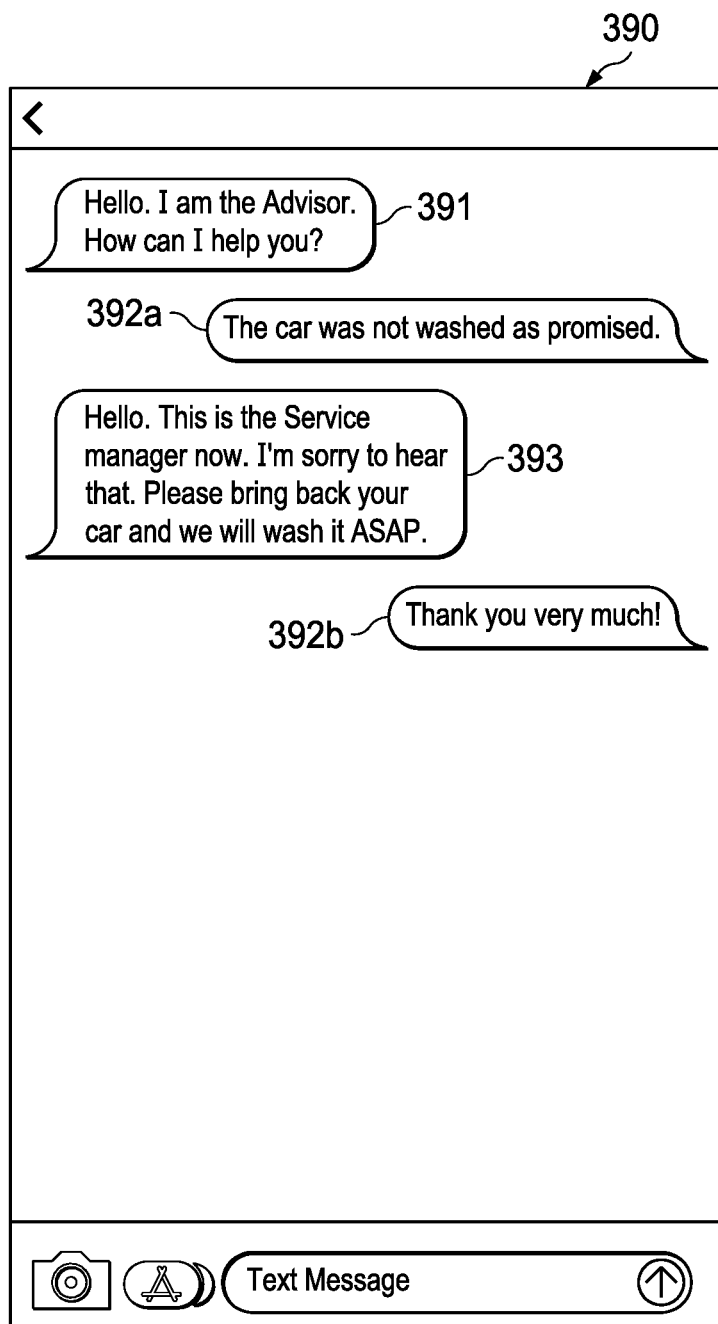

FIG. 3G shows an example text dialog with a customer on a mobile device. The initial text displays a business header 380 with and a personalized greeting and survey question 381a. The customer made an initial response 382a, which triggered follow-up questions from the business 381b, 381c, that were answered by the customer 382b, 382c. A follow-up text from the business 383 may request feedback from the customer. Customers may receive instructions for accessing a link provided to a business webpage to leave feedback or customers may receive instructions for posting feedback on social media Questions with positive responses from the customer can be largely automated within the system. If, however, the customer responds negatively, team members can be alerted about the responses and can then manually intervene in the text dialog. For example, FIG. 3H, shows an example text dialog 390 wherein an Advisor has manually intervened 391 in the text dialog in response to a low rating. The customer has sent a text about the problem 392a. A Service Manager has also manually intervened 393 in the text dialog responding to the customer with a solution and eliciting a positive response 392b from the customer. The ability to receive alerts and manually intervene in the text dialog allows for immediate resolution and increases the likelihood of positive feedback from the customer.

Additional CRS Follow-up texts or CRS Reminder texts may be sent to customer based on customer feedback from the CRS submitted. In addition to the CRS Follow-up, a business can set up a CRS Reminder to be sent to a customer. This reminder, fully configurable by the Business, can be sent at a specified time interval depending on how the CRS questions are answered. There are two time period options the Business may set. First, if the Customer answers the CRS questions within a $1^{st}$ specified time interval, then the CRS reminder is sent based on that time interval from when the DCS Live was first completed. Second, if the Customer answers the CRS questions outside the $1^{st}$ specified time interval, then the reminder is sent based on the $2^{nd}$ time interval specified after the CRS was completed. The CRS Reminders alert a customer about a future survey that may be sent by the business or an outside source, such as a manufacturer. For example, the dealer may send a CRS Reminder about a future survey that will be sent from a car manufacturer.

Identity information relating to the customer can also be preserved in the networks so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience.

The following system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location. The real-time notifications to said selected personnel include customer background information, survey results, service provider information and services provided to the customer.

Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. This ordered sequence of steps 1-4, with and without the addition of the subsequent location recognition steps, is believed to be novel in that the ordered combination of steps transforms the claims into patent-eligible subject matter.

Additionally, components, functionality and steps supported by these networks include the preparation and revision of standard or individualized feedback evaluation questions by authorized users, with flexible assignment of these evaluation questionnaires for specific members of companies, teams, users, or groups providing services or products or entire groups of users, teams or companies. And, the networks provide for the flexible assignment of team members, users, and companies, as well as the preparation and transmission of messaging to entire team members, users, groups and companies or specific members of teams, users, companies, and groups. These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, the networks provide benchmark information and trending information that can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

Figure 4:
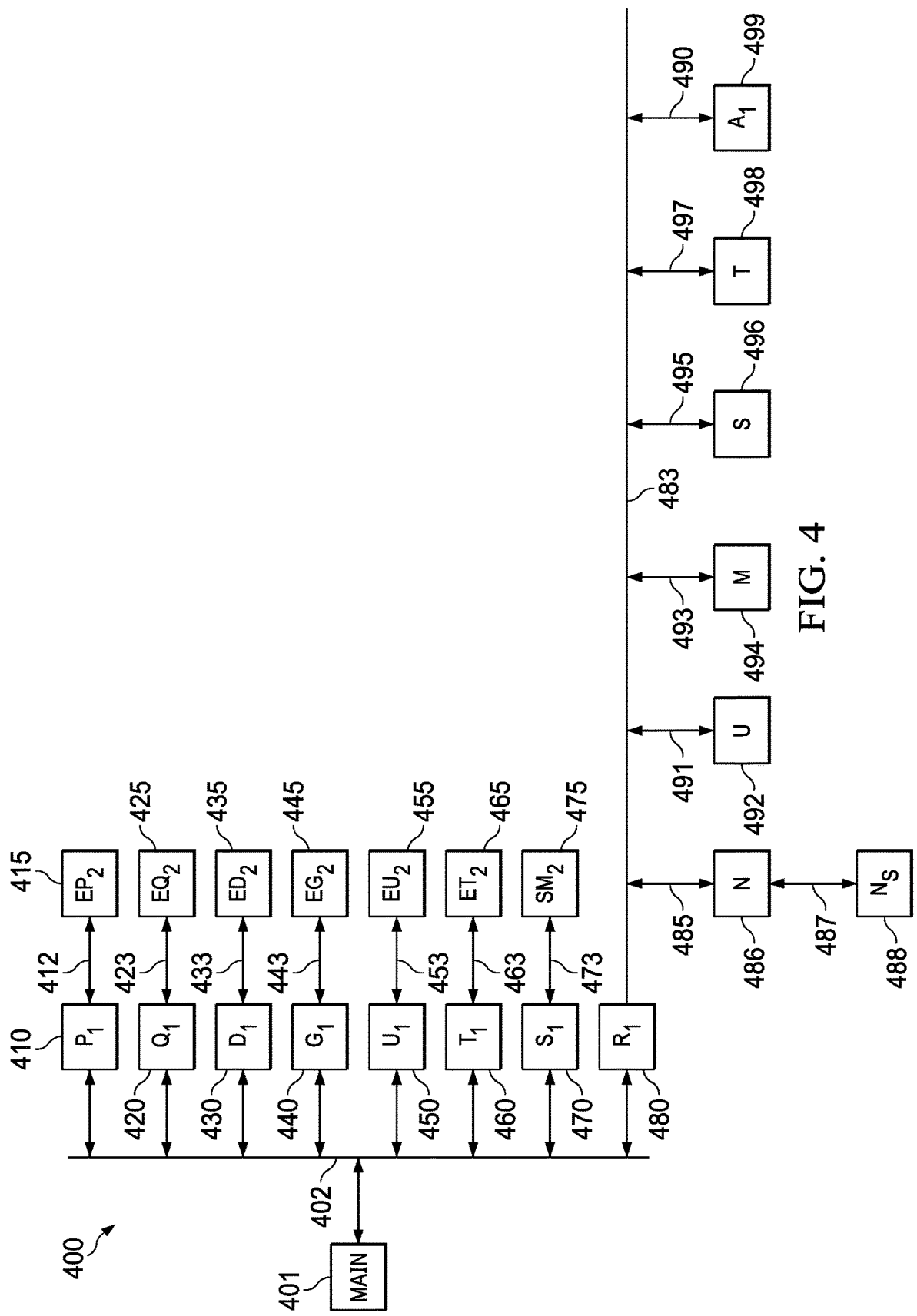
FIG. 4 is a diagram illustrative of message flows and communication links used in the present invention.

The process workflow for the present invention is shown in FIG. 4, where the main page 401 can access other pages in the program via connection 402. From the main page 401, the profiles of users, team members, companies or groups can be viewed on the profiles page 410, and the profiles can be edited on edit profile page 415 via connection 412. From the main page 401, the questions can be reviewed for standard questions or particularize users, team members, companies or groups on the questions page 420, and the questions can be edited on question edit page 425 via connection 423. Using the editing page, a dealer, user, group, team member or department can have questions asked that are particularized for their service or abilities, and the evaluation of these questions by the network can provide a benchmark standard for typical, mean or median responses (within the standard of deviation) so that personnel will be notified if responses are received outside or below that benchmark standard.

From the main page 401, the dealer identification profile can be viewed on the dealer profile page 430, and the dealer profile can be edited on edit profile page 435 via connection 433. From the main page 401, the group profiles can be viewed on page 440, and the group profiles can be edited on page 445 via connection 443. From the main page 401, the profiles of users can be viewed on the user's profiles page 450, and the user profiles can be edited on page 450 via connection 453. From the main page 401, the profiles of team members can be viewed on the team profiles page 460, and the team profiles can be edited on edit team profile page 465 via connection 463.

Messages can be viewed as received by a person on the network as shown on message page 470 as accessed via connection 402 from the main page 401, and messages can be edited on the edit message page 475 as connected to message page 470 via connection 473. Reports are generated and selected through reports screen 480, as accessed through connection 402 from the main screen 401. Reports can be viewed and generated from screen 480 via connection 483 to notifications report 486 accessed through connection 485 (which is connected to a notifications sent report page 488 accessed from notifications page 486 through connection 487, user listing reports 492 (can include users, groups, companies, or teams) accessed through connection 491, maintenance report 494 accessed through connection 493, survey results report 496 accessed through connection 495, trending report 498 accessed through connection 497. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Daily reports can also be generated from page 480, which will include the benchmark standards for selected users, group, company, team or department using a benchmark rating subroutine. The authorization access report page 499 can be accessed via connection 490. Daily reports can also be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Figure 5A:
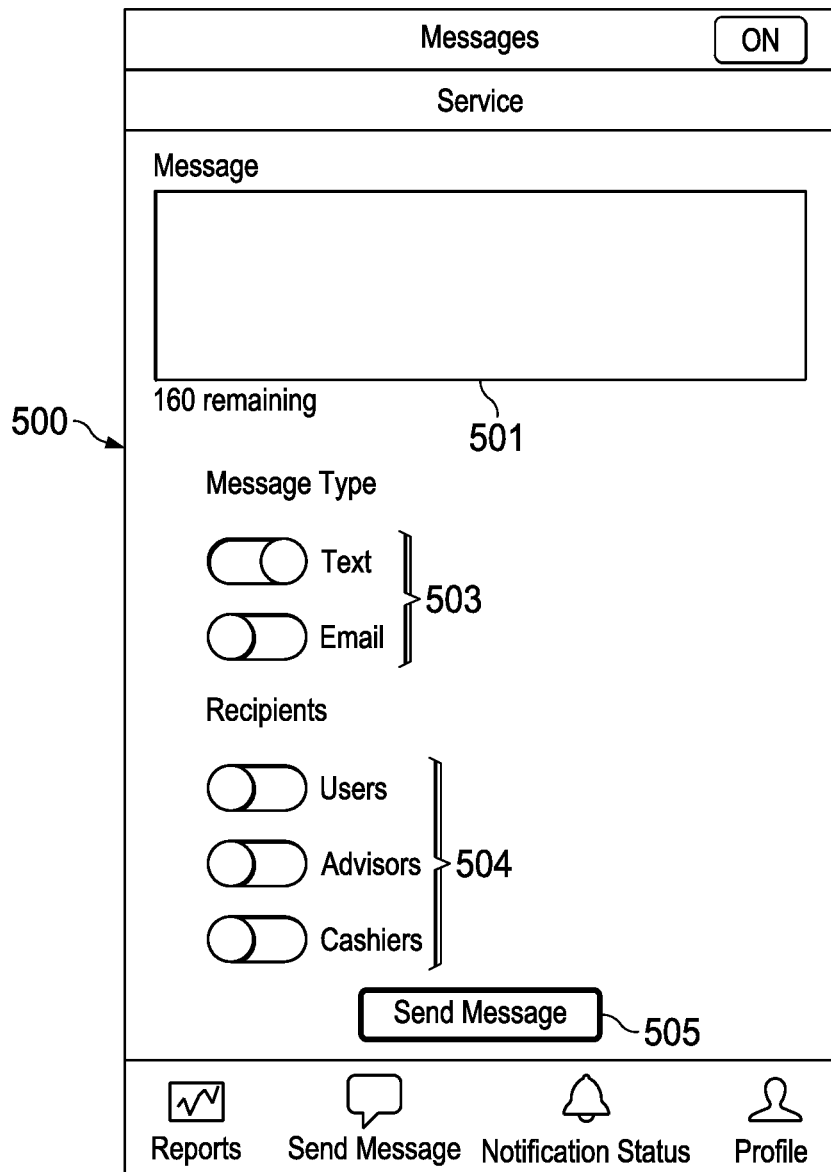
Figure 5B:
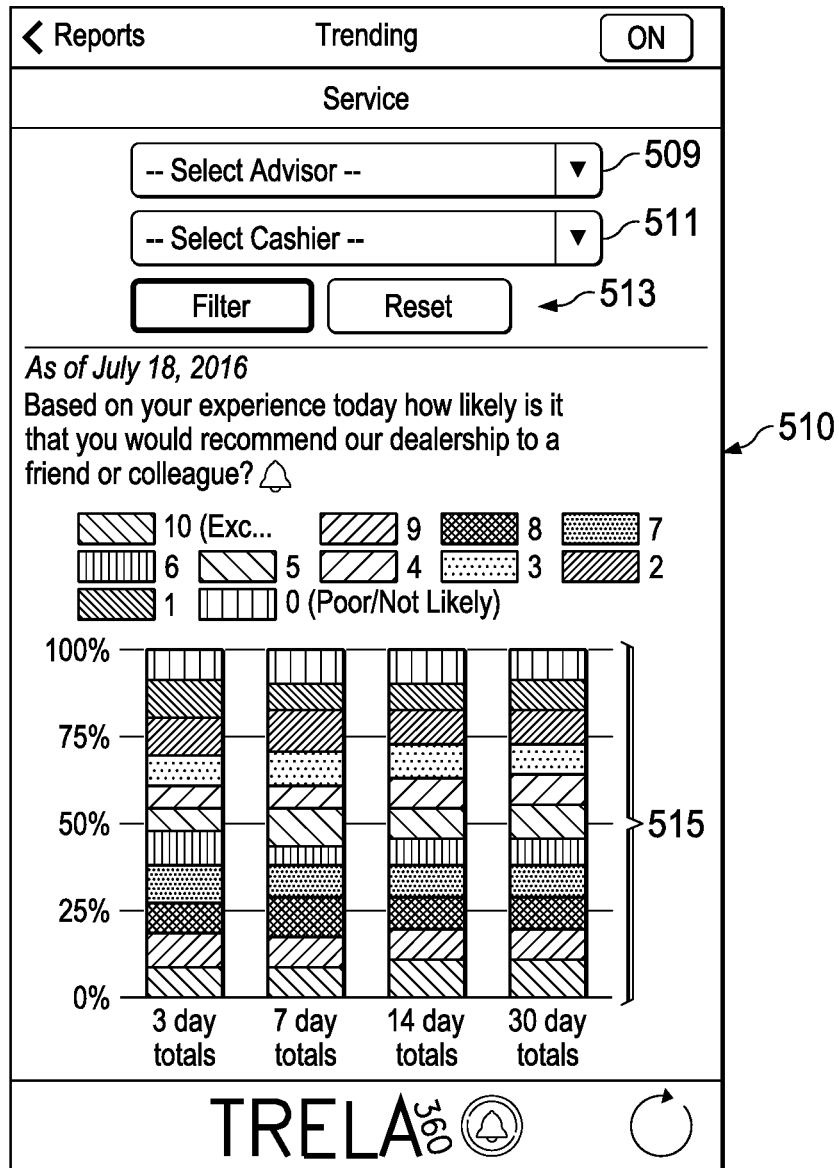

As shown in FIGS. 5A-5D, 5D1, 5D2, 5E, 5E1, 5E2, 5F, 5F1, 5F2, 5G, 5H, 5I, 5J, 5K, 5L, 5M, 5M1 and 5N, several different graphical user interfaces for the mobile hand-held unit or the desktop application are shown. These user interfaces include the messages user interface 500 shown in FIG. 5A, which shows the message 501 to be sent, the type of message selected 503, the recipients 504 and a send button 505. The trending interface 510 is shown in FIG. 5B with the advisor selection 509, cashier selection 511, filter engage or reset buttons 513, and the graphical trending data chart 515 for evaluation answers provided by customers. The Questions user interface 520 shown in FIG. 5C includes the questions posed 522 posed to customers, edit buttons 521 and the archived questions 523.

FIGS. 5D, 5D1 and 5D2 show some of the options available for the edit DCS question page. Options can be configured to meet specific requirements by the business. An edit questions user interface 530 shown in FIG. 5D shows the question being edited 531, the answer format 532, the notification setting 533, the range of customer answers 534, required answer field 536, sort order 537 for question presentation, benchmark selection 538 for use in benchmarking the results, and a save/cancel button 538. FIG. 5D1 shows another edit DCS question page 530a with fields for question being edited 531a, the answer format 532a, the alert notification setting 533a, the range of customer answers 534a, alert notification to specified recipients 535a, alert team notification setting 535b, threshold of responses that trigger the alerts 535*c*, other team members or persons to alert 535*d*, required answer field 536*a*, designate as a TR rating or TR comment question 538*b*, and a save/cancel button 538*a*.

The DSC survey questions 531*a* can be entered in English and a second language, such as Spanish, and the language can be selected prior to the start of the survey. If the customer chooses to view the DCS questions in another language, that choice is saved with the survey record and when CRS messages are sent to the customer, the messaging will be displayed in the selected language. The answer format 532*a* has the option to toggle between formats, including, but not limited to, yes/no, rating 0-10, rating 1-5, poor/excellent, not likely/likely, unhappy/happy. FIG. 5D2 shows another option of the edit DSC question page 530*b* with fields for question being edited 531*b*, options for question format, answer format, and display style 532*b*, the alert notification setting 533*b*, the range of customer answers 534*b*, alert notification to specified recipients 535*e*, alert team notification setting 535*f*, threshold of customer responses that trigger the alerts 535*g*, other team members or persons (advisors or cashiers) to alert 535*h*, required answer field 536*b*, designate as a TR rating or TR comment question 538*b*, and a save/cancel button 538*e*.

The DSC survey questions can be entered in English and a second language, such as Spanish, and the language can be selected prior to the start of the survey. If the customer chooses to view the DCS questions in another language, that choice is saved with the survey record and when CRS messages are sent to the customer, the messaging will be displayed in the selected language. The question format, answer format and display style 532*b* have the option to toggle between formats, including, but not limited to, yes/no, rating 0-10, rating 1-5, poor/excellent, not likely/likely, unhappy/happy. Display styles may be selected by toggle to show the display as normal, italic, or other style. Optionally, a separate toggle button may be included to select display formats to present the display in a formal style, as star ratings, emoticons, or other display styles may be selected by the business. The Archive/Delete option in FIGS. 5D, 5D1, and 5D2 allows the edits to be archived into a separate system. Archived data can be accessed and downloaded into spreadsheets for review.

Figure 5E:
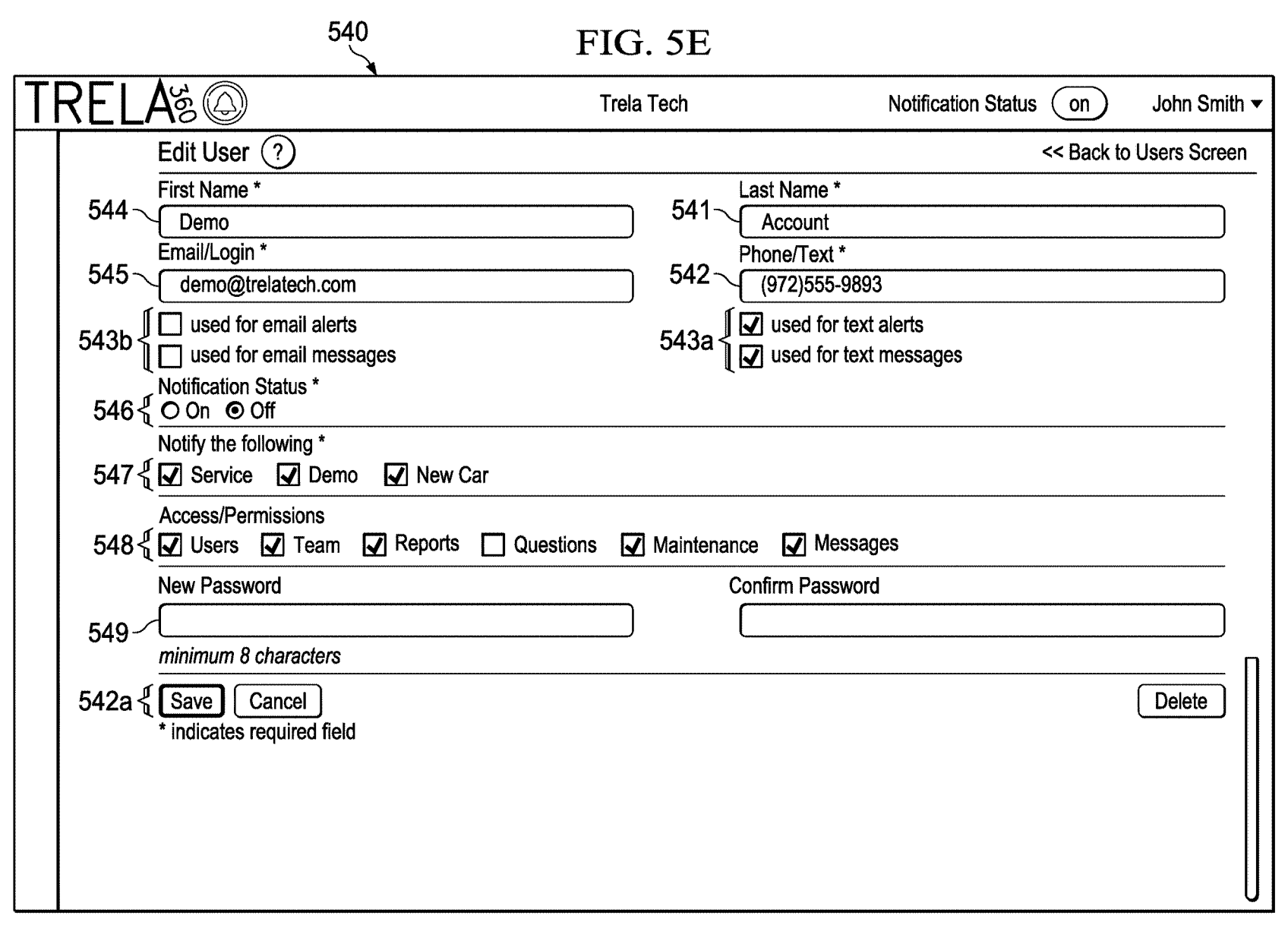

FIGS. 5E, 5E1 and 5E2 show some of the options available for the edit user page Options can be configured to meet specific requirements by the business. An edit user interface 540 is shown in FIG. 5E with a first name 544 and last name 541 fields, an email address 545, phone/text number 542, a selection to use for text alerts and messages 543*a*, a selection to use for email alerts and messages 543*b*, a notification status 546, a department selection field 547, access/permission field 548, password and confirm password fields 549, and a save/cancel button 542*a*. The edit user or team member interface 540*a* is shown in FIG. 5E1 with a first name 544*a* and last name 541*a* fields, an email address 545*a*, phone/text number 542*b*, a selection to email alert from DCS, CRS or CSC protocols 543*c*, a selection to text alert from DCS, CRS or CSC protocols 543*d*, a notification status 546*a*, a designation of the activated notification questions 547*a*, a department notifications selected field 548*a* with access/permission field, a password and confirm password fields 549*a*, and a save/cancel button 542*c*.

Another edit user interface 540*b* is shown in FIG. 5E2 with a first name 544*b* and last name 541*b* fields, a title field 544*c*, an email address 545*b*, phone/text number 542*d*, a selection to email alert from DCS, CRS or CSC protocols 543*e*, a selection to text alert from DCS, CRS or CSC protocols 543*f*, a notification status 546*b*, a designation of the activated notification questions 547*b*, a department notifications selected field 548*b* with access/permission fields, a password and confirm password fields 549*b*, and a save/cancel button 542*e*. The Department notifications and Access/Permission fields in FIGS. 5E, 5E1 and 5E2 can be customized to show departments such as service department, sales department or other related department specific to the business. The Access/Permissions can be can also be customized. Examples of some customized options for Access/Permissions include Users, Team, Reports, DCS/CRS Questions, DCS App, CRS Send, Internal Messages, Customer Messages, Maintenance, Archive, Activity Log, and Rating.

Figure 5F:

Edit team member or advisor interfaces options are shown in FIGS. 5F, 5F1 and 5F2, and these pages may be customized specific to a business. An edit team member or advisor interface 550 is shown in FIG. 5F with a first name 551 and last name 552 entry field, a type field 553 for the member, a notification status field 554, and email address 555 field with selection button, a phone/text number entry field 556 with selection button, an active button 557, and a save/cancel button 558.

The edit team member or advisor interface 550*a* is shown in FIG. 5F1 with a first name 551*a* and last name 552*a* entry field, a selection to email alert from DCS, CRS or CSC protocols or other messages 553*a*, a selection to text alert from DCS, CRS or CSC protocols or other messages 553*b*, a notification status field 554*a*, an access/permission field 556*a*, a password 557*a* and confirm password fields 557*b*, and a save/cancel button 558. Another edit team member or advisor interface 550*b* is shown in FIG. 5F2 with advisor name 551*b* and employee reference 551*c* entry fields, an email address 552*c*, phone/text number 552*d* a selection to email alert from DCS, CRS or CSC protocols or other messages 553*c*, a selection to text alert from DCS, CRS or CSC protocols or other messages 553*d*, a notification status field 554*b*, and a save/cancel button 558*b*.

A send message interface 560 is shown in FIG. 5G, which shows the message 561 to be sent, the type of message selected 562, the recipients 563 and a send button 564. FIGS. 5H, 5I, 5J, 5K, 5L, 5M and 5M1 are reports that may be generated in the system. Report field headers may be sorted by clicking on the headers.

Figure 5I:
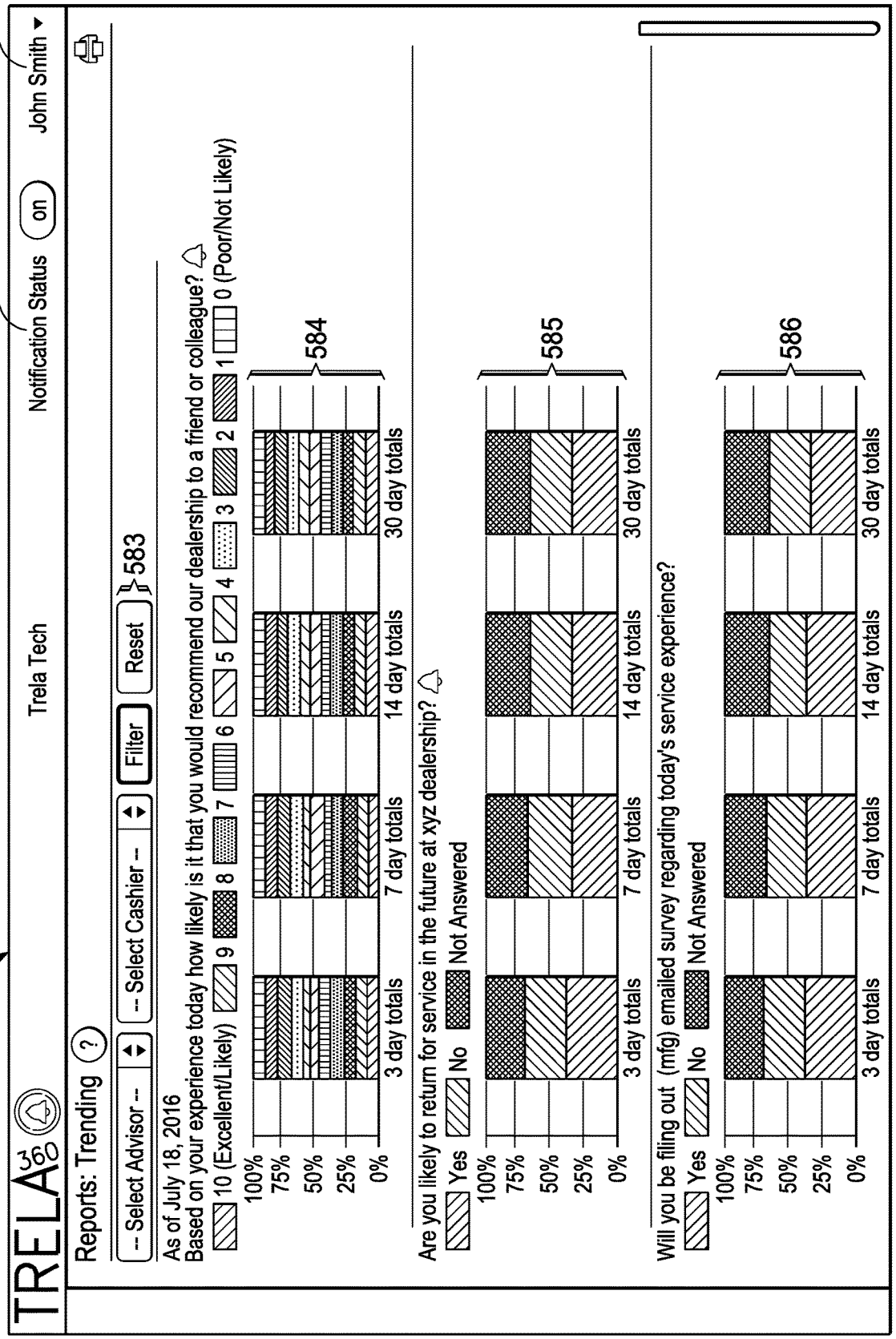
Figure 5K:
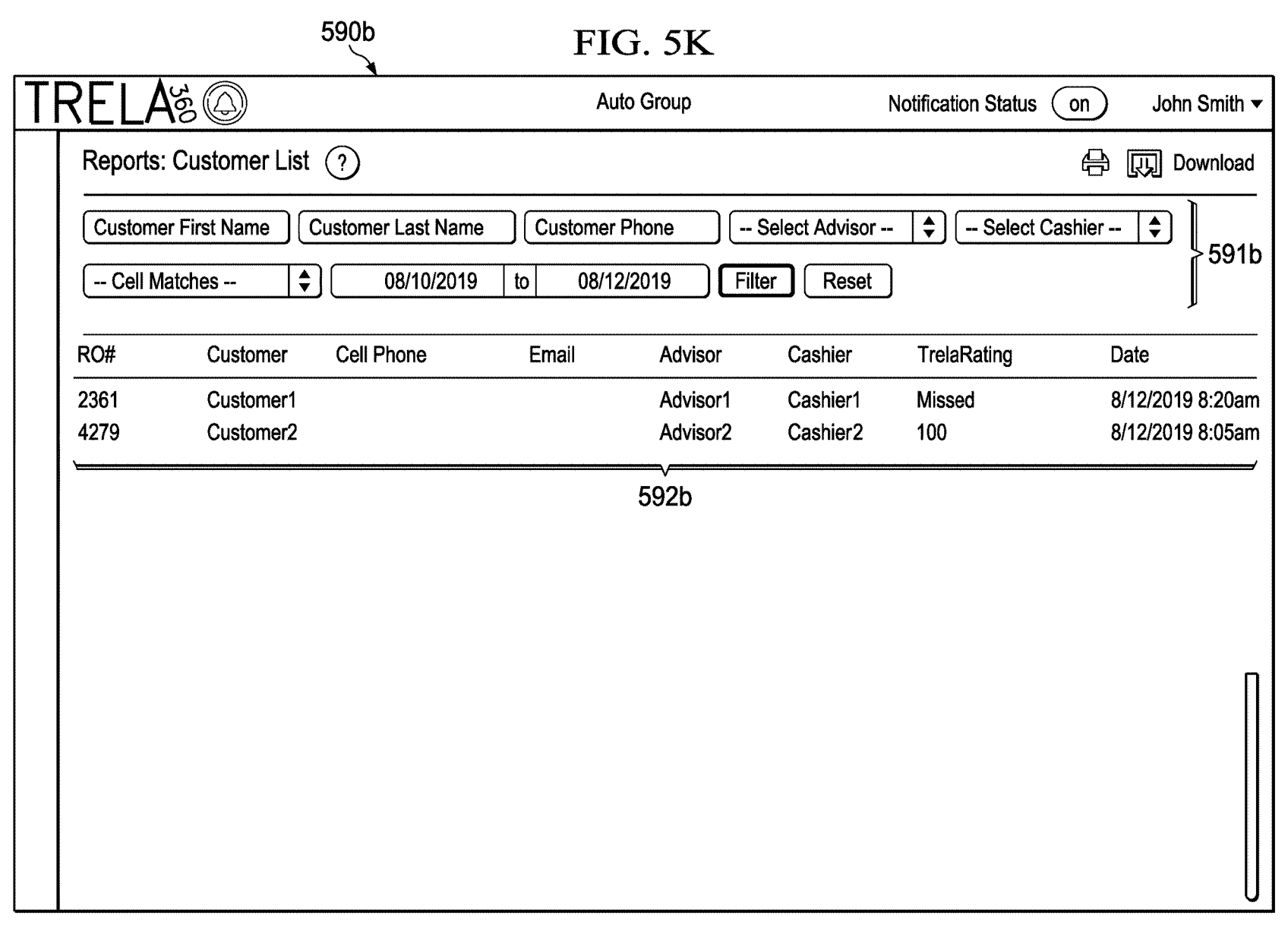
Figure 5L:
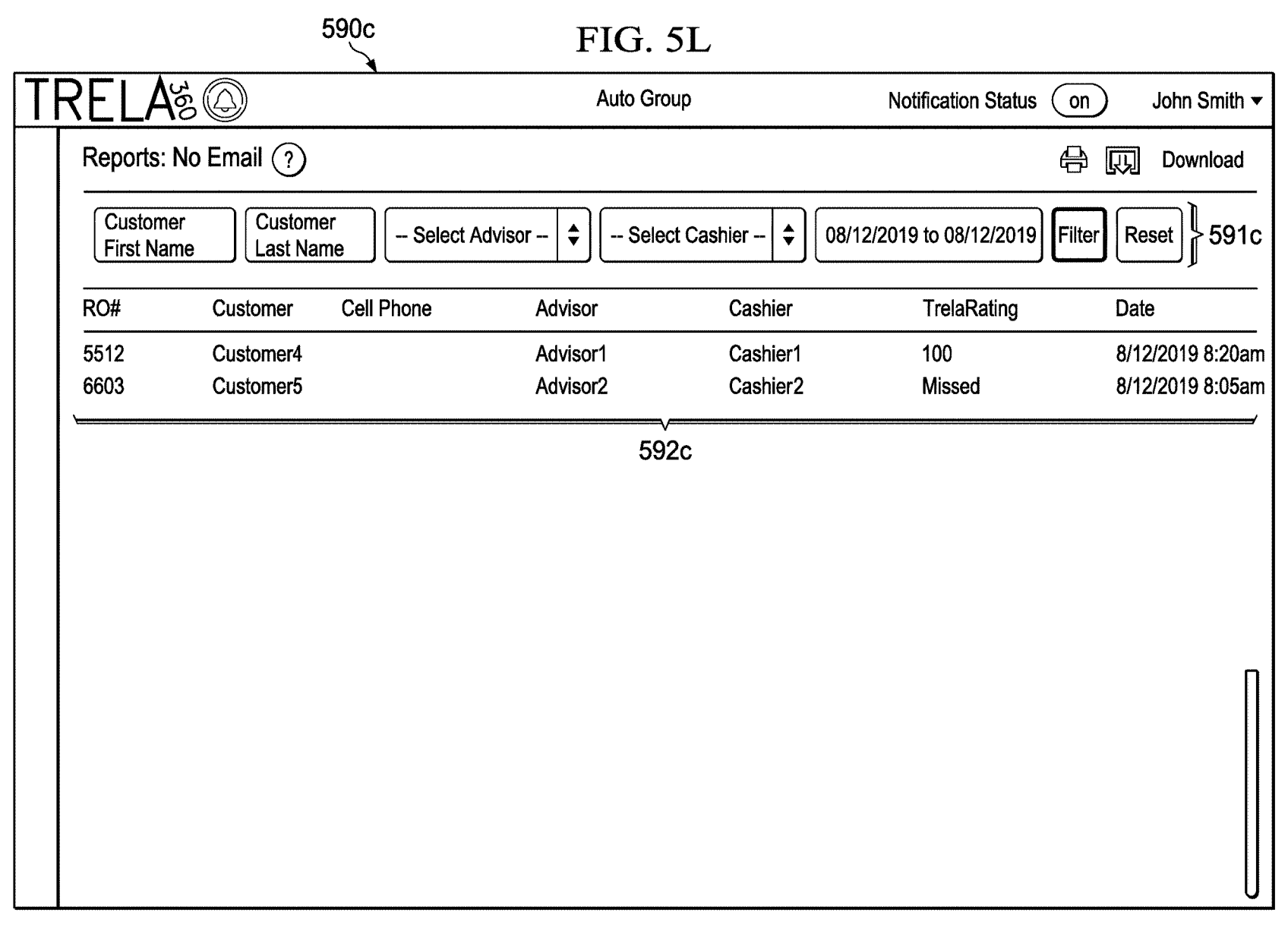
Figure 5M:

The Reports interface for Notifications 570 is shown in FIG. 5H with different company listings 571, 572 and 573 and the details buttons 575 to provide additional information on the company. Column headings for notification periods as shown include today, yesterday, 3 days and 7 day totals. These notification periods are customizable for the business and may include options such as, 14 days, 30 days, month to date (MTD) and others. The Reports interface for Trending 580 is shown in FIG. 5I with the notification status 581, the user identification 582, the selection buttons for advisor, cashier, filter and reset buttons 583 and the trending results by question 584, 585 and 586.

The selections can be customized to include additional filter options. The Notifications and Trending reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

The Reports interface for Sales 590*a* is shown in FIG. 5J, with options to filter sales data by customer name, team member names, and sale dates 591*a*. The data selections can be customized to include additional filter options. The Sales report displays the matching sale details 592*a*, including RO #, customer name, cell phone and email, team members and sale date range. The Reports interface for Customer Lists 590*b* is shown in FIG. 5K, with options to filter customer data by customer name, team member names, cell matches and sale date range 591*b*. The data selections can be customized to filter by additional options, for example other choices may be: matches, users, team, duplicates, email matches, missing email, email confirm, cell phone confirm, or other options specific to a business. The Customer List report displays the matching customer details 592*b* for RO #, customer, cell phone, email, team members, ratings and sale date. The Reports interface for No Email 590*c* is shown in FIG. 5L, with options to filter customer data by name, team member and sale date range 591*c*. The No Email report shown displays the matching customer details 592*c* for RO #, customer, cell phone, team members, ratings and sale date.

Reports for Email Confirm and Cell Phone Confirm are shown in FIG. M and FIG. M1. In the setup of the DCS survey for the customer, the cashier can enter the customer's email address. The Business can now add an option for the customer to confirm that the entered email address by the cashier is correct. The Customer confirms, or corrects, if necessary, the email address entered by cashier. FIG. M shows the Email Confirm report 590*d* with options to filter data by customer name, advisor, cashier, and date range 591*d*. Filter options may be customized for specific business needs.

The Email Confirm Report displays matching data 592*d*, such as RO #, customer name, email address before and as corrected, advisor, cashier, and date. The Email Confirm question may be added to the current questions the customer sees when filling out the DCS Live survey. This confirmation adds another level of data integrity for the Business, ensuring fraudulent email addresses are not added to the system. The Business can view reports of this information which will allow them to update the system records. Also in the setup of the DCS survey for the customer, the cashier enters the customer's cell phone number. The Business can now add an option for the customer to confirm that the cell phone entered by the cashier is correct. The Customer confirms, or corrects, if necessary, the phone number entered by cashier. FIG. M1 shows the Cell Phone Confirm report 590*f* with options to filter data by customer name, advisor, cashier, and date range 591*f* Filter options may be customized for specific business needs. The Email Confirm Report displays matching data 592*f*, such as RO #, customer name, email before and as corrected, advisor, cashier, and date. The Cell Phone Confirm question may be added to the current questions the customer sees when filling out the DCS Live survey. This adds another level of data integrity for the Business ensuring fraudulent phone numbers are not added to the system. The Business can also view reports of this information, allowing them to update their own system's records.

Figure 5N:

DCS Live setting options 590*e* are shown in FIG. 5N. Setting options for usage alerts include selection of alert send times based on reaching a certain DCS count 594, selection of team members to alert 595, selection of the DCS rating target 596, and options to save or cancel the settings 597.

Figure 6A:

Shown in FIGS. 6A, 6B, 6B1, 6C, 6D, 6D1, 6D2, 6D3, 6D4-1, 6D4-2, 6E, 6F, 6G1, 6G2, 6G3 and 6G4, are the screen displays for a mobile unit or a desktop unit as generated according to the CRS protocols in the present invention as described above. A CRS Question display screen 630 is shown in FIG. 6A with fields for inputting and displaying the CRS questions 631, a reorder button selection 632, the answer format numeric designation 633, the comment answer format 634, a notification alert trigger activation button 637, an add button 635 to add a question, and an edit question button 636. There is also an option to view archived questions. FIGS. 6B and 6B1 show some available options for an edit CRS Question page. The page is customizable for specific business needs.

An edit CRS question display screen 620 is shown in FIG. 6B, where fields are shown for input and display of CRS questions 621, answer format designation 622 (numeric, comment), user/team notification trigger alert activation 623, threshold for customer responses to activate and trigger alert notifications 624, persons designated to receive alerts and notifications 625, requirement for customer answer 626, TR rating designation for survey question 627, a save/cancel button 628, and an archive/delete button 629. The CRS questions 621 can be entered in English and a second language, such as Spanish, and the language can be selected prior to the start of the survey. If the customer chooses to view the questions in another language, that choice is saved with the survey record and when messages are sent to the customer, the messaging will be displayed in the selected language. The answer format 622 has the option to toggle between formats, including, but not limited to, yes/no, rating 0-10, rating 1-5, poor/excellent, not likely/likely, unhappy/happy.

Another edit CRS question display screen 620*a* is shown in FIG. 6B1, where fields are shown for input and display of CRS questions 621*a*, (in English or another language) question and answer format designation 622*a* (numeric, comment), user notification trigger alert activation 623*a*, threshold for customer responses to activate and trigger alert notifications 624*a*, persons designated to receive alerts and notifications 625*a*, team notification trigger alert activation 623*b*, threshold for customer responses to activate and trigger alert notifications 624*b*, team members designated to receive alerts and notifications 625*b*, requirement for customer answer 626*a*, TR rating designation for survey question 627*a*, a save/cancel button 628*a*, and an archive/delete button 629*a*, which archives data that can be accessed and downloaded into spreadsheets for review. The CRS questions can be entered in English and a second language, such as Spanish, and the language can be selected prior to the start of the survey. If the customer chooses to view the questions in another language, that choice is saved with the survey record and when messages are sent to the customer, the messaging will be displayed in the selected language. The question format and answer format 622*a* have options to toggle between formats, including, but not limited to, yes/no, rating 0-10, rating 1-5, poor/excellent, not likely/likely, unhappy/happy.

Figure 6C:
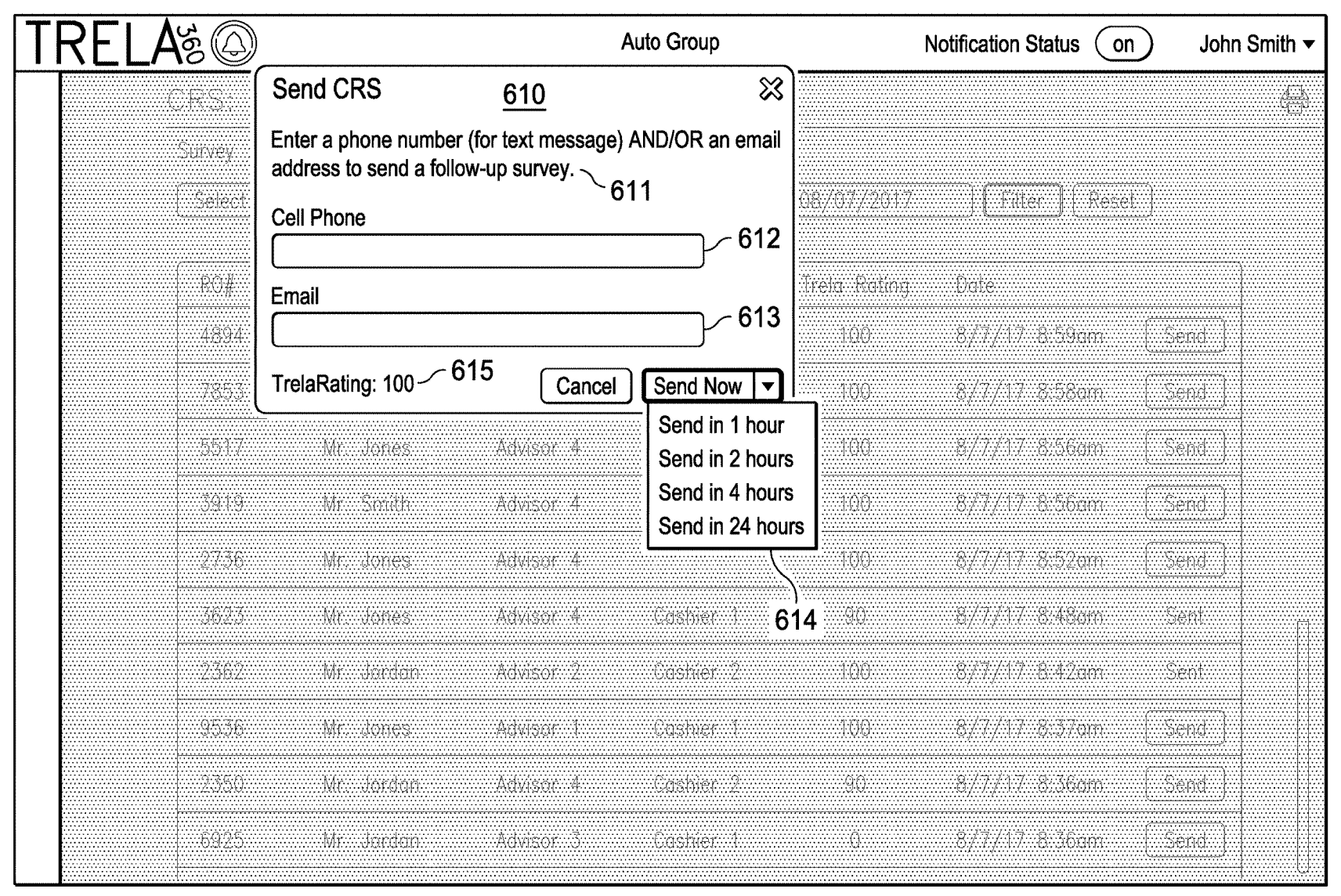

As shown in FIG. 6C, the Send CRS protocol screen 610 has instructions 611, a cell phone entry field 612, an email entry field 613, a TR rating score display, and a cancel/send now (or later) button 614.

FIGS. 6D, 6D2, 6D4-1, and 6D4-2 show options for the CRS settings page. These settings are customizable for specific business uses. FIGS. 6D1 and 6D3 show options for the Dashboard page. Settings for these pages are customizable for specific business needs. FIG. 6D shows a CRS screen 600 that permits designation of TR questions 601 as a TR rating survey question or TR comment questions, scheduling of the CRS field 602, manual send CRS field 603 for designation of threshold responses to trigger a CRS request, interval to send CRS field 604, TR designation question display field 605, social media linkage activation 606 and the save button 607. FIG. 6D1 shows a dashboard screen 650 with DCS survey TR ratings 651 shown at 651a-d for different time periods, percentage of completion and declined information fields 652. CSC responsiveness fields 653 are shown at 653a-d for different time periods, with an asterisk to denote urgent CRS designation flags 654. The CRS responsiveness fields 655 are shown at 655a-d for different time periods, and completion and transmission fields 656 and 657.

FIG. 6D2 shows another option for a CRS Follow-Up Settings screen 610a that permits designation of DCS questions 611a as a TR rating survey question or TR comment questions, scheduling of the CRS message field 612a, a manual send CRS field 613a for designation of threshold responses to trigger a CRS request with options to include declines and missed responses, option to specify interval to send CRS field 614a, a CRS rating target field 615a, and the save/cancel button 617a. FIG. 6D3 shows another dashboard screen 640 with survey DCS Live ratings 641 at 641a-d for different time periods, percentage of completion of information fields 642, including completed, declined, missed, total, CRS follow-up responsiveness fields 645 at 645a-d for different time periods, and completion, sent and reminder fields 646.

Time periods for the Dashboard display in FIGS. 6D1 and 6D3 can be customized. FIGS. 6D4-1 and 6D4-2 show another option for a CRS Follow-Up Settings screen 610b. Shown are options for DCS TR rating question 611b, CRS automatic scheduling. 612b, including rating to automatically send CRS messaging and if declined, CRS manual sending 613b, including customer rating to trigger manual sending, if declined, and to specify the time frame 614b. Also shown are options for CRS TR rating questions 616, CRS reminder options 618, including thanking a customer, automatically sending a CRS reminder at a specified response rating and timing scenarios based on whether a CRS was completed within or after the specified time-frame. A CRS Reminder may be sent in addition to the CRS Follow-up. This CRS reminder, fully configurable by the Business, can be sent at a specified time interval depending on how the CRS questions are answered.

There are two time period options the Business can set—1) if the Customer answers the CRS questions within the $1^{st}$ specified time, then the reminder is sent based on that time interval from when the DCS Live was first completed; and 2) if the Customer answers the CRS questions outside the $1^{st}$ specified time, then the reminder is sent based on the $2^{nd}$ time interval specified after the CRS was completed. CRS Reminders may include notification to a customer about a future message or survey that may be send by the business or another related business, such as a manufacturer. The screen also has a CRS rating target field 615b and an option to save/cancel 617b.

Figure 6F:

In FIG. 6E, the transmission message screen 660 is shown with message field 661, message type field 662, recipient designation 663, and send message button 664, and in FIG. 6F, the profile page 660a for the customer, user, or team members is shown with fields for first name 661a, last name 662a, email address 663a, cell phone 664a; notification status field 665a, password 666a, confirm password 667a, and save/cancel button 668a.

Figure 6G3:
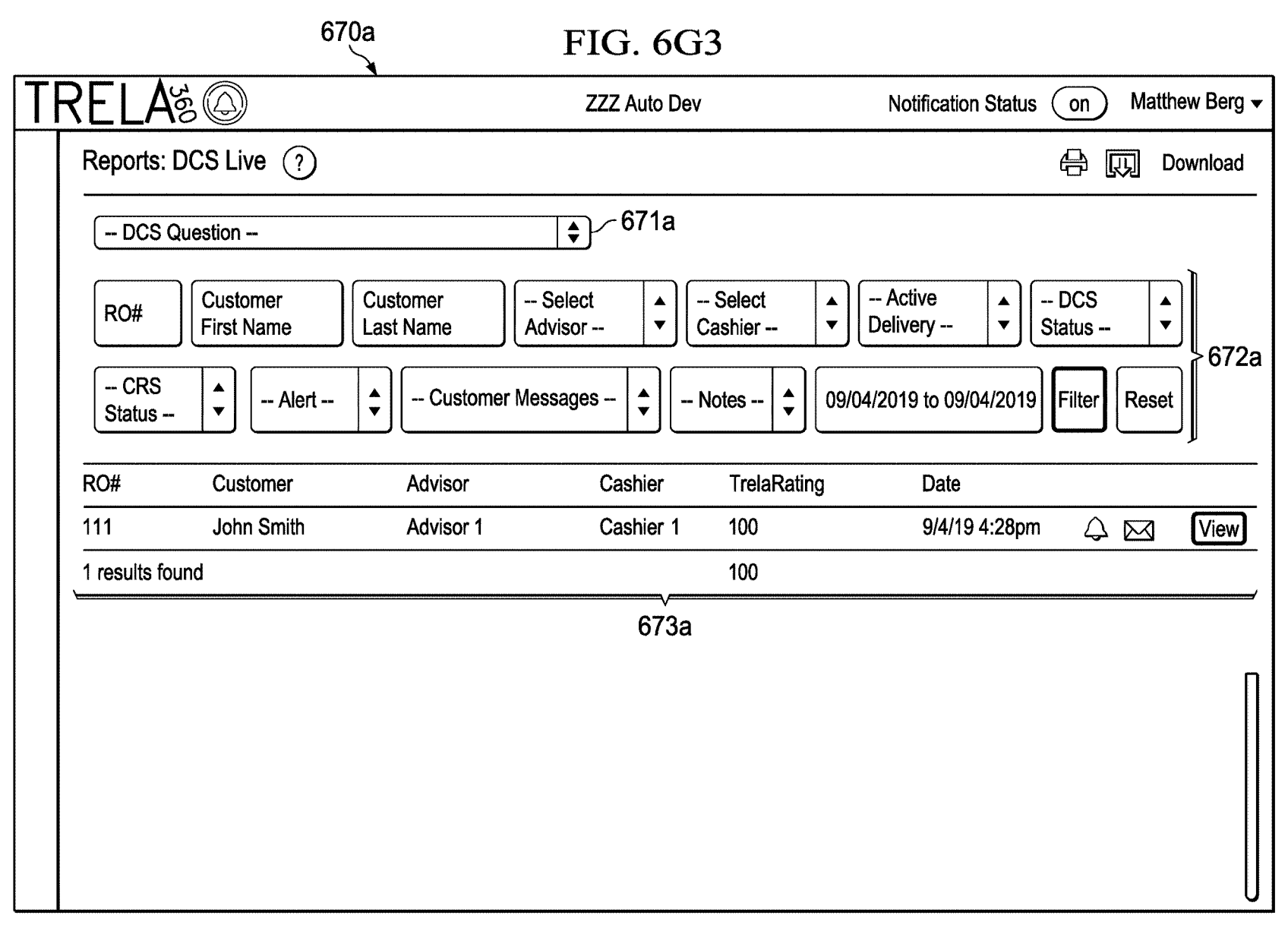
Figure 6G4:
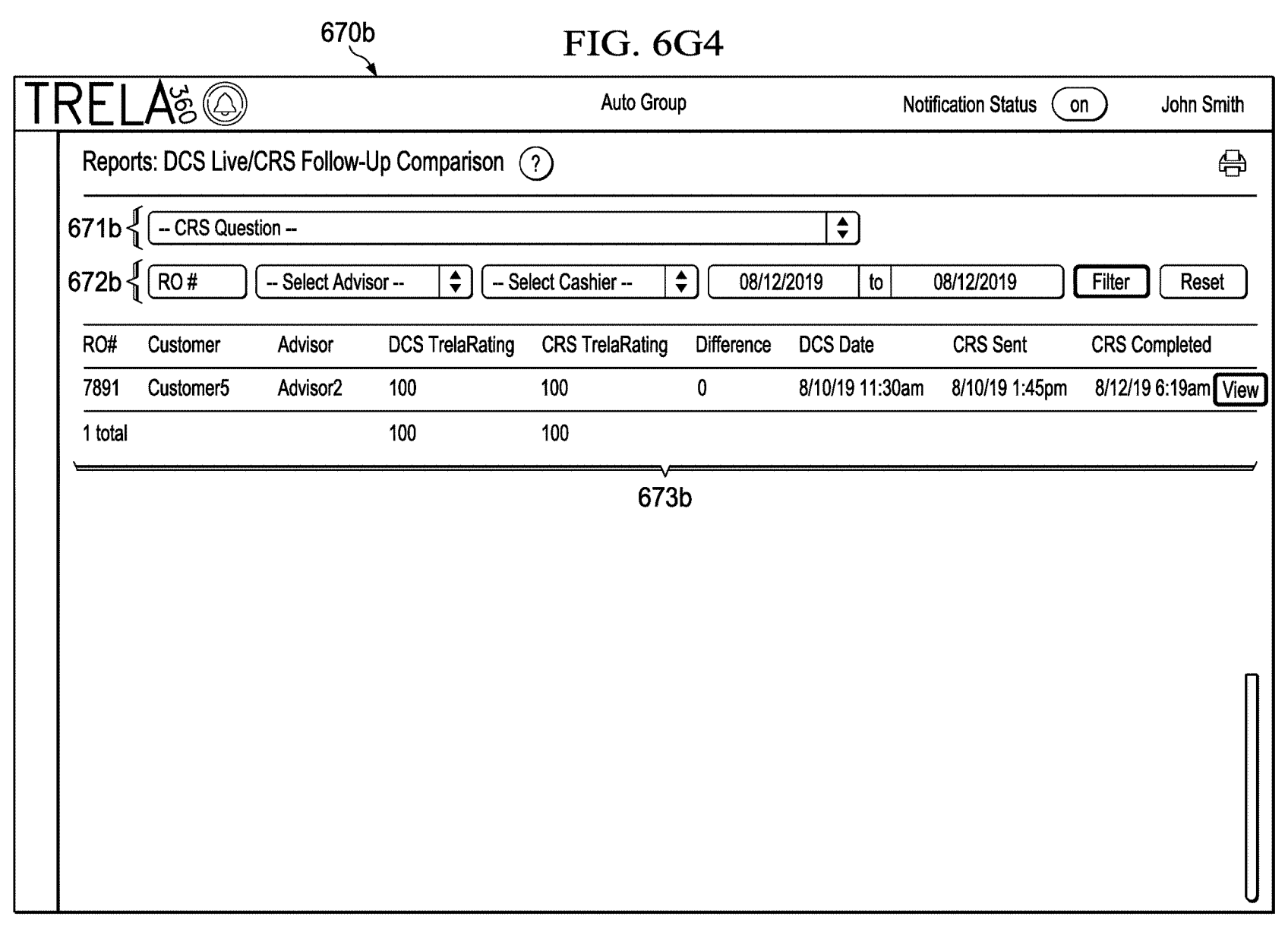

FIGS. 6G1, 6G2, 6G3 and 6G4 show screens for CRS reports, DCS reports and DCS/CRS comparison reports. A CRS Report screen 670 is shown in FIGS. 6G1 and 6G2 with a field for CRS Question selection 671, and identification information filter field 672. Filter selections are customizable for specific business needs and additional filters included. Historical responses and rating information display field 673 are shown for the customer, advisor, cashier, date range set by the filter. Survey ratings (DCS Live) and CRS ratings are shown, along with the difference between the two ratings, the date of the live survey, the date the CRS survey was sent and when the CRS survey was completed and include an option to view the record. This comparison provides an important source of metrics for the business as it relates to customer satisfaction. If a significant difference is noted between the DCS Live survey rating and the CRS survey rating, the business can follow-up with the customer. CRS reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company. A DCS Report screen 670a is shown in FIGS. 6G3 and 6 with a field for DCS Question selection 671a, and identification information filter field 672a. Filter selections are customizable for specific business needs and additional filters included. Historical responses and rating information display field 673a are shown for the customer, advisor, cashier, rating and date range set by the filter and include an option to view the record.

A DCS/CRS comparison report is shown in FIG. 6G4. The Reports interface for DCS Live/CRS Follow-up Comparison 670b in FIG. 6G4 shows options to compare responses for a selected CRS survey question 671b and filter response data by RO #, team member, and date range 672b. The DCS Live/CRS Follow-up Comparison report displays the matching response details 673b with RO #, customer name, team member, DCS rating, CRS rating, difference between DCS and CRS rating, DCS date, CRS send date and CRS completion date and include an option to view the record. Survey ratings (DCS Live) and CRS ratings are shown, along with the difference between the two ratings, the date of the live survey, the date the CRS survey was sent and when the CRS survey was completed providing an important source of metrics for the business as it relates to customer satisfaction. If a significant difference is noted between the DCS Live survey rating and the CRS survey rating, the business can follow-up with the customer.

As shown in 6H, 6H1, 6I1, 6I2, 6I3, 6I4, 6J, 6J1, 6J2, 6K and 6L, the screen displays for a mobile unit or a desktop unit as generated according to the protocols in the present invention as described above. The CSC Reports screen 675 is shown in FIG. 6H with an identification information field 676, here showing options for selection of advisor, importance and date range. Options for filters are customizable for specific business needs. Historical responses and comments display field 677 are shown for the campaign, customer, advisor, and date range set by filter, and include an option to view the record. Customer comments entered in the surveys are visible adjacent to the advisor and customer for ease of reference. FIG. 6H1 shows a Team Report 675b. Ratings are shown for Advisors 676b and Cashiers 677b. DCS/CRS rating values options shown here are today, yesterday, 3 day, 7 day and month to date (MTD) along with the date last used. Options for time periods shown are customizable for the report. Overall ratings are tabulated at the bottom of the records.

Figure 614:

A Daily Reports screen 680 is shown in FIGS. 6I1-6I2-6I3 with the identification information filter field 681 and the display fields for data from survey responses over specified time periods. Shown here are time period options for today, yesterday, 3 days and 7 days; however, the time periods are customizable for specific business needs. Answers to DSC survey questions are displayed. Options shown are an overall customer service rating display 682 and a likely to return display 683. The Daily report can be customized to include any of the questions that appear on the DCS survey. Also shown are an active delivery reports field 684, survey completion totals field 685, and CSC display field 686. CRS displays options shown here include a CRS overall customer service question display field 687, and a comments answered field 688, showing the percentage of surveys with the comments questions answered and not answered. The Daily report can be customized to include any of the questions that appear on the CRS survey. A CRS Follow-Up Comments Report screen 680a is shown in FIG. 614 with the team member/date identification information filter field 681a and the results report display field 689 showing the RO #, customer name, team members, rating, and comments for the selected date range and an option to view the record. Options for filters are customizable for specific business needs and the report may additionally specify a selected CRS question, DCS status, Reminder status, Alert status, Reputation click, Customer messages and Notes as filters. The options may be added as additional fields with selectable options.

Figure 6J1:
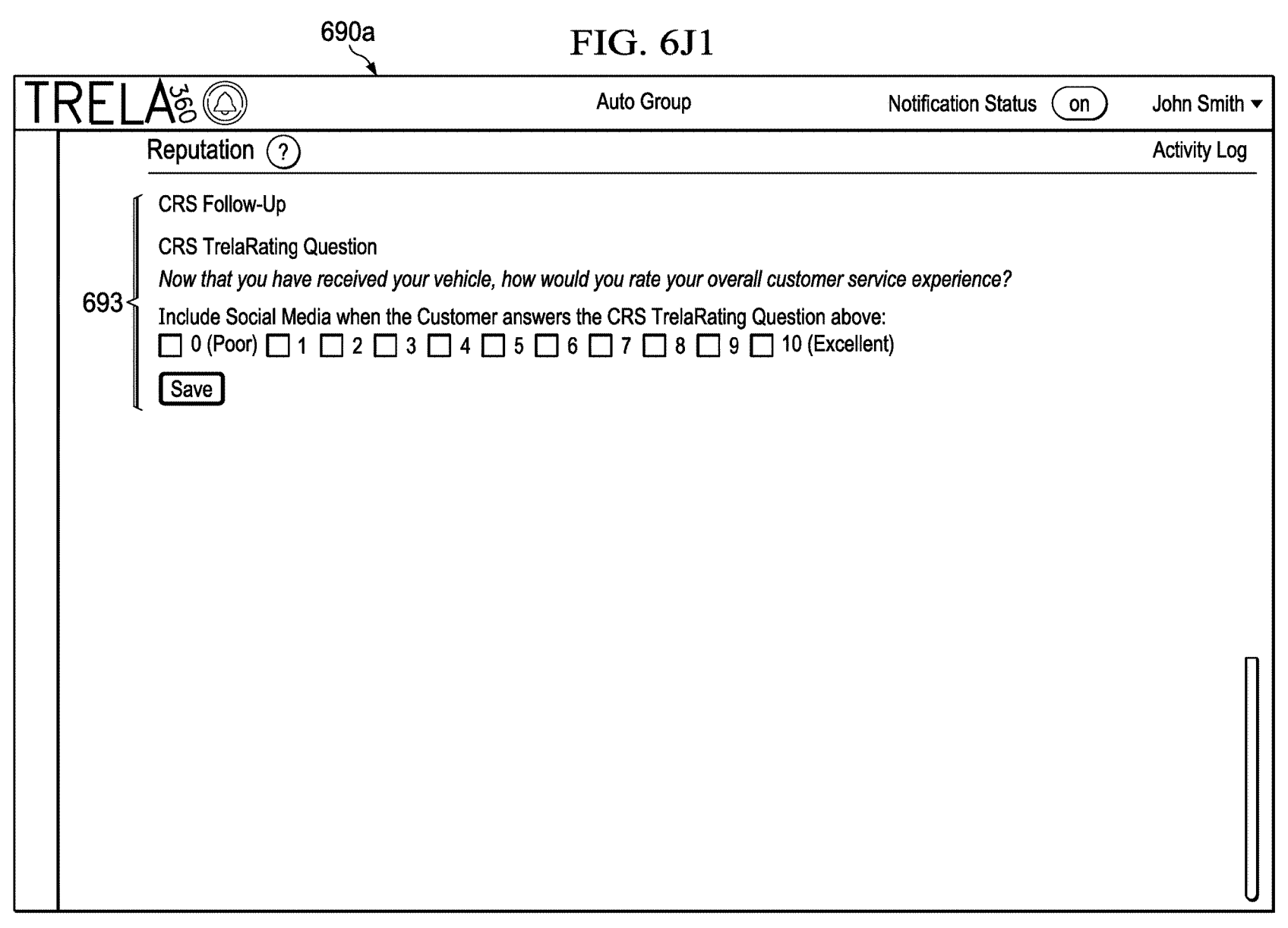
Figure 6L:

The Social Media screen 690 in FIG. 6J displays a source field 691 and a display report of social media comments and ratings 692. The Reputation screen 690a in FIG. 6J1 shows a CRS Follow-Up setting 693 with an option to send the customer a social media link or request when the customer's CRS response falls within the designated answer range to a specified CRS rating question. A Reputation report screen 690b is shown in FIG. 6J2 with the team member/date identification information filter field 696a for display of the Reputation and Social Media statistics for the selected data range. A statistic chart 696b shows numbers of clicks on Social Media and review cites with an option button to access the reviews. A pie chart 696c shows a graphical representation of the same statistics shown in the chart. A Dealer report screen 694 is shown in FIG. 6K with a listing dealer display field 695. A TR Ratings screen 697 in FIG. 6L shows a dealer display field 698 with ratings for each dealer and an unassigned auto group field 699.

Figure 7C:
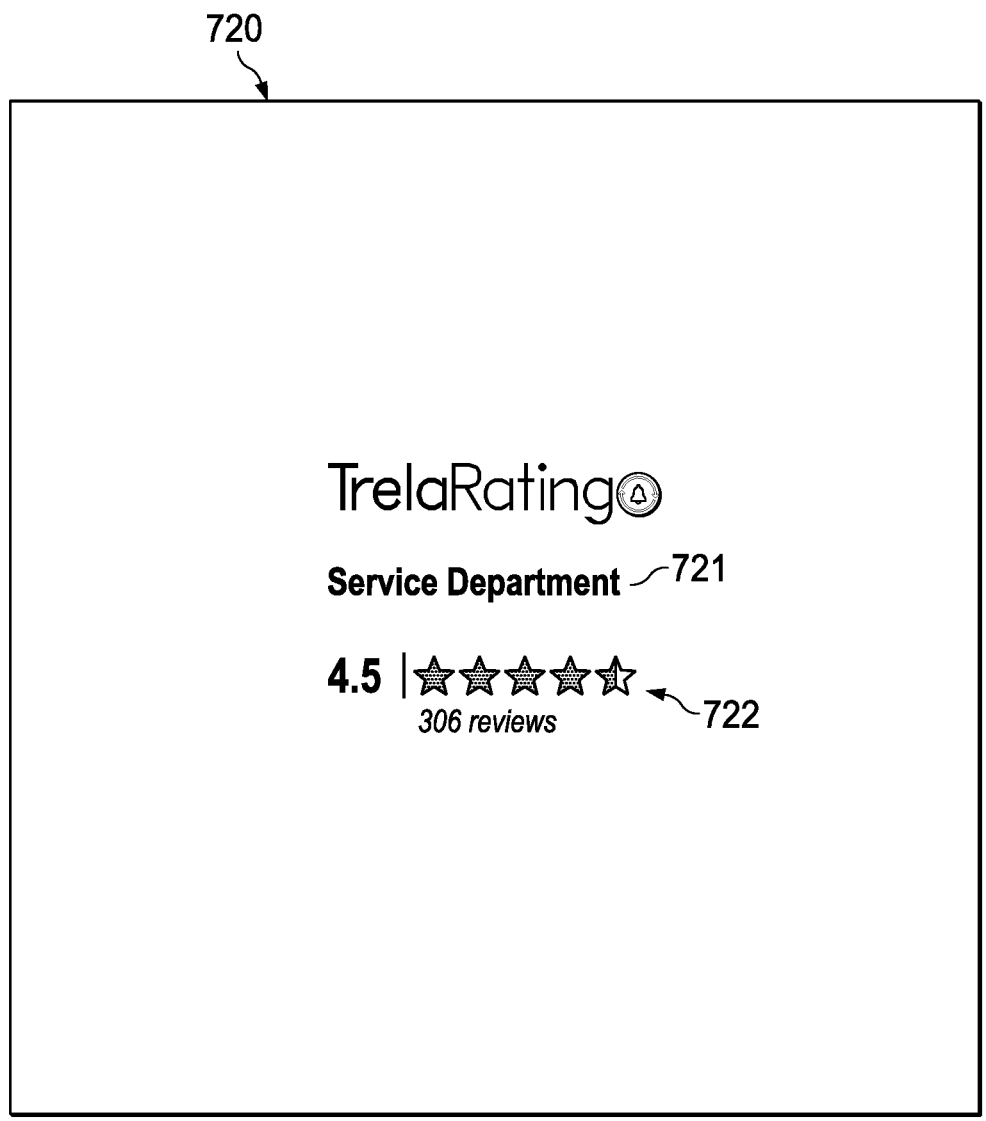

FIGS. 7A1, 7A2, 7B, 7C, 7D, 7E, 7F and 7G show the screen displays for a mobile unit or a desktop unit as generated according to the TR rating service protocols according to the present invention. The TR Rating Details report screen 700 is shown in FIG. 7A1-7A2 with a group field 701a, represented here as an auto group, an overall customer experience display report field 701b, a distribution of ratings field 702, a likely to return distribution field 703, a share comments request distribution field 704, and an enter an email address distribution field 705. The filters and the questions are customizable and may be made specific to a business. The TR Rating reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

In FIG. 7B, the TR comments survey screen 710 is shown with satisfaction question fields 711 and 712 and likely to return field 713, as well as additional comments question field 714. The Five Star Rating screen 720 is shown in FIG. 7C with a department display field 721 and a rating display field 722. The thank you appreciation screen 730 is shown in FIG. 7D with an overall experience question field 731 and any other comments entry field 732. A CSC screen 740 is shown in FIG. 7E with a name field 741, answer field 742, urgent designation 743, a comments entry field 744 and a submit button 744.

Figure 7G:
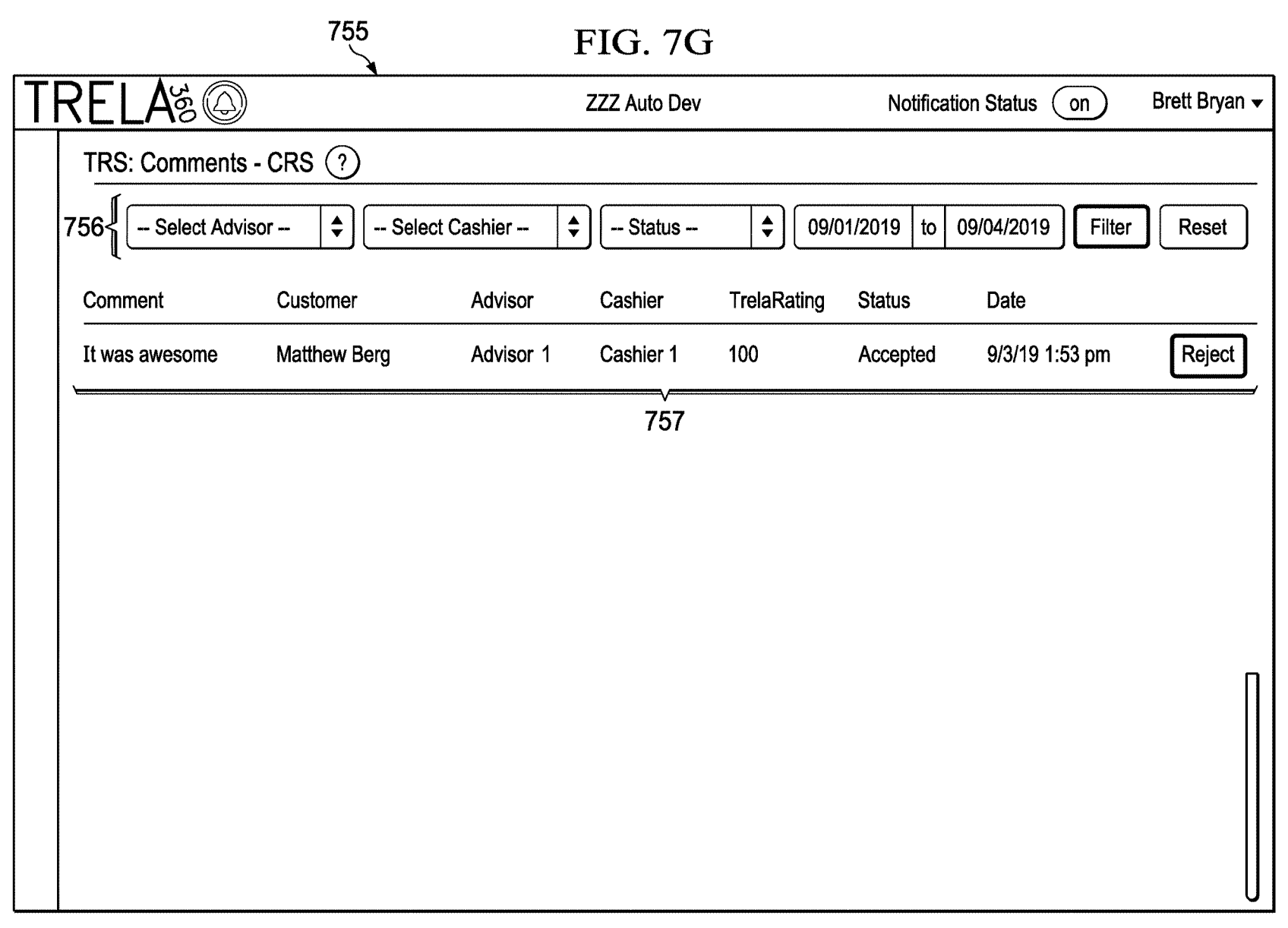

FIG. 7F shows a TR survey settings screen 750, with a selected DCS question to automatically added to the TRS based on a specified range of customer answers 751, a selected CRS question to automatically added to the TRS based on a specified range of customer answers 752, and a save option 753. FIG. 7G shows a TR survey CRS Comments screen 755, with identification information filter field 756. Filter selections are customizable for specific business needs and additional filters may be included. Historical responses and rating information display field 757 are shown with the comments, customer, advisor, cashier, rating, status and date range set by the filter and include an option to reject the record.

Figure 8A:
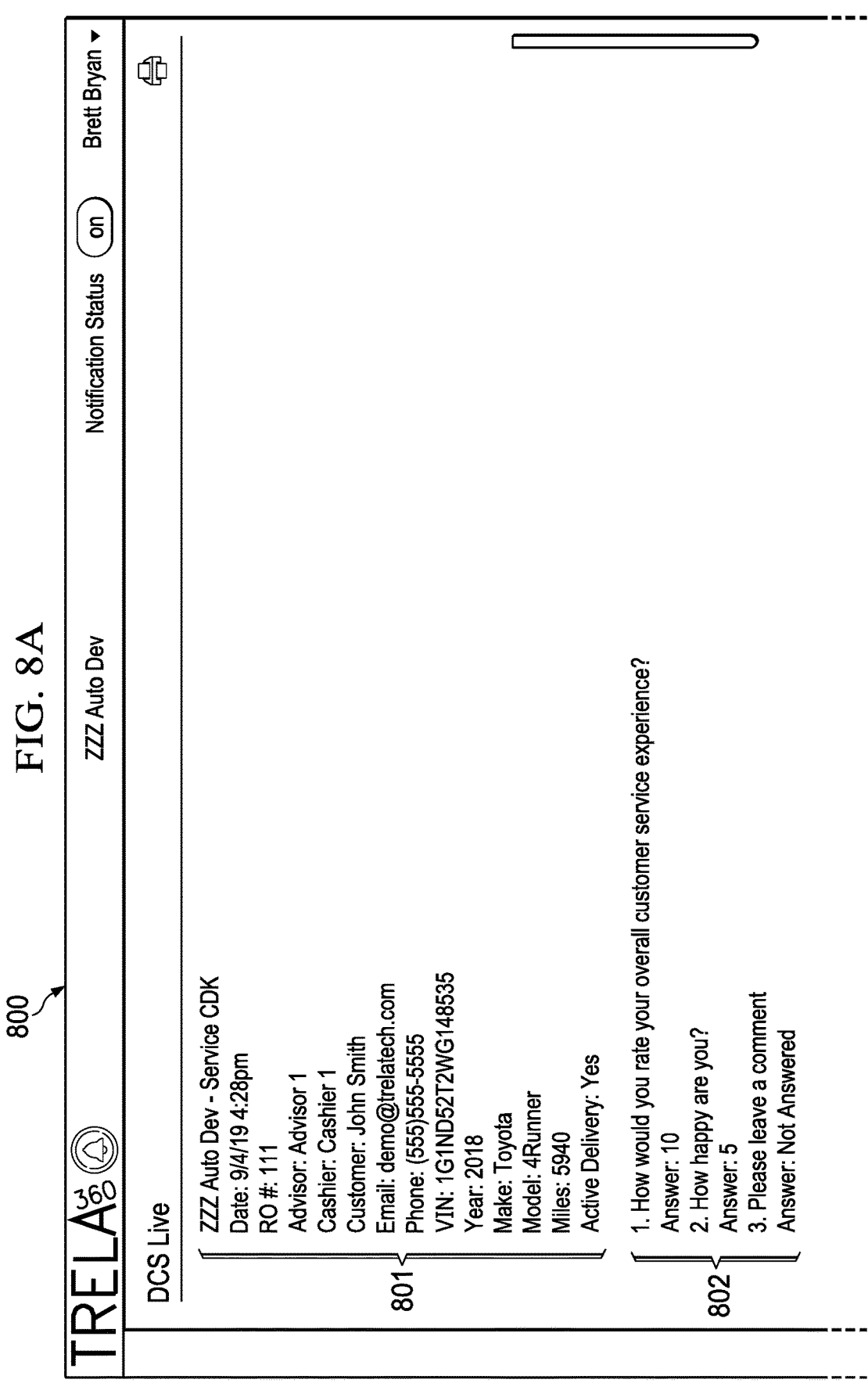

FIGS. 8A-8C shows a comprehensive record 800 displaying all of the interactions and data for a transaction. The DCS Live data includes customer details 801 from the start page including Customer confirmation of email addresses and phone numbers, and the DCS survey questions and responses 802, with any comments made on the DCS survey. CRS follow-up data 803 includes date and time the CRS survey is sent, completed and the CRS reminder is scheduled, as well as the survey questions, answers and any comments made on the CRS survey. Reputation clicks 804 to social media sites are recorded by site, and date and time of post. Customer message data 805, including manual responses from advisors and managers are part of the record. Following the transcribed messages, there is an option to compose and send a message to the customer 806. Any notes 807 added by team members are included in the records with a date and time stamp. An option to add another note to the record is also included 808. The comprehensive record allows a business to have a complete overview of a transaction with a customer in one place, without have to go between survey report fields and CRS messaging. All of the survey questions, responses, and comments originate in the system and are recorded. Likewise, all communication originate within the system, rather than through individual team members, allowing for a complete transaction history. Having all the messages and interactions originate and recorded within the system also decreases the likelihood of fraudulent information being added to the record and increases employee accountability.

The disclosed system provides a high level of fraud protection for users. Businesses have the ability within the system to search customer files for duplicate cell numbers and email addresses and to search for management/employee matching cell numbers and email addresses. This is an important tool for preventing, finding and stopping employee fraud, The Business can find matches and/or misuse of information which can damage the quality of the data. The business would be able to see if an employee is sending the fraudulent CRS follow-up or otherwise manipulating the responses to o prevent the management from seeing negative customer feedback.

The disclosed systems provides a high level of employee accountability. Businesses will have the ability to filter data by employee name and in doing so, the employee becomes accountable on every aspect of that TRS generated survey data. The business can verify if employees have provided the required level of customer service. The team report is a key report showing employee accountability. This report compares how the customer felt when leaving the dealership (following the DCS Live survey) and how the customer felt at a later time (CRS follow-up survey). The later time may be a couple of hours for a service department or up to 24 hours for a new purchase. Ideally, there should not be much change in the overall rating between the two surveys. If there is a large difference, management is alerted to a potential problem. In the DCS/CRS Comparison, the ratings are again compared for before and after surveys and filtered by employee. Businesses also are able to have live feedback of how an employee is viewed by customers.

The survey data is secure and reliably confirmed customer-only data because all of the interactions originate and are maintained within the system. The ratings are all positively identified as customer only data tied to specific transactions. Posts on public rating services are not validated and verified as customers of the business and may be less reliable representations of customers' opinions. Anyone can enter in a comment about any business on a public rating site with no confirmation that the person was a true customer of that business . . . This prevents false rating, both good and bad from tainting the ratings. The present system will only display comments from customers who are tied to a specific transaction number so there is complete accountability. A business can put TRS widgets on the website to show live customer comments feedback and ratings from the customers on the DCS and/or CRS surveys. Additionally, the number of comments and reviews is much higher with the TRS system.

Each of the components, functionalities and steps described for the present invention are considered to be novel because each individually enhances the operation of the computer system over that of a generic computer system. Moreover, the ordered sequence of steps 1-4 of the DCS system, with the additional components, functionalities and steps and with the addition of the subsequent location recognition steps, is believed to be novel in that the ordered combination of steps transforms the claims into patent-eligible subject matter.

Moreover, the sequence of steps ordered in Direct Customer Survey or "DCS", alone or in combination with the additional system components, steps and functionality individually associated with the Customer Response Service ("CRS"), the Comments, Suggestion and Concerns service ("CSC"), and the TRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems. The sequence of steps ordered in Customer Response Service ("CRS"), alone or in combination with the additional system components, steps and functionality individually associated with the Direct Customer Survey or "DCS", the Comments, Suggestion and Concerns service ("CSC"), and the TRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems.

The sequence of steps ordered in the Comments, Suggestion and Concerns service ("CSC"), alone or in combination with the additional system components, steps and functionality individually associated with the Direct Customer Survey or "DCS", the Customer Response Service ("CRS"), and the TRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems. The sequence of steps ordered in TRS authenticated survey rating service, alone or in combination with the additional system components, steps and functionality individually associated with the Direct Customer Survey or "DCS", the Comments, Suggestion and Concerns service ("CSC"), and the Customer Response Service ("CRS") are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems.

The foregoing description of embodiments of the invention has been presented only for the purpose of illustration and description and is not intended to be exhaustive or to limit the invention to the precise forms disclosed. The present invention correlates and associates various customer data provided during stages of surveys and during associated requests for feed-back to provide integrated notifications and notices, as well as integrated data sharing, to team members, associates, dealers, department members, and any other associated or affiliated person. While the preferred embodiment describes a car dealership/service department scenario, the present invention could be used in any retail service situation (or retail sales of goods). Numerous modifications and adaptations thereof will be apparent to those skilled in the art without departing from the spirit and scope of the present invention.

We claim:

1. A method comprising the steps of:

receiving at a hardware data processor a first set of customer experience feedback responses provided by a customer using a first mobile unit in response to a first survey request at a hardware data processor coupled to a plurality of non-transitory storage devices and one or more input/output ports that are coupled to one or more input/output devices, said hardware data processor being specialized to enhance the operation of the computer system, enhance the performance and efficiency of the hardware data processor, and capable of execution of one or more specialized subprograms to collect, convert, and consolidate customer service information, files and service information provided by one or more different source and in one or more different format;

evaluating at said hardware data processor said customer experience feedback responses from said first survey request on a real-time basis in order to determine whether to issue real-time notifications to one or more predetermined personnel if the first set of customer experience feedback responses fail to satisfy a minimum predetermined standard, issuing at said hardware data processor one or more real-time notifications to said predetermined personnel to notify those one or more predetermined personnel that the first set of customer experience feedback responses from said first survey request fail to satisfy a minimum predetermined standard, transmitting from said hardware data processor a second follow-up survey request to said customer;

receiving at said hardware data processor a second set of customer experience feedback responses provided by said customer using said first mobile unit in response to a second follow-up survey request;

evaluating at said hardware data processor said second set of customer experience feedback responses from said second follow-up survey request on a real-time basis in order to determine whether to issue real-time notifications to one or more predetermined personnel if the second set of customer experience feedback responses fail to satisfy a minimum predetermined standard, issuing at said hardware data processor one or more real-time notifications to said predetermined personnel to notify those predetermined personnel that the second set of customer experience feedback responses from said second follow-up survey request fail to satisfy a minimum predetermined standard;

transmitting a follow-up reminder to said customer with notification about a future survey request;

receiving at said hardware data processor scores associated with responses from said customer to one or more marked questions on said first survey request or said second follow-up survey request, said one or more marked questions on said first survey request or said second follow-up survey request are designated in that manner by a user, team member or associate;

evaluating at said hardware data processor the scores associated with responses from said customer to one or more marked questions on said first survey request or said second follow-up survey request;

translating at said hardware data processor written statement responses into rating scores based on responses from said customer to one or more marked questions on said first survey request or said second follow-up survey request;

normalizing at said hardware data processor the scores associated with responses from said customer to one or more marked questions on said first survey request or said second follow-up survey request;

translating at said hardware data processor ratings of 0 to n stars based on normalized scores of calculated rating scores associated with responses from said customer to one or more marked questions on said first survey request or said second follow-up survey request, where n is an integer; and preparing at said hardware data processor one or more database reports on the first and second sets of customer experience feedback responses from said first survey request and said second follow-up survey request, respectively.

2. The method of claim 1 further comprising the step of: initiating at said hardware data processor a comments, suggestions and concerns subroutine that provides a comments, suggestions and concerns platform for said customer at the mobile unit to enter comments, suggestions or concerns about the customer's experience.

3. The method of claim 1 further comprising the step of: providing remote access to said customer service information through one or more input/output ports coupled to one or more input/output devices via a graphical user interface coupled to said hardware data processor that is coupled to one or more of said plurality of non-transitory storage devices so that said customer service information can be accessed and updated.

4. The method of claim 1 further comprising the step of: executing at said hardware data processor a subprogram that converts said customer service information into said standardized data format using said hardware data processor coupled to said plurality of non-transitory storage devices.

5. The method of claim 1 further comprising the step of: storing at one or more of said plurality of non-transitory storage devices said customer service information in said standardized format in one or more of said plurality of non-transitory storage devices using said hardware data processor.

6. The method of claim 1 further comprising the step of: calculating at said hardware data processor a rating score based on the evaluation of the scores associated with responses from said customer to one or more marked questions on said first survey request or said second follow-up survey request.

7. The method of claim 1 further comprising the step of: evaluating at said hardware data processor said response evaluation from said customer about the customer service information stored in said one or more of said plurality of non-transitory storage devices.

8. The method of claim 3 further comprising the step of: transmitting from said hardware data processor an electronic communication over said input/output ports to one or more personnel at a customer service facility regarding said response evaluation including a description of the evaluation content.

9. The method of claim 1 further comprising the step of: transmitting at said hardware data processor the normalized scores of calculated rating scores associated with responses from said customer to one or more marked questions on said first survey request or said second follow-up survey request to a website, electronic bulletin board, or chat room for posting.

10. The method of claim 1 further comprising the step of: transmitting at said hardware data processor one or more social media links to the customer with the normalized scores of calculated rating scores associated with responses from said customer to one or more marked questions on said first survey request or said second follow-up survey request.

11. A method comprising the steps of:
receiving at a hardware data processor a first set of customer experience feedback responses provided by a customer using a first mobile unit in response to a first survey request at a hardware data processor coupled to a plurality of non-transitory storage devices and one or more input/output ports that are coupled to one or more input/output devices, said hardware data processor being specialized to enhance the operation of the computer system, enhance the performance and efficiency of the hardware data processor, and capable of execution of one or more specialized subprograms to collect, convert, and consolidate customer service information, files and service information provided by one or more different source and in one or more different format;

converting said customer service information into a standardized data format using a hardware data processor coupled to a plurality of non-transitory storage devices;

storing said customer service information in said standardized format in one or more of said plurality of non-transitory storage devices using said hardware data processor;

transmitting electronic communications to one or more customers about said customer service information stored in said standardized format in one or more of said plurality of non-transitory storage devices;

evaluating at said hardware data processor said customer experience feedback responses from said first survey request on a real-time basis in order to determine whether to issue real-time notifications to one or more predetermined personnel if the first set of customer experience feedback responses fail to satisfy a minimum predetermined standard, issuing at said hardware data processor one or more real-time notifications to said predetermined personnel to notify those one or more predetermined personnel that the first set of customer experience feedback responses from said first survey request fail to satisfy a minimum predetermined standard, transmitting from said hardware data processor a second follow-up survey request to said customer;

receiving at said hardware data processor a second set of customer experience feedback responses provided by said customer using said first mobile unit in response to a second follow-up survey request;

issuing at said hardware data processor one or more real-time notifications to said predetermined personnel to notify those predetermined personnel that the second set of customer experience feedback responses from said second follow-up survey request fail to satisfy a minimum predetermined standard, transmitting a follow-up reminder message to said customer with notification about a future survey request;

receiving at said hardware data processor scores associated with responses from said customer to one or more marked questions on said first survey request or said second follow-up survey request, said one or more marked questions on said first survey request or said second follow-up survey request are designated in that manner by a user, team member or associate;

evaluating at said hardware data processor the scores associated with responses from said customer to one or more marked questions on said first survey request or said second follow-up survey request;

translating at said hardware data processor written statement responses into rating scores based on associated with responses from said customer to one or more marked questions on said first survey request or said second follow-up survey request;

normalizing at said hardware data processor the scores associated with responses from said customer to one or more marked questions on said first survey request or said second follow-up survey request;

translating at said hardware data processor ratings of 0 to n stars based on normalized scores of calculated rating scores associated with responses from said customer to one or more marked questions on said first survey request or said second follow-up survey request, where n is an integer; and preparing at said hardware data processor one or more database reports on the first and second sets of customer experience feedback responses from said first survey request and said second follow-up survey request, respectively.

12. The method of claim 11 further comprising the step of:

initiating at said hardware data processor a comments, suggestions and concerns subroutine that provides a comments, suggestions and concerns platform for said customer at the mobile unit to enter comments, suggestions or concerns about the customer's experience.

13. The method of claim 11 further comprising the step of:

providing remote access to said customer service information through one or more input/output ports coupled to one or more input/output devices via a graphical user interface coupled to said hardware data processor that is coupled to one or more of said plurality of non-transitory storage devices so that said customer service information can be accessed and updated.

14. The method of claim 11 further comprising the step of:

executing at said hardware data processor a subprogram that converts said customer service information into said standardized data format using said hardware data processor coupled to said plurality of non-transitory storage devices.

15. The method of claim 11 further comprising the step of:

storing at one or more of said plurality of non-transitory storage devices said customer service information in said standardized format in one or more of said plurality of non-transitory storage devices using said hardware data processor.

16. The method of claim 11 further comprising the step of:

calculating at said hardware data processor a rating score based on the evaluation of the scores associated with responses from said customer to one or more marked questions on said first survey request or said second follow-up survey request.

17. The method of claim 11 further comprising the step of:

evaluating at said hardware data processor said response evaluation from said customer about the customer service information stored in said one or more of said plurality of non-transitory storage devices.

18. The method of claim 11 further comprising the step of:

transmitting from said hardware data processor an electronic communication over said input/output ports to one or more personnel at a customer service facility regarding said response evaluation including a description of the evaluation content.

19. The method of claim 11 further comprising the step of:

transmitting at said hardware data processor the normalized scores of calculated rating scores associated with responses from said customer to one or more marked questions on said first survey request or said second follow-up survey request to a website, electronic bulletin board, or chat room for posting.

20. The method of claim 11 further comprising the step of:

transmitting at said hardware data processor any social media links to the customer with the normalized scores of calculated rating scores associated with responses from said customer to one or more marked questions on said first survey request or said second follow-up survey request.

* * * * *